(12) United States Patent
Breu et al.

(10) Patent No.: US 12,441,420 B2
(45) Date of Patent: Oct. 14, 2025

(54) GROUP OF MOTOR VEHICLES

(71) Applicant: Bayerische Motoren Werke Aktiengesellschaft, Munich (DE)

(72) Inventors: Thomas Breu, Edling (DE); Josip Durmis, Poing (DE); Wolfram Haug, Sauerlach (DE); Joerg Kutzschbach, Petershausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 646 days.

(21) Appl. No.: 17/636,410

(22) PCT Filed: Aug. 19, 2020

(86) PCT No.: PCT/EP2020/073225
§ 371 (c)(1),
(2) Date: Feb. 18, 2022

(87) PCT Pub. No.: WO2021/032791
PCT Pub. Date: Feb. 25, 2021

(65) Prior Publication Data
US 2022/0281542 A1    Sep. 8, 2022

(30) Foreign Application Priority Data
Aug. 19, 2019   (DE) .................... 10 2019 122 195.1

(51) Int. Cl.
*B62D 63/00*   (2006.01)
*B60K 1/04*    (2019.01)
(Continued)

(52) U.S. Cl.
CPC ............. *B62D 63/025* (2013.01); *B60K 1/04* (2013.01); *B60K 5/04* (2013.01); *B62D 25/08* (2013.01);
(Continued)

(58) Field of Classification Search
CPC .... B62D 63/025; B62D 25/08; B62D 25/085; B62D 25/087; B62D 25/2018;
(Continued)

(56) References Cited

U.S. PATENT DOCUMENTS

| 6,981,736 B2 | 1/2006 | Morsch et al. |
| 9,096,277 B2 | 8/2015 | Grosse et al. |

(Continued)

FOREIGN PATENT DOCUMENTS

| CN | 1684866 A | 10/2005 |
| CN | 102085883 A | 6/2011 |

(Continued)

OTHER PUBLICATIONS

DE102015016954A1 computer translation (Year: 2016).*

(Continued)

*Primary Examiner* — Steven O Douglas
(74) *Attorney, Agent, or Firm* — Crowell & Moring LLP

(57) ABSTRACT

In a group of motor vehicles of one vehicle type, hybrid-drive motor vehicles are derived from the electric-drive motor vehicles. By using the architecture of electric-drive motor vehicles for the hybrid-drive motor vehicles, the architecture has a floor pan subassembly that sits in a higher position in comparison to that in motor vehicles having an internal combustion engine drive. An installation space for housing a battery on the underside of the floor pan subassembly is made available, which, in comparison to the motor vehicle in the prior art, allows significantly larger batteries to be housed.

19 Claims, 22 Drawing Sheets

(51) Int. Cl.
*B60K 5/04* (2006.01)
*B62D 25/08* (2006.01)
*B62D 25/20* (2006.01)
*B62D 63/02* (2006.01)
*B62D 65/04* (2006.01)

(52) U.S. Cl.
CPC ......... *B62D 25/085* (2013.01); *B62D 25/087* (2013.01); *B62D 25/2018* (2013.01); *B62D 65/04* (2013.01); *B60K 2001/0438* (2013.01)

(58) Field of Classification Search
CPC ...... B62D 65/04; B62D 25/2027; B60K 1/04; B60K 5/04; B60K 6/20; B62K 2001/0438; Y02T 10/62; B60Y 2200/91; B60Y 2200/92
USPC ............. 296/193.04, 193.07, 193.08, 193.09
See application file for complete search history.

(56) References Cited

U.S. PATENT DOCUMENTS

| | | | |
|---|---|---|---|
| 10,363,979 | B2 | 7/2019 | Haug et al. |
| 11,780,336 | B2 * | 10/2023 | Dupper ............... H01M 50/262 429/99 |
| 2006/0108834 | A1 | 5/2006 | Boulay et al. |
| 2008/0169669 | A1 | 7/2008 | Tietje |
| 2011/0139534 | A1 | 6/2011 | Klimek et al. |
| 2015/0266515 | A1 | 9/2015 | Hulbert |
| 2016/0272245 | A1 | 9/2016 | Berger et al. |
| 2017/0113542 | A1 | 4/2017 | Muramatsu et al. |
| 2017/0246943 | A1 | 8/2017 | Salz-Breuer et al. |
| 2018/0086401 | A1 | 3/2018 | Haug et al. |
| 2018/0229787 | A1 | 8/2018 | Harmusz et al. |
| 2018/0229788 | A1 | 8/2018 | Erlacher et al. |
| 2019/0061507 | A1 | 2/2019 | Nitta et al. |
| 2022/0212721 | A1 | 7/2022 | Eiletz et al. |
| 2022/0281542 | A1 | 9/2022 | Breu et al. |
| 2022/0281543 | A1 | 9/2022 | Breu et al. |
| 2023/0242195 | A1 | 8/2023 | Beals |
| 2023/0331323 | A1 | 10/2023 | Haug et al. |
| 2023/0373289 | A1 | 11/2023 | Grosse et al. |

FOREIGN PATENT DOCUMENTS

| | | | |
|---|---|---|---|
| CN | 105984508 | A | 10/2016 |
| CN | 106608284 | A | 5/2017 |
| CN | 107128373 | A | 9/2017 |
| CN | 107667054 | A | 2/2018 |
| CN | 108423092 | A | 8/2018 |
| CN | 114269636 | A | 4/2022 |
| CN | 114269637 | A | 4/2022 |
| CN | 116157319 | A | 5/2023 |
| CN | 114269636 | B | 10/2023 |
| CN | 114269637 | B | 10/2023 |
| DE | 101 54 353 | A1 | 5/2002 |
| DE | 101 29 738 | A1 | 1/2003 |
| DE | 10 2005 032 180 | A1 | 1/2007 |
| DE | 10 2008 055 738 | A1 | 5/2010 |
| DE | 10 2010 051 783 | A1 | 7/2011 |
| DE | 10 2010 011 267 | A1 | 9/2011 |
| DE | 10 2011 012 124 | A1 | 4/2012 |
| DE | 10 2013 000 626 | A1 | 7/2014 |
| DE | 20 2014 002 557 | U1 | 6/2015 |
| DE | 10 2014 215 813 | A1 | 2/2016 |
| DE | 10 2015 016 954 | A1 | 7/2016 |
| DE | 10 2018 214 265 | A1 | 2/2019 |
| DE | 10 2019 122 195 | A1 | 2/2021 |
| DE | 10 2020 129 667 | A1 | 5/2022 |
| GB | 2479978 | A | 11/2011 |
| KR | 10-2023-0010721 | A | 1/2023 |
| WO | WO 2004/009429 | A1 | 1/2004 |
| WO | WO 2004/024543 | A1 | 3/2004 |
| WO | WO 2005/056370 | A1 | 6/2005 |
| WO | WO 2012/084085 | A1 | 6/2012 |
| WO | WO 2016/192921 | A1 | 12/2016 |
| WO | WO 2021/032790 | A1 | 2/2021 |
| WO | WO 2021/032791 | A1 | 2/2021 |
| WO | WO 2022/006381 | A1 | 1/2022 |
| WO | WO 2022/037808 | A1 | 2/2022 |
| WO | WO 2022/049170 | A1 | 3/2022 |
| WO | WO 2022/101180 | A1 | 5/2022 |

OTHER PUBLICATIONS

DE102008055738A1 computer translation (Year: 2010).*
Computer translation DE10154353A1.*
Computer translation of WO2004024543A1 (Year: 2004).*
English translation of Chinese Office Action issued in Chinese Application No. 202080058441.0 dated Apr. 14, 2023 (9 pages).
English translation of Chinese Office Action issued in Chinese Application No. 202080058442.5 dated Apr. 14, 2023 (9 pages).
International Search Report (PCT/ISA/210) issued in PCT Application No. PCT/EP2020/073225 dated Nov. 16, 2020 with English translation (five (5) pages).
German-language Written Opinion (PCT/ISA/237) issued in PCT Application No. PCT/EP2020/073225 dated Nov. 16, 2020 (nine (9) pages).
German-language Search Report issued in German Application No. 10 2019 122 195.1 dated Jul. 20, 2020 with partial English translation (13 pages).
International Search Report (PCT/ISA/210) issued in PCT Application No. PCT/EP2020/073224 dated Nov. 16, 2020 with English translation (six (6) pages).
German-language Written Opinion (PCT/ISA/237) issued in PCT Application No. PCT/EP2020/073224 dated Nov. 16, 2020 (eight (3) pages).
U.S. Non-Final Office Action issued in U.S. Appl. No. 17/636,598 dated May 21, 2024 (19 pages).

* cited by examiner

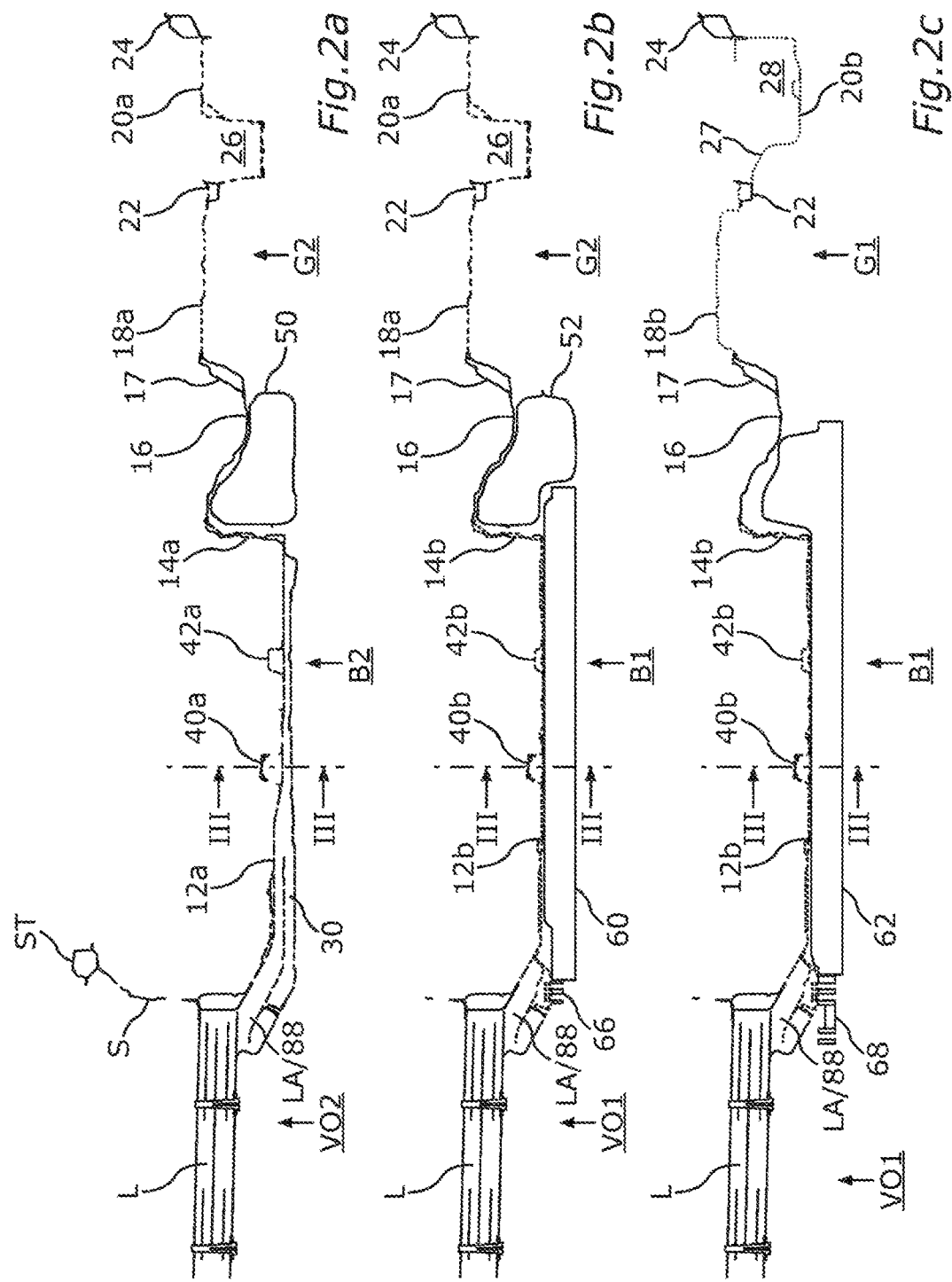

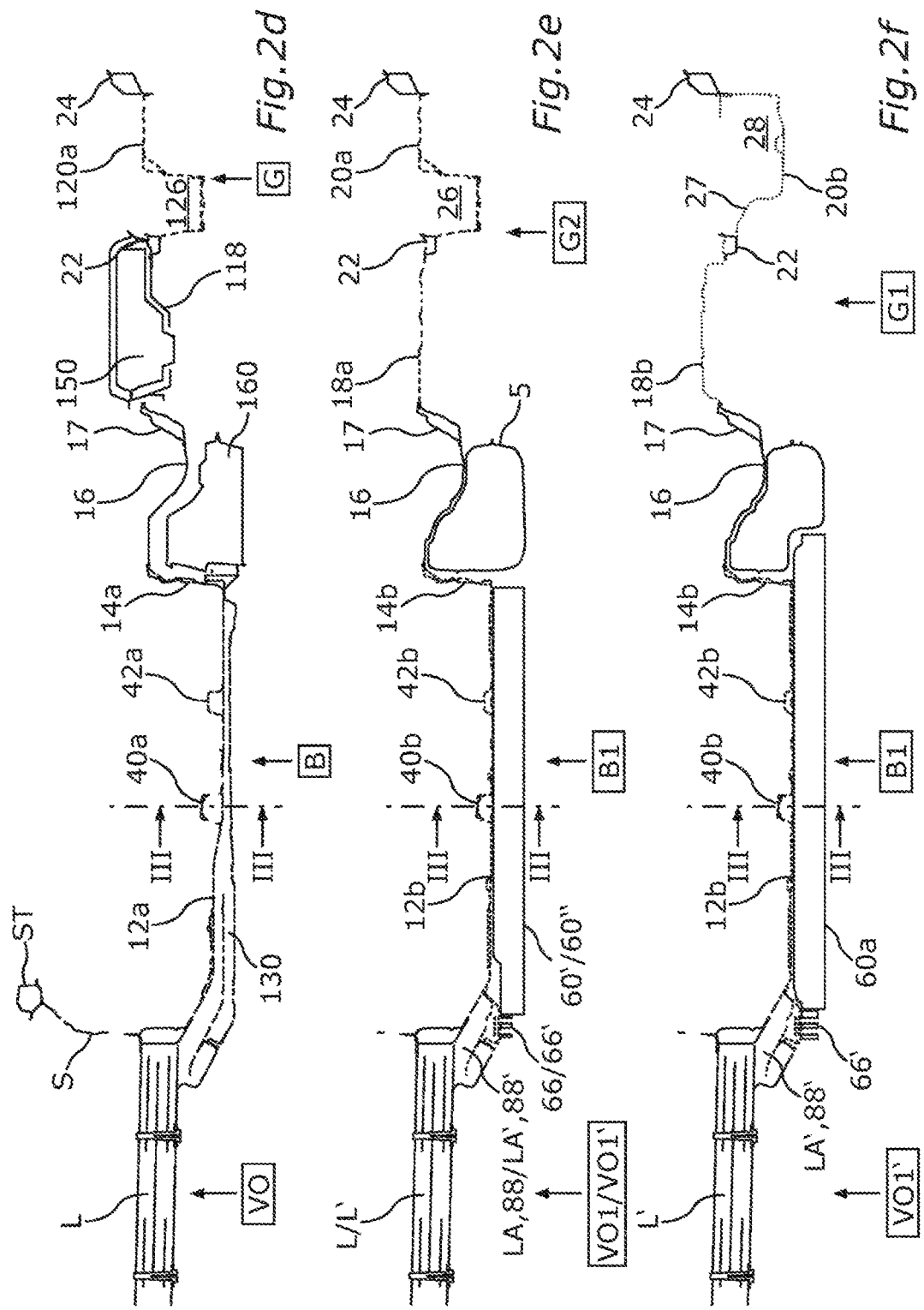

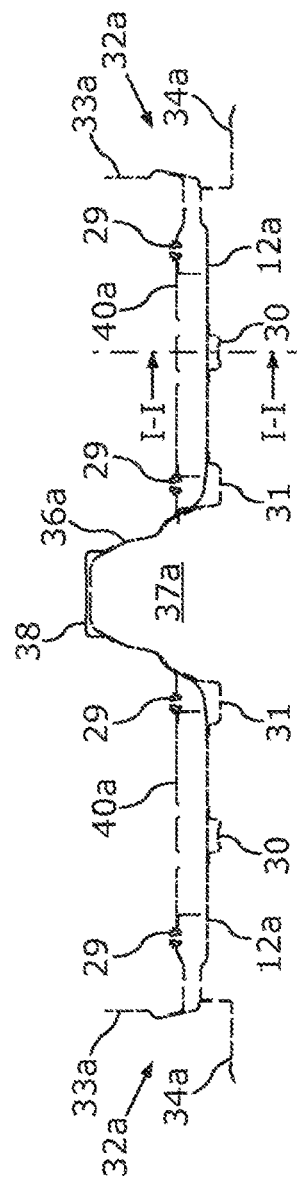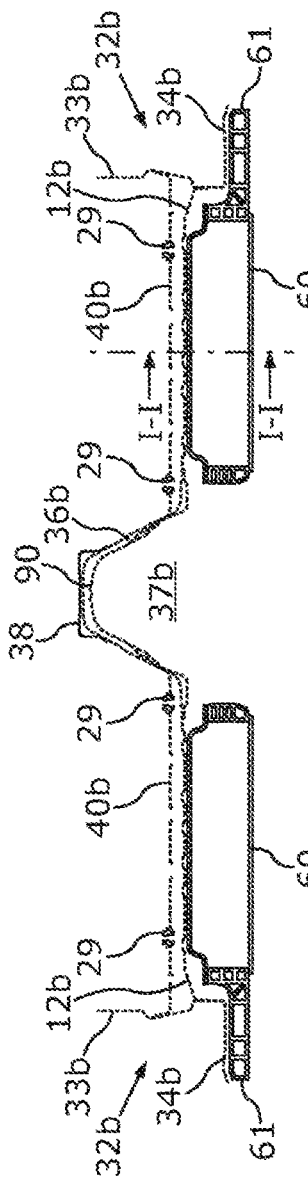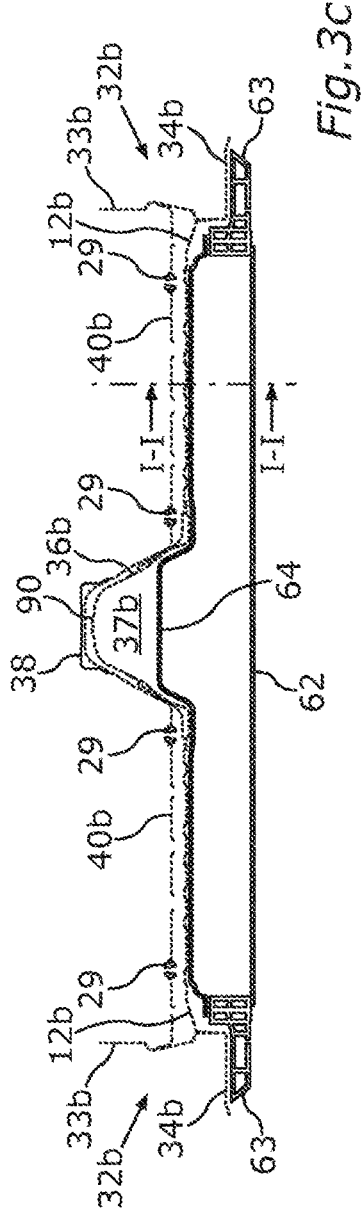

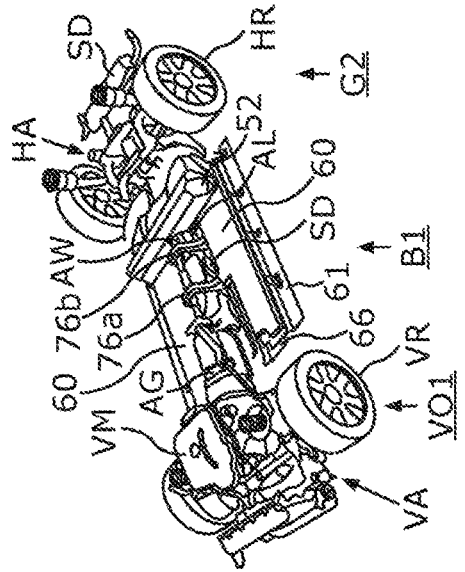
Fig. 7a (PHEV 1)
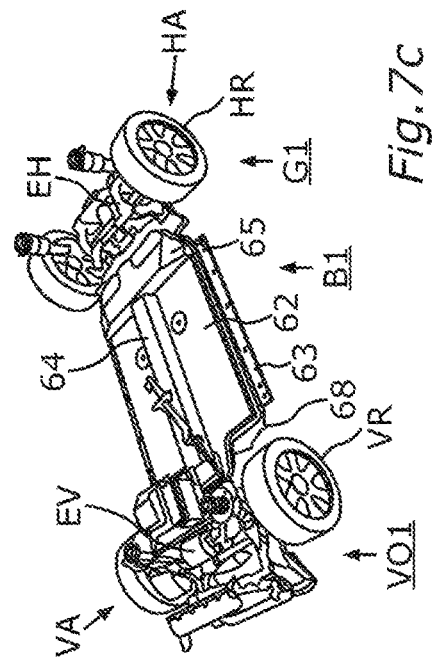
Fig. 7c (BEV)
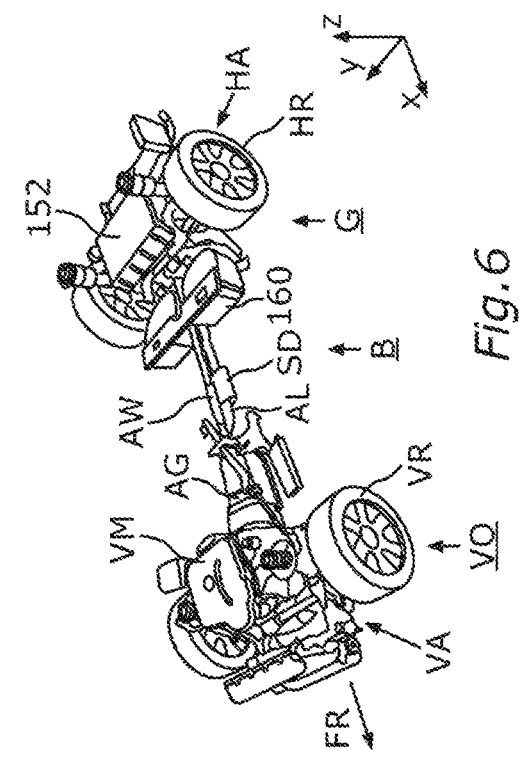
Fig. 6 (PHEV prior art)
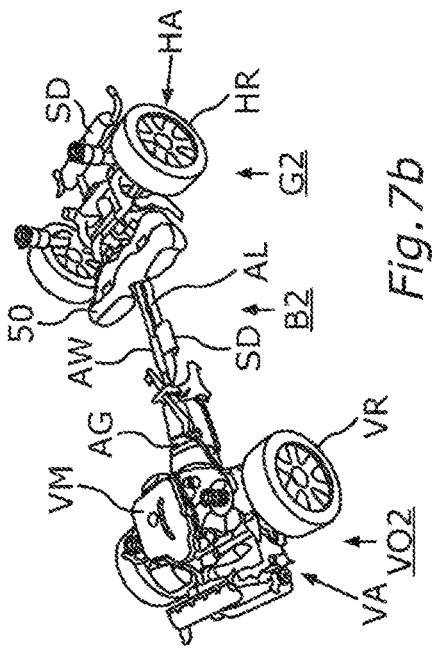
Fig. 7b (ICE1)

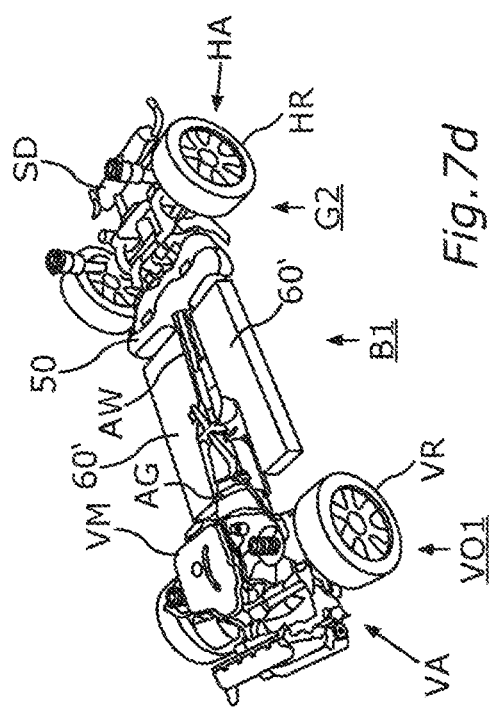
*Fig.7d* (ICE2)
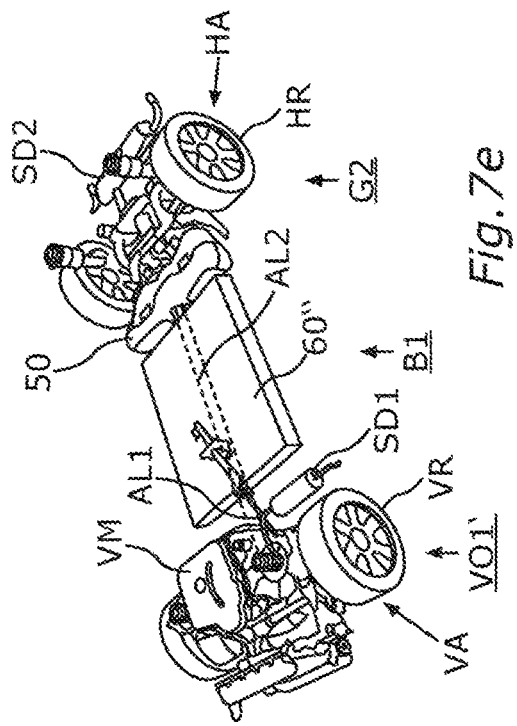
*Fig.7e* (ICE3)
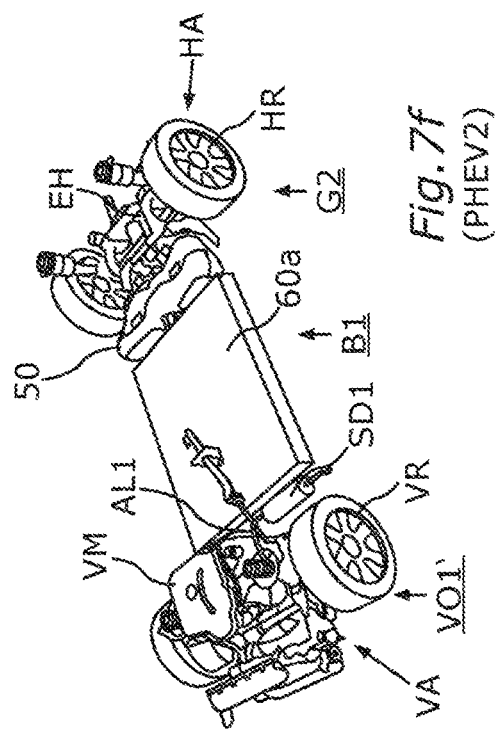
*Fig.7f* (PHEV2)

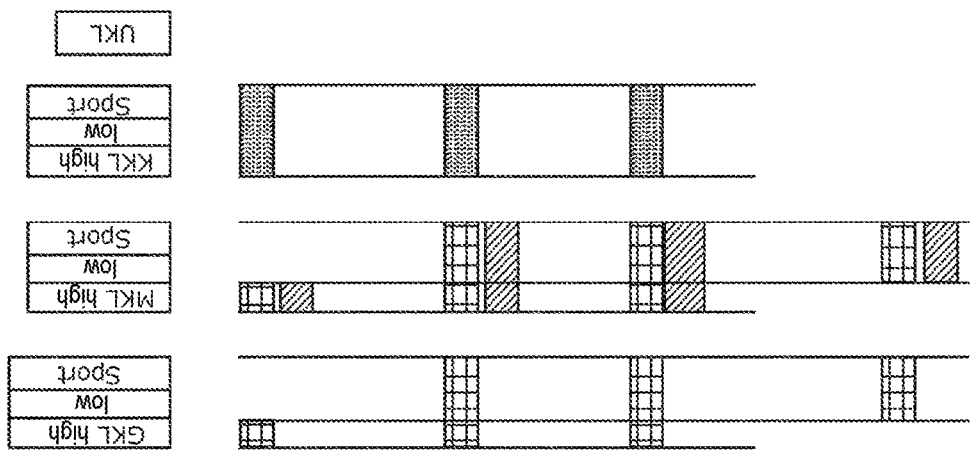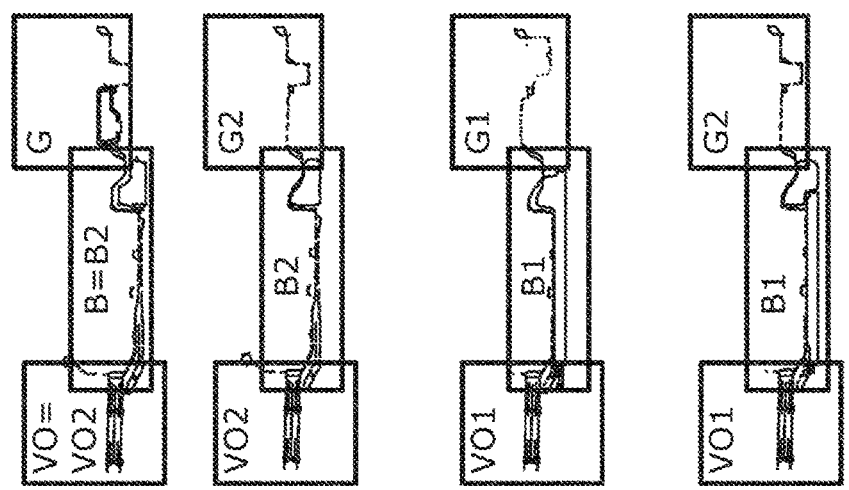
Fig. 18

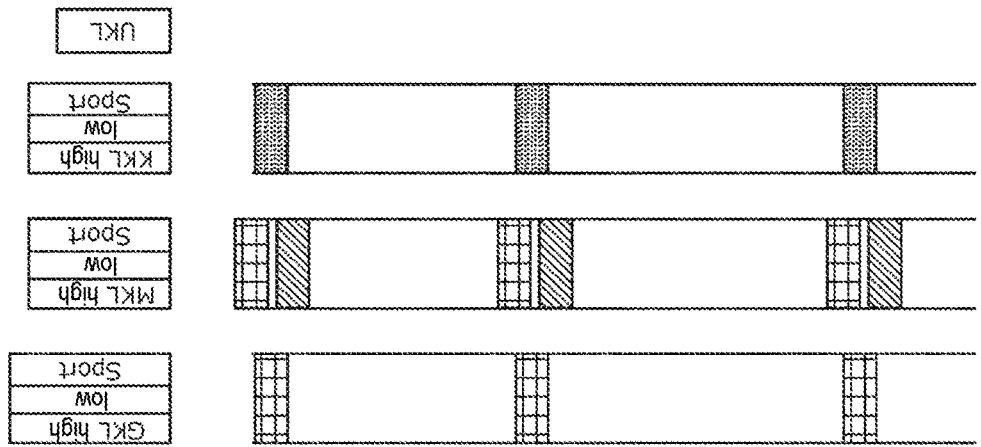
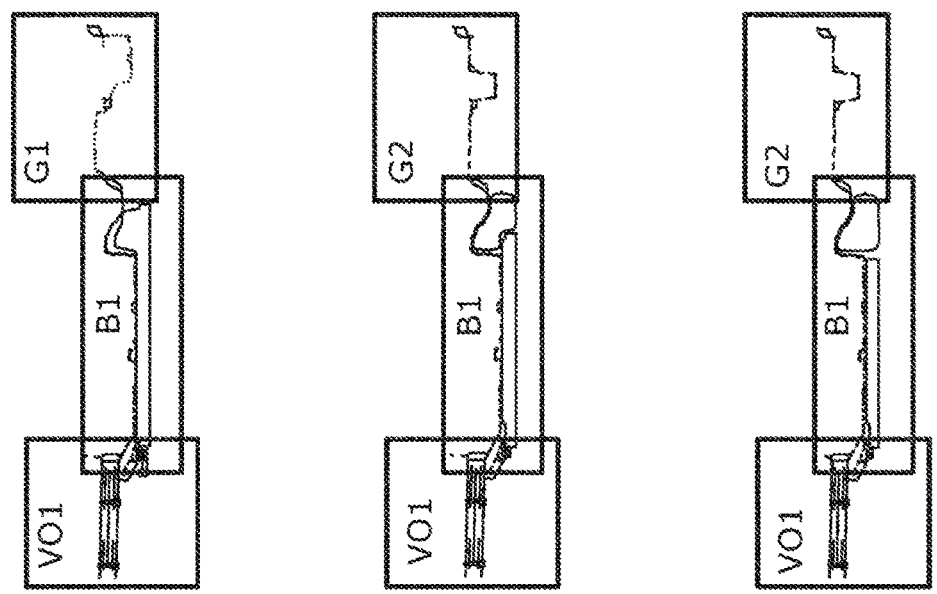
Fig. 19

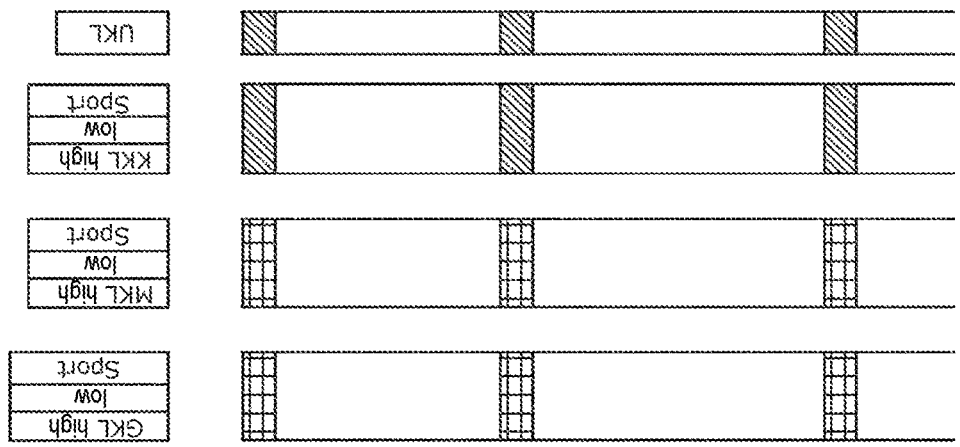
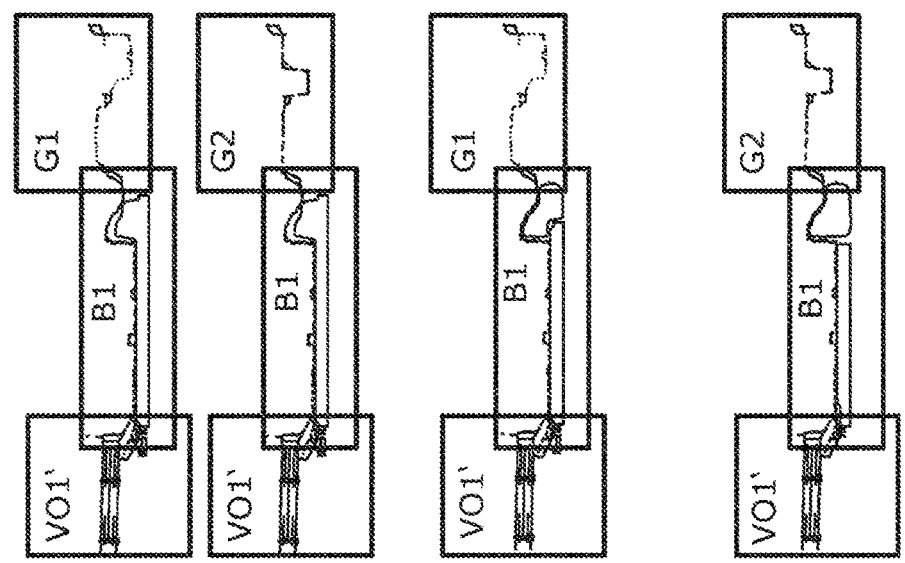
Fig. 20

GROUP OF MOTOR VEHICLES

BACKGROUND AND SUMMARY OF THE INVENTION

The invention relates to a group of motor vehicles and to a method for producing a group of motor vehicles.

In the context of the present invention, the following definitions are of importance.

"Vehicle type": also referred to colloquially as "vehicle model", that is to say motor vehicles whose external appearance is substantially identical (irrespective of the drive concept). An example of this is applicant's vehicle type with the model designation "BMW 2 Series Active Tourer". At the time of filing of the present patent application, this vehicle type is available in several variants with combustion engine and in one variant with hybrid drive ("BMW 225xe iPerformance Active Tourer"), wherein the variant with hybrid drive has a substantially identical external appearance to the motor vehicles with combustion engine.

"Group of motor vehicles": the entirety of the motor vehicles of one vehicle type, irrespective of the drive concept.

"Drive concepts" are "combustion engine" (or "combustion drive"), "electric motor" (or "electric drive") and "hybrid drive", hereinafter also referred to, in this sequence, by "ICE" (Internal Combustion Engine) and "BEV" (Battery Electric Vehicle) and "PHEV" (Plug-in Hybrid Electric Vehicle) respectively. Here, "HEV" (Hybrid Electric Vehicle) also encompasses "PHEV".

"Combustion engine": combustion machine which is operated with a fuel (gasoline, diesel, hydrogen, etc.) and which serves for driving a motor vehicle.

"Electric motor": electric machine for driving a motor vehicle.

"Battery": accumulator for storing electrical energy for feeding to the electric motor, that is to say "drive battery". The expression "high-voltage battery" is commonly also used.

"Hybrid drive": combination of a combustion engine and at least one electric motor as drive units for driving a motor vehicle. The variant of the hybrid drive with the possibility of charging the battery of the motor vehicle with electrical energy from outside the motor vehicle is commonly referred to as "Plug-in Hybrid Electric Vehicle".

"Bodyshell structure": assembly of the components that form the load-bearing structure of the motor vehicle. The components are for example sheet-metal components that have been connected to one another. This expression also encompasses an assembly composed of sheet-metal or cast components. The sheet-metal components that have been connected to one another may be metal sheets composed of different materials, for example steel and aluminum.

"Floor panel subassembly": components of the bodyshell structure which, in their entirety, form the lower passenger cell region of the motor vehicle. These include in particular the lateral floor panel sections, the central tunnel and the heel plate.

"Front-end subassembly": components of the bodyshell structure which, in their entirety, in a vehicle longitudinal direction, form the load-bearing region including a bulkhead. These include in particular the front longitudinal members, which, with the front axle, accommodate a drive unit and, in the event of a frontal crash, dissipate a significant amount of crash energy.

"Luggage compartment floor subassembly": components of the bodyshell structure which, in their entirety, in a vehicle longitudinal direction, form the region from a "front transverse member, rear axle" to a rear-end terminating member. In a vehicle transverse direction, the luggage compartment floor subassembly extends between a right-hand and a left-hand wheel arch and encompasses the rear-end longitudinal members.

"Central tunnel": tunnel running along the vehicle longitudinal central plane, in the free space underneath which there is arranged for example a driveshaft and/or at least one exhaust line and/or at least one media line.

It is generally known that, in order to increase the economy of the process of manufacturing their motor vehicles, manufacturers of motor vehicles use as far as possible uniform components and standardized interfaces for the bodyshell structure, for example to produce body variants of a vehicle, that is to say a body variant for a combination motor vehicle and/or coupe and/or cabriolet etc. aside from a sedan, for example.

Furthermore, manufacturers of motor vehicles also use uniform components for the bodyshell structure for vehicles that belong to different "vehicle categories" or "vehicle segments", for example for motor vehicles in the mid-size category and the upper mid-size category. This use of uniform components is for example known, in the case of some manufacturers of motor vehicles, by the term "platform strategy".

In this context, it is known from WO 2016/192921 A1 to provide "front-end modules" and "passenger cell modules" in order to form motor vehicles in different vehicle categories, wherein the modules are combinable without limitation, and in this way the motor vehicles in the different vehicle categories can be formed. Here, the front-end modules have different engine bearer spacings, and the passenger cell modules have different spacings of the front seats.

Manufacturers of motor vehicles are increasingly offering vehicles of one vehicle type not only as vehicles with a combustion engine ("combustion drive") but also as vehicles with an electric motor as drive unit ("electric drive") and/or vehicles with a combination of a combustion engine and an electric motor ("hybrid drive"). Thus, under one vehicle type, there are motor vehicles with two or three different drive concepts. The three drive concepts will be referred to below as "combustion drive", "electric drive" and "hybrid drive".

Here, from economic aspects considered by the applicant, it is of particular interest to be able to manufacture motor vehicles with the above-stated three drive concepts with as far as possible uniform components for the bodyshell structure. Since the distribution of the demand among the three drive concepts within one vehicle type is not foreseeable, it is sought to achieve the greatest possible flexibility in the manufacturing process in order to be able to react in a situation-dependent manner to changes in the demand for motor vehicles with the different drive concepts.

It is generally known for motor vehicles with "electric drive" to be equipped with a battery which is arranged over a large area in the region of the vehicle floor. For this purpose, the floor region of these motor vehicles is arranged higher than in the case of a motor vehicle of the same vehicle type with "combustion drive", preferably while maintaining the same position of the seats in the motor vehicle, that is to say with an identical H-point (hip point). The identical H-point makes it possible, in motor vehicles of one vehicle type, to implement an identical configuration of the interior space, including the arrangement of the pedals and of other operator control elements. Furthermore, the same dimensions are attained for the headroom, and the trim components can also be kept substantially identical. Exceptions to this include for example floor linings, wiring harnesses, rear-seat air channels etc.

Furthermore, it is known for example from the applicant's motor vehicles with "hybrid drive" to arrange the battery in the region in front of the rear axle, that is to say in the installation space which, in a motor vehicle with "combustion drive", is provided for accommodating a fuel tank. In these motor vehicles, the fuel tank is arranged in the luggage compartment above the rear axle. Disadvantages of the known arrangement are the limited size both of a battery and of a fuel tank and the reduction in the volume of the luggage compartment. Furthermore, the different installation sequence for the fuel tanks for motor vehicles with "combustion drive" and with "hybrid drive" makes the production of the motor vehicles more difficult.

Furthermore, it is known for example from motor vehicles of the Mercedes and Porsche brands with "hybrid drive" to arrange the battery in the region of the luggage compartment and to leave the fuel tank in that installation space in front of the rear axle which is also provided for this in the case of the motor vehicles with "combustion drive".

Furthermore, DE102008055738A1 has disclosed a modular system for the construction of a motor vehicle body, in which modules from at least two module groups are freely combinable with one another and selectable. In particular, provision is made here to design multiple main floor modules and multiple front-end and rear-end modules to be freely combinable, such that, for example, different drive concepts or floor heights do not impede the free combinability of the main floor with the front-end and rear-end structures.

It is an object of the invention to provide a new approach for the production of bodyshell structures for motor vehicles of one vehicle type with the three different drive concepts mentioned above, whilst making the most extensive possible use of uniform components for the bodyshell structure. It is furthermore sought to provide, by means of the invention, a new approach for the production of bodyshell structures for motor vehicles of one vehicle type with the three different drive concepts mentioned above, which approach makes it possible, in the case of motor vehicles with "hybrid drive", to accommodate the largest possible battery, whilst making the most extensive possible use of uniform components for the bodyshell structure.

Said object is achieved by means of a group of motor vehicles having the disclosed herein. The present disclosure also relates to a method for producing motor vehicles.

A core concept of the invention is to take the "architecture" of the motor vehicles with "electric drive" as a starting point for realizing the motor vehicles with "hybrid drive".

Against the background of the expected increasing electrification of motor vehicles and the resulting reduction of motor vehicles with "combustion drive", the invention takes the "electric drive" as a basis for a new vehicle architecture and derivations thereof. With this fundamental reversal of the hitherto prevalent architecture approach, the bodyshell structure of a motor vehicle with "electric drive" becomes "the new standard".

This new architecture approach utilizes the "raised" floor panel subassembly of the motor vehicles with "electric drive" for the arrangement of a battery, provided over a large area underneath the floor panel subassembly, for the motor vehicles with "hybrid drive". This makes fundamentally different, enhanced dimensioning possible with regard to the storage capacity of the battery. This is of major significance in particular with regard to the future demanded "electric range" of motor vehicles with "hybrid drive" of 80 to 100 kilometers, because future legislative regulations will grant financial benefits or other usage rights (for example entry or parking authorization) only for vehicles with the above-stated range.

Thus, in a new vehicle architecture, the different drive concepts can be realized using a minimal number of body subassemblies.

By means of the invention, it is also possible in the motor vehicles with "hybrid drive" for at least one battery of "flat" form, that is to say of "board"-like form, with an extent considerably greater in a vehicle longitudinal direction and in a vehicle transverse direction than in a vehicle vertical direction, to be arranged below the floor panel subassembly that is "set higher" in the motor vehicle in the installed position. Thus, the motor vehicles according to the invention differ from the motor vehicles with "hybrid drive" according to the prior art as described in the introduction, in the case of which the battery is accommodated in the limited installation space under the rear seats or in the region of the luggage compartment.

In the context of the present invention, "arranged higher" means that at least a relevant subregion, in terms of area, of the first floor panel subassembly is arranged further upward in the vertical direction of the motor vehicle than in the case of the second floor panel subassembly.

The first floor panel subassembly may be configured such that, at its underside, it can accommodate batteries of different size and/or different shape. The batteries may differ in terms of external size by way of correspondingly different dimensions. Likewise, "batteries of different size" may also differ in terms of their storage capacity, that is to say in the amount of charge that can be drawn.

In the context of the present invention, "arranged higher" encompasses a situation in which parts of the two floor panel subassemblies are arranged at the same height. For example, this may apply to a central tunnel that has an identical position for both floor panel subassemblies. Uniform interfaces for the central console and further interior compartment components are thus made possible.

Each of the two floor panel subassemblies is in itself an "identical part", irrespective of which of the three different motor vehicles the respective floor panel subassembly is used in. It is characteristic of these "identical parts" that all examples of the first floor panel subassembly are produced using the same first deep-drawing tool or using the same first set of deep-drawing tools. Analogously, all examples of the second floor panel subassembly are produced using the same second deep-drawing tool or using the same second set of deep-drawing tools.

In the context of the present invention, "the same deep-drawing tool" may be substituted by the equivalent term "the same casting tool", and likewise a combination of the two stated tools. For linguistic simplicity, primarily only "deep-drawing tools" will be referred to below. The production of components of the bodyshell structure by deep drawing is the most commonly used production method.

The expression "identical part" thus encompasses components for the bodyshell structure that have been produced using the same deep-drawing tool. Following the production process in the pressing plant, these "identical parts" may for example be varied in terms of their length dimension by shortening or by lengthening. In the case of shortening by cutting to length, it is for example the case that a longitudinal member or a deep-drawn areal panel section that is used commonly for the motor vehicles of two drive concepts is shortened, in a manner dependent on the drive concept, by trimming at one of its end sections. Alternatively, the longitudinal member or the panel section may also be lengthened, in a manner dependent on the drive concept or vehicle category, by attachment of a lengthening piece by riveting, welding, screw connection, adhesive bonding etc. These length adaptations by cutting to length (trimming) or by lengthening (attachment of add-on pieces) are manufacturing steps that are performed as a retroactive measure on "identical parts" that have previously been produced using a uniform deep-drawing tool, such that only relatively low work and tooling costs are incurred for these retroactive measures.

Deep-drawn sheet-metal components are for example a floor panel, longitudinal members etc. The sheet-metal material may be homogeneous along its areal extent, or may for example be formed by a so-called "tailored blank".

With regard to the floor panel subassembly, "scaling" is possible for example by trimming of the floor panel subassembly in a longitudinal direction of the motor vehicle in order to realize different wheelbase dimensions.

Furthermore, the expression "identical part" encompasses bodyshell parts that are produced using the same casting tool. The advantage of cast components lies inter alia in the wide variety of possibilities for the integration of functions, attachment parts, connecting regions etc. For example, suspension strut receptacles can advantageously be formed by cast components.

It is basically possible, on the "identical parts" of each of the two floor panel subassemblies or each of the two luggage compartment floor subassemblies, four different patterns of holes to be applied, by punching, drilling etc., for the connection of the "identical part" to the adjoining bodyshell and/or to attachment parts. It is however essential for the "identical parts" that, after the production process in the same deep-drawing tool, no further shape-imparting modifications are made. Through the use of a uniform deep-drawing tool that is used for all of the different drive concepts, the investment costs for manufacturing facilities are significantly reduced. Different patterns of holes are necessary for example for the production of motor vehicles in versions for different countries, as so-called left-hand-drive vehicles" or "right-hand-drive vehicles", or with different exhaust systems.

Furthermore, a multiplicity of fastening points (roughly screw connection points) may be provided on the identical parts, wherein at least one motor vehicle with a particular drive concept uses only some of the fastening points.

"Identical parts" may self-evidently also, at least in part, be identical components.

The identical parts in the individual motor vehicles or drive concepts may be supplemented by specific "adaptation parts", such as different specific cross braces in an identical tunnel region or different brackets on an identical front-end and/or bulkhead region.

In one advantageous embodiment of the invention, to realize the motor vehicles with the three drive concepts, not only the two floor panel subassemblies but also to different front-end subassemblies are provided.

In one embodiment of the invention, a first front-end subassembly is provided in the case of which the front longitudinal members (engine bearers) and in the region of the bulkhead without continuation in central longitudinal members at the underside of the floor panel subassembly. This provides freedom for the design of the floor panel subassembly, because this does not need to be designed for the introduction of forces from the front longitudinal members. To nevertheless realize a sufficiently rigid attachment of the front longitudinal members to the bodyshell structure of the motor vehicle, it is for example the case that, on the end sections of the front longitudinal members in the region of the bulkhead, there are provided attachment parts and/or lateral supports to the sills, which ensure that the end sections of the front longitudinal members are supported over a large area. For the introduction of the forces from the front-end subassembly rearwardly in the longitudinal direction of the motor vehicle, use is instead made, for example, of at least one housing of a battery arranged underneath the floor panel subassembly.

A second front-end subassembly has front longitudinal members (engine bearers), the rear end sections of which are adjoined directly or indirectly by central longitudinal members, which begin in the region of the bulkhead and extend counter to the direction of travel into the region of the floor panel subassembly. In the case of this generally known design, the central longitudinal members are connected to the underside of the floor panel subassembly, preferably by welding. This has the result that forces are transmitted over a large area and in a uniform manner from the front longitudinal members into the floor panel subassembly.

The embodiment of the first front-end subassembly has the advantage that, in motor vehicles with "hybrid drive" or with "electric drive", at least one battery can be arranged in the region underneath the floor panel subassembly, commonly (also) in the front region thereof).

In a preferred embodiment of the invention, the following combination possibilities are realized:

To realize motor vehicles with "electric drive" or "hybrid drive", the first front-end subassembly is combined with the first floor panel subassembly. The first floor panel subassembly is arranged higher than the second floor panel subassembly, in order for a battery or batteries to be accommodated at the underside thereof. The battery or batteries occupies or occupy the structural space which, in motor vehicles with "combustion drive", is used for the arrangement of the central longitudinal members.

To realize motor vehicles with "combustion drive", the second front-end subassembly is combined with the second floor panel subassembly. The second floor panel subassembly is arranged lower than the first floor panel subassembly and does not need to accommodate any battery or batteries at the underside thereof. In this way, the front longitudinal members can continue into central longitudinal members, for which sufficient structural space is available at the underside of the second floor panel subassembly.

The front subframes that are used in both front-end subassemblies are for example at least partially structurally identical for the accommodation of the drive units, such that there are thus structurally identical aspects in motor vehicles with "combustion drive" and with "hybrid drive" for the accommodation of the combustion engine. Correspondingly, the front subframe for a motor vehicle with "electric drive" is adapted to the geometry of an electric motor arranged above the front subframe and/or to further components (for example control electronics, heating/cooling system, heat pump etc.).

Furthermore, the front subframes are at least partially structurally identical, for example in the region of the attachment of the battery or batteries, such that there are thus structurally identical aspects in motor vehicles with "hybrid drive" and "electric drive" with regard to the attachment of the battery or batteries. These front subframes are, by contrast to the front subframes for motor vehicles with "combustion drive", adapted to the absence of a central longitudinal member. For example, an additional shear panel may be provided here.

The two front-end subassemblies may have common components, such as radiator, brake unit, sound generator (for acoustic noticeability during electric operation of motor vehicles with "electric drive" and/or "hybrid drive"), sensors, struts, starter batteries, wiper system, washer system, water container, expansion tank etc.

The invention can advantageously be applied to motor vehicles with "standard drive", that is to say with a longitudinally installed front-mounted engine and transmission assembly and drive of the rear wheels via a driveshaft, including the expansion to all-wheel drive by means of a transfer box for the drive of the front wheels, but is not limited to the "standard drive". In the case of motor vehicles with "combustion drive" with "standard drive", the mechanical drive for the motor vehicles with "hybrid drive" can be easily transferred by virtue of a "disk-shaped" electric motor being integrated into the transmission. The torque converter in the automatic transmission is omitted as a result of the integration the electric motor.

In one embodiment of the invention, the first floor panel subassembly may also be used for the motor vehicles with "combustion drive". These motor vehicles consequently then also have a first front-end subassembly, because this is adapted for the attachment to the first floor panel subassembly. This design is duly associated with compromises with regard to the packaging of the motor vehicle with "combustion drive". It can nevertheless be expedient for economic reasons to reduce the number of floor panel subassemblies to a single floor panel subassembly, for example in the case of an assumed scenario in which a proportion of motor vehicles within one vehicle type which are sold with "combustion drive" is low.

The use of the first floor panel subassembly also for the motor vehicles with "combustion drive" is particularly expedient for example in the case of a combustion engine installed in a transverse direction of the motor vehicle. In particular in the case of a small swept volume of the combustion engine, for example in the context of "downsizing" with regard to a number of cylinders and/or power output owing to more stringent CO2 regulations, increasing use may be made of such engines in future. Since the mounting of "transverse engines" is fundamentally different from the mounting of "longitudinal engines" (installed in a longitudinal direction of the motor vehicle), a different front-end subassembly than that for longitudinal engines is required for transverse engines, which differs from the front-end subassembly for longitudinal engines inter alia in terms of the spacing of the front longitudinal members.

Thus, in one refinement of the invention, two embodiments of the first front-end subassembly are provided, one for accommodating a combustion engine arranged longitudinally with respect to the direction of travel of the motor vehicle (longitudinal engine) and another for accommodating a combustion engine arranged transversely with respect to the direction of travel of the motor vehicle (transverse engine). For this purpose, the two embodiments of the first front-end subassembly have corresponding front longitudinal members adapted to the longitudinal engine or to the transverse engine respectively.

In one refinement of the invention, in the case of the motor vehicles with "combustion drive" and the first floor panel subassembly, a structural space for the arrangement of a housing for components of the motor vehicle is available at the underside of the first floor panel subassembly. This housing may for example accommodate components that are specific to a motor vehicle with "combustion drive", for example an SCR tank, an activated carbon filter, a 48 volt battery, components of the air supply, etc.

The housing also performs the function of a "module tray". Instead of being accommodated in one housing, the components may also be arranged independently, without a housing, or so as to be fastened to a common frame, on the underside of the floor panel subassembly.

Particular advantages are achieved in the case of motor vehicles with "hybrid drive" or with "combustion drive" if a combustion engine installed in a transverse direction of the motor vehicle is combined with an exhaust system that ends in the front region of the passenger cell. In this configuration, in the case of a motor vehicle with "hybrid drive", a single battery that extends over a major part of the vehicle width can be provided, because neither a driveshaft for the rear wheels, nor an exhaust line that extends into the rear end of the vehicle, is present. In the same way, in the case of a motor vehicle with "combustion drive", use can be made of one coherent housing that extends over a major part of the vehicle width.

In a further embodiment of the invention, two different luggage compartment floor subassemblies are provided, wherein a first luggage compartment floor subassembly, in its installed position in the motor vehicle, is in its front region arranged higher than a second luggage compartment floor subassembly. In this way, in the case of the first luggage compartment floor subassembly, more structural space is available underneath the luggage compartment floor subassembly, for example for the arrangement of at least one electric motor and/or of a rear axle. In particular, this structural space is required for the arrangement of an electric motor at the rear axle of a motor vehicle with "electric drive" (BEV), for example in a structural unit with an inverter for converting the direct current from the battery into alternating current for feeding to the electric motor.

Correspondingly, in the case of the second luggage compartment floor subassembly (in the case of which the front region is arranged lower than in the case of the first luggage compartment floor subassembly), more structural space is available above the luggage compartment floor subassembly for forming the luggage compartment, for a greater storage capacity of the luggage compartment and/or a better geometrical configuration of the luggage compartment.

In the context of the present invention, "arranged higher" means that the front region of the first luggage compartment floor subassembly is arranged further upward in the vertical direction of the motor vehicle than in the case of the second luggage compartment floor subassembly. It is preferable here for not the entire front region of the first luggage compartment floor subassembly but only the central region thereof, which is situated between the longitudinal members in a transverse direction, to be arranged higher. The lateral regions of the luggage compartment floor subassembly are attached via uniform members to the rear-end region of the motor vehicle. A uniform rear-end member structure can thus be used as a basis for all motor vehicles of the group according to the invention.

Here, the two luggage compartment floor subassemblies may be of uniform or different design in their rear region.

In one embodiment of the invention, the rear region of the first luggage compartment floor subassembly is, at least in one subregion, arranged lower than in the case of the second luggage compartment floor subassembly (for example in the absence of an end muffler). In particular in the case of a motor vehicle with "electric drive" (BEV), freedom is provided in the rear region of the luggage compartment floor subassembly with regard to the design of this body section. Here, the structural space that is available as a result of the omission of an exhaust system can be utilized by a rear luggage compartment tray shaped specifically for the purpose. These embodiments are however not imperative, by contrast to the above-described raising of the front region of the first luggage compartment floor subassembly in order to provide a sufficient structural space there for accommodating an electric motor at the rear axle.

Thus, the increased structural space requirement in the front region of the first luggage compartment floor subassembly, which arises in the case of the motor vehicles with "electric drive" from the accommodation of the electric motor (with or without inverter), can be compensated by the structural space that is available in the rear region of the luggage compartment floor subassembly owing to the omission of the exhaust system (in particular of the end muffler) and/or of an activated carbon filter and/or of an SCR tank, which has a corresponding effect on the usable luggage compartment volume.

Correspondingly, in one embodiment of the invention, the second luggage compartment floor subassembly is designed such that, in its rear region in the installed position in the motor vehicle, it is arranged higher, at least in certain sections, than the first luggage compartment floor subassembly (for example the purposes of accommodating an end muffler).

The front region of the luggage compartment floor subassembly will also be referred to in the context of the present invention as "front luggage compartment floor". Correspondingly, the rear region of the luggage compartment floor subassembly will also be referred to in the context of the present invention as "rear luggage compartment floor".

In one embodiment of the invention, the first luggage compartment floor subassembly is designed such that, in the installed position in the motor vehicle, it can, at its underside, accommodate at least one electric motor and/or different electric motors and/or a rear axle. Here, the expression "accommodate" encompasses all conceivable types of attachment and/or fastening of the electric motor and/or of a rear axle, including an integration directly into the body structure, the provision of a housing and/or the attachment of a rear-axle member (which itself can also be utilized as an attachment element for the electric motor).

In one advantageous embodiment of the invention, in the case of the motor vehicles with "combustion drive", the floor region of the bodyshell structures is formed by a combination of the second floor panel subassembly with the second luggage compartment floor subassembly. A relatively large vehicle interior compartment can thus be realized in the region of the floor panel subassembly. Owing to the relatively small structural space requirement below the front region of the luggage compartment floor subassembly, a relatively large luggage compartment is realized. In the case of this combination, the rear region of the luggage compartment floor subassembly provides sufficient structural space in particular for the one or more end mufflers of the exhaust system, together with a rear luggage compartment floor arranged at a relatively high level, and a resulting small stowage volume in the luggage compartment.

Here, it is also possible for different mufflers to be provided, for example in a manner dependent on the power output of the combustion engine and/or the type of drive ("combustion drive" or "hybrid drive").

In one advantageous embodiment of the invention, in the case of the motor vehicles with "hybrid drive", the floor region of the bodyshell structures is formed by combination of the first floor panel subassembly with the second luggage compartment floor subassembly. This combination provides sufficient structural space for the arrangement of at least one battery underneath the floor panel subassembly.

Likewise, in the case of the motor vehicles with "combustion drive" or "hybrid drive", the structural space underneath the luggage compartment floor subassembly can be designed for the installation of different rear axles or rear-axle systems. In the case of a motor vehicle with "standard drive", the combustion engine is arranged in front of the passenger cell. The rear wheels are driven via a driveshaft that is guided in the central tunnel to the rear of the motor vehicle. In the case of a motor vehicle with front-wheel drive, the driveshaft, and a transmission at the rear axle, are omitted, such that less structural space is required for the rear axle. A motor vehicle with front-wheel drive furthermore requires less structural space in the central tunnel owing to the omission of the driveshaft.

Furthermore, in the case of a motor vehicle with "combustion drive" or "hybrid drive" and with front-wheel drive, the exhaust system may be designed so as to have one or more end mufflers in the region under the passenger cell, that is to say in the (front) region of a central tunnel. More structural space is thus available in the rear section of the motor vehicle, for example for accommodating a relatively large fuel tank in the region of the so-called heel plate. Owing to the omission of an exhaust line and end muffler in the region of the luggage compartment floor subassembly, more volume is also available here in the luggage compartment and/or underneath the luggage compartment floor subassembly.

In the case of motor vehicles with "hybrid drive" with front-wheel drive by a combustion engine, the driveshaft to the rear axle is omitted, such that the region under the floor panel subassembly can be utilized virtually entirely for accommodating the battery or batteries. Here, the electric motor of the "hybrid drive" may likewise act on the front axle of the motor vehicle. Alternatively, in the case of a "road-coupled all-wheel drive vehicle" with front-wheel drive by a combustion engine, the electric motor is arranged in the rear end of the motor vehicle.

In one advantageous embodiment of the invention, in the case of the motor vehicles with "electric drive", the floor region of the bodyshell structures is formed by combination of the first floor panel subassembly with the first luggage compartment floor subassembly. This combination provides sufficient structural space underneath the floor panel subassembly for the arrangement of at least one battery. Furthermore, this drive concept requires a relatively large amount of structural space underneath the front region of the luggage compartment floor subassembly for the purposes of accommodating at least one electric motor in the region of the rear axle. Owing to the absence of an exhaust system, however, it is possible under some circumstances to realize a relatively large luggage compartment above the rear region of the luggage compartment floor subassembly, which compensates for the loss of stowage space in the front region of the luggage compartment floor subassembly.

In one advantageous embodiment of the invention, the bodyshell structure of the motor vehicles is designed, in the region underneath a bulkhead of the motor vehicles, such that different batteries can be attached in this region. It is thus possible in particular for the different batteries in the case of motor vehicles with "electric drive" and in the case of the motor vehicles with "hybrid drive" to be attached to a uniform bodyshell structure. The different batteries may in this case be fastened to the bodyshell structure by means of correspondingly designed brackets. The brackets may be provided either on the bodyshell structure or on the batteries or both on the bodyshell structure and on the batteries.

The expression "in the region underneath the bulkhead" defines the position of the attachment of the battery to the bodyshell structure in a longitudinal direction of the motor vehicle. The battery is preferably attached directly or indirectly to the front longitudinal members (engine bearers) that end in this region.

For this purpose, in the region of the end sections of the front longitudinal members, a multiplicity of screw connection points is provided in order to enable the battery or batteries to be attached to the bodyshell structure in correspondingly rigid fashion. Here, for example in the case of a motor vehicle with "electric drive", all screw connection points provided are utilized for the attachment of the battery, whereas in the case of a motor vehicle with "hybrid drive", only some of the screw connection points are utilized for the attachment of the battery or batteries. The screw connection points not required for the fastening of the battery or batteries may for example be utilized for the attachment of specific stiffening means and/or shear panels.

Analogously, the region of the side longitudinal members of the motor vehicles may be configured for the attachment of different batteries. It is thus possible in particular for the different batteries in the case of motor vehicles with "electric drive" and in the case of the motor vehicles with "hybrid drive" to be attached to a uniform bodyshell structure. It is preferable here for different brackets to be provided on the batteries. It is however self-evidently also possible for brackets to be provided on the bodyshell structure or both on the bodyshell structure and on the batteries.

The batteries may differ in terms of external size by way of correspondingly different dimensions. Likewise, "batteries of different size" may also differ in terms of their storage capacity, that is to say in the amount of charge that can be drawn.

In the case of motor vehicles with "hybrid drive" and in each case one battery to the right and to the left of a central tunnel (wherein the two batteries may be connected to one another in the form of a preassembled unit), aside from an attachment of the batteries in the region underneath the bulkhead, the batteries may also be attached to the bodyshell structure at their inner sides pointing toward the central tunnel.

In one embodiment of the invention, provision is made for the region of the side longitudinal members of the motor vehicles to be equipped with a pattern of holes which has a multiplicity of screw connection points, wherein the pattern of holes is configured for the screw fastening of different batteries. By means of this design of the pattern of holes, it is possible in particular for different batteries to be attached in the case of motor vehicles with "electric drive" and in the case of the motor vehicles with "hybrid drive". Here, different brackets may be provided on the batteries.

For example, the following configurations are possible: the different batteries or the brackets thereof utilize the pattern of holes on the bodyshell in an identical manner with all screw connection points. Alternatively, the screw connection points are partially shared by the different batteries or the brackets thereof, but at least one screw connection point is utilized only by one battery. In the stated alternative, it is important that the screw connection points utilized by the different batteries or the brackets thereof are spaced apart from one another such that there is no overlap of the screw connection points and/or no mutual weakening of the screw connection points.

The same applies analogously to the fastening of the battery or batteries in the region underneath the bulkhead.

The screw connection points for the batteries may advantageously also be utilized for the installation of the batteries, as pegging holes (alignment points) for receiving joining pins.

The pegging holes serve for the exact positioning of the battery or batteries, for example, during the installation process, in that, during the mounting of the battery or batteries onto the motor vehicle, at least one pin provided on an installation tool engages into the at least one pegging hole and thus positions the installation tool with the battery situated thereon on the motor vehicle in an exact manner before the screw connection of the battery to the bodyshell structure is performed.

In the case of floor panel subassemblies of different length, the batteries may be used in an identical manner irrespective of the structural spaces of different size in a vehicle longitudinal direction that are available underneath the floor panel subassemblies. Alternatively, it is possible to use different batteries (in particular batteries of different length) with the floor panel subassemblies of different length.

In the case of the motor vehicles with "hybrid drive", it is preferable for one battery to be provided on each side of the vehicle. Instead of one right-hand battery and one left-hand battery, it is self-evidently also possible for two or more batteries to be provided on each side of the vehicle. In the case of a motor vehicle with "hybrid drive", it is basically also possible for one battery or multiple batteries to be provided only on one side of the central tunnel, and for the structural space on the other side of the central tunnel to be occupied by other components, for example by a fuel tank of correspondingly flat design. In the case of the motor vehicles with "electric drive", it is preferable for a single battery to be provided (this means a multiplicity of battery cells in a single battery housing). This battery preferably extends over a major part of the width of the floor panel subassembly.

In one embodiment of the invention, the two floor panel subassemblies are designed, at their front end sections, so as to be connectable to a common bulkhead. It is achieved in this way that, irrespective of the floor panel subassembly that is used, the front-end structure can be of uniform design in the region of the bulkhead. If different central tunnels are used in the two floor panel subassemblies, then the front end sections of the central tunnel are preferably also of identical design so as to be connectable to a common bulkhead. This standardization reduces the costs for the production of the motor vehicles with the three different drive concepts.

In a further embodiment of the invention, it is preferably the case that, in the motor vehicles with "hybrid drive", additional screw connection points are provided in the region of the central tunnel, preferably at the tunnel boundary, for the attachment of the left-hand and of the right-hand battery or batteries at their longitudinal side facing toward the center of the vehicle.

The screw connection points may also serve as pegging holes (alignment points) for the manufacturing systems for the production of the motor vehicles with "hybrid drive", and possibly also in the case of the motor vehicles with "combustion drive".

Depending on the motor vehicle, a driveshaft and/or at least one exhaust line and/or at least one media line and/or at least one electrical line may be accommodated in the structural space delimited by the central tunnel.

In order to adapt the region of the central tunnel to the requirements of the motor vehicles of the individual drive concepts, "adaptation parts" are provided, for example in the form of tunnel reinforcements for a driveshaft center bearing (not in the case of motor vehicles with "electric drive").

In one body of the invention, the two floor panel subassemblies have different central tunnels.

In a further embodiment of the invention, the different central tunnels are configured such that they can accommodate a uniform central console on their upper side in the interior compartment of the motor vehicle. Here, by way of example, at least one tunnel top panel is mounted onto the top side of the central console, wherein the at least one tunnel top panel is configured for the attachment of the common central console. The tunnel top panel is preferably likewise a common component.

In one embodiment of the invention, in the case of the motor vehicles with "hybrid drive" which have in each case at least one battery to both sides of the central tunnel, at least one battery bridge is provided which connects the two batteries to one another in the sense of a preassembled unit such that the batteries can be inserted as a unit, for example together with the drivetrain, into the floor panel subassembly. The at least one battery bridge is designed such that it can withstand the loads during the loading and unloading of transport vehicles, during transport, during warehousing, during installation and during servicing (when the battery is for example dismounted in a workshop). The electrical lines and possibly further lines (for example for a cooling medium) are preferably also integrated into the preassembled unit.

Furthermore, in the case of the motor vehicles with "hybrid drive", after the batteries have been installed, stiffening bridges may additionally be provided which connect the two batteries to one another. In this way, a load path is created that allows the transmission of forces from the right-hand battery into the left-hand battery (and vice versa). Thus, by means of the batteries that have been screwed to the bodyshell structure of the motor vehicle, stiffening of the bodyshell structure is achieved by virtue of the batteries being integrated as force-accommodating components into the bodyshell. By means of the battery bridges and in particular by means of the stiffening bridges, significant stiffening of the bodyshell structure is achieved, in particular in a transverse direction of the motor vehicle. This increased stiffness in a transverse direction of the motor vehicle is advantageous for example in the event of a side-on crash. A significant increase in torsional stiffness can also be achieved by means of the at least one battery bridge and/or the at least one stiffening bridge. An improvement in the vibration behavior of the vehicle as a whole is also achieved by means of the at least one battery bridge and/or the at least one stiffening bridge.

The at least one battery bridge and/or stiffening bridge is preferably arranged detachably on the batteries.

In one possible embodiment of the invention, it is for example the case that two (or more) battery bridges are provided for the "cohesion" of the two batteries, and/or two (or more) stiffening bridges are provided for the introduction of force and transmission of force in the event of a side-on crash.

Furthermore, at least one tunnel reinforcement may be provided in the region of the central tunnel. The tunnel reinforcement is preferably configured as a sheet-metal component. The tunnel reinforcement is attached preferably by spot welding or roller welding. The tunnel reinforcement is advantageously mounted onto the inner side of the central tunnel. Through the stiffening of the region of the central tunnel, greater stability of the bodyshell structure in a transverse direction of the motor vehicle is achieved, with advantages with regard to the stiffness in the event of a side-on crash and/or with regard to the vibration behavior of the vehicle as a whole. Furthermore, a tunnel reinforcement can reinforce regions of the central tunnel into which a separate introduction of force occurs, as is the case for example at a bearing, which is arranged on the central tunnel, for a driveshaft (only in the case of vehicles with "combustion drive" or "hybrid drive").

In one advantageous embodiment of the invention, the fuel tank is arranged in front of the rear axle both in the case of the motor vehicles with "combustion drive" and in the case of the motor vehicles with "hybrid drive". Thus, a uniform filling system for the fuel, for example with the same filling pipes, can be provided for both motor vehicles.

The fuel tanks for the motor vehicles with "combustion drive", on the one hand, and with "hybrid drive", on the other hand, are however in principle of different design. In the case of motor vehicles with "hybrid drive", during driving in the purely electric mode and thus when fuel is not being extracted, a pressure build-up occurs in the fuel tank, which necessitates the use of a pressure tank, composed preferably of steel, in the case of these motor vehicles.

A further aspect of the invention will be discussed below, which consists in that a uniform "body" (that is to say a uniform bodyshell structure with uniform external skin components) can be used for the motor vehicles with the different drive concepts. In order to be able to realize such a uniform body, "raising" of the motor vehicle (in relation to a conventional motor vehicle with "combustion drive" or a motor vehicle "with hybrid drive" according to the prior art) is necessary for all motor vehicles of one vehicle type, along with further measures (such as adaptation of the "silhouette", larger wheels, etc.), which will be discussed in more detail below.

This "raising" is technically necessary only in the case of "low" motor vehicles, for example sedans, motor vehicles of combination design, coupes, cabriolets etc. In the case of "high" motor vehicles, that is to say motor vehicles that have a relatively high seating arrangement, such as "Sport Utility Vehicles", SUV, or "Sport Activity Vehicles", SAV, "raising" can possibly be omitted.

In the case of the motor vehicles with "electric drive" and with "hybrid drive" derived therefrom, the "raising" of the floor panel subassembly ensures sufficient ground clearance in the case of the motor vehicles with these two drive concepts, too, which have at least one battery arranged at the underside of the floor panel subassembly.

This sufficient ground clearance is achieved inter alia by virtue of the motor vehicles according to the invention of all three drive concepts having, at the front axle and/or at the rear axle, "wheel sizes" (this means the diameter of a wheel/tire combination) which have an enlarged diameter in relation to a similar motor vehicle with (only) a "combustion drive". In this way, aside from the "raising" of the floor panel subassembly, the required higher wheel load in the case of the motor vehicles with "electric drive" and "hybrid drive", which is required owing to the weight of the battery or batteries, is also allowed for. A side effect here is however that, in the group of motor vehicles according to the invention, the motor vehicles with "combustion drive" also have wheels of larger dimensions than would be necessary for purely technical reasons. The reason for this is the realization of a uniform outer skin with uniform wheel apertures and with wheels "matching" these in the case of all motor vehicles of the group of motor vehicles according to the invention, irrespective of the drive concept.

For the invention, it is essential that the two floor panel subassemblies each have uniform attachment regions ("interfaces") to a bodyshell that is otherwise uniform, at least in subregions, for all three drive concepts. In other words, the attachment regions of the two floor panel subassemblies are designed such that they can, across all three drive concepts, be connected to a common front end (front-end subassembly) and/or a common rear end, also referred to as rear-end structure (luggage compartment floor subassembly). For example, the attachment regions of the floor panel subassemblies to the bulkhead, and the bulkhead itself, are designed in the manner described above.

With this concept, it is possible for the body shells of all motor vehicles of the group of motor vehicles according to the invention to be provided with a uniform outer skin, that is to say with uniform front side walls ("fenders"), uniform side walls with uniform door apertures, uniform roof paneling, uniform doors and/or uniform front and/or rear flaps.

In a further detail configuration, it is possible, in the sense of a standardization of the outer skin, to use the tank flap for the filling of fuel in the case of the motor vehicles with "combustion drive" to also be used, in the case of the motor vehicles with "electric drive", as a charging flap for an electric plug. It is likewise possible for the charging flap of the motor vehicles with "hybrid drive" to also be utilized as an additional charging flap for the motor vehicles with "electric drive".

The commonality of bodyshell and/or outer skin can advantageously also be continued in the interior equipment of the motor vehicles with the three drive concepts. For example, seats, instrument panel supports, instrument panels, central consoles and/or interior trim panels can be of common design.

Irrespective of the different embodiment of the two luggage compartment floor subassemblies, it is for example possible for the trim panels in the interior of the luggage compartment to be of identical design, for example the side trim panels.

It is furthermore advantageous if electrical components (for example loudspeakers, in particular subwoofers, amplifiers, current distributors, rear flap function module, trailer device) of the motor vehicles of at least two, ideally of all three, drive concepts are identically located, or at least the cable connection locations for the individual electrical components are identical.

By contrast, owing to the floor panel subassemblies at different "heights", the components underneath the seat plane, that is to say in particular seat transverse members and floor linings, are different for example in the case of the motor vehicles with "combustion drive", on the one hand, and in the case of the motor vehicles with "electric drive" or "hybrid drive", on the other hand, in order to realize a uniform seating position in the individual motor vehicles.

It is preferable for attachment parts to the bodyshell, for example front and/or rear bumpers, to have the same interfaces for installation in the motor vehicles of all three drive concepts. The attachment parts themselves may be geometrically identical or geometrically different. Different external designs of the rear bumper, for example, are used in a motor vehicle with "electric drive" because no exhaust system with a large-volume end muffler is present here. Analogously, the front bumpers may also be designed differently in accordance with the different cooling air requirement of the motor vehicles of the individual drive concepts. It is self-evidently also possible for the bumpers to be configured differently for design reasons, for example for the purposes of externally differentiating the motor vehicles of the individual drive concepts.

The invention furthermore has the advantage that the luggage compartment of the motor vehicles according to the invention with "hybrid drive" is not restricted by the accommodation of a battery or of a fuel tank. Thus, even in the case of motor vehicles with "hybrid drive", a luggage compartment is obtained which corresponds in terms of its size to the luggage compartment of motor vehicles with "combustion drive". In this way, the "hybrid drive" drive concept can be realized even with body variants of motor vehicles that do not have a sufficient luggage compartment volume for accommodating a battery or a fuel tank and/or which do not have a suitable geometrical design of the luggage compartment, such as coupes or cabriolets.

In one embodiment of the invention, the body subassemblies may additionally be designed such that the respective drive types with their "core components" that are required for performing the drive function can be used in different, wide-ranging vehicle categories.

For this purpose, reference is made to the applicant's patent application WO 2016/192921 A1, already mentioned in the introduction, from which it is known to form groups of motor vehicles of different vehicle categories through the combination of at least two front-end modules with different spacings of the engine bearers and at least two passenger cell modules with different spacings of the front seats.

The entirety of the disclosure of the applicant's WO 2016/192921 A1 is hereby explicitly incorporated into the present patent application.

In this context, a group of motor vehicles is to be understood to mean the entirety of the motor vehicles of at least one first and one second vehicle type series, wherein the two vehicle type series belong to different vehicle categories. It is self-evidently also possible for the bodyshells of more than two vehicle type series to be combined to form one group of motor vehicles.

The expression "vehicle category" (the expression "vehicle segment" is also used) relates to the categorization of motor vehicles in a manner dependent on their shape, their size and/or their price point. For example, the European Commission has defined the following vehicle categories for the purposes of market definition in the context of competition law: city cars, small cars, medium cars, large cars, executive cars, luxury cars. The German Federal Motor Transport Authority distinguishes between the following vehicle categories: minis, small cars, compact category, mid-size category, upper mid-size category, full-size category. Aside from these, there are further categories, for example for all-terrain vehicles, sportscars, cabriolets, minivans, and multipurpose vehicles.

The core concept here is to provide a "front-end module" and a "passenger cell module", wherein the two modules, despite being of different embodiment, are combinable without limitation, and in this way motor vehicles in different vehicle categories can be formed. It is an underlying concept here, on the one hand, to provide the front-end module with different engine bearers spacings and, on the other hand, to provide the passenger cell module with different spacings of the front seats, but to otherwise design as many connection dimensions as possible to be uniform in the case of both modules. It is thus possible for standardized interfaces to be provided in order to be able to combine the two modules with one another irrespective of their different embodiments and/or to be able to use a large number of components uniformly across all of the vehicle categories.

This core concept is also combinable with the present invention in unlimited fashion: on the one hand, it is possible here to realize different "front-end modules" by variation of the engine bearers spacings on the "front-end subassembly". Here, in the case of motor vehicles with "combustion drive", the "second front-end subassembly" is used. In the case of motor vehicles with "hybrid drive" or with "electric drive", the "first front-end subassembly" is used. On the other hand, different "passenger cell modules" can be realized through variation of the spacings of the front seats. Here, in the case of motor vehicles with "combustion drive", the "second floor panel subassembly" is used. In the case of motor vehicles with "hybrid drive" or with "electric drive", the "first floor panel subassembly" is used. With regard to the attachment of the luggage compartment floor subassembly, basically all of the combination possibilities discussed above are available.

Through the adaptation of the design according to the invention (with different front-end subassemblies and/or floor panel subassemblies) to the combination possibilities known from WO 2016/192921 A1 with different "front-end modules" and "passenger cell modules", it is possible in a particularly simple manner in terms of manufacturing to produce motor vehicles of different vehicle categories (for example vehicles of different "size") with each of the three drive concepts "combustion drive", "electric drive" or "hybrid drive". In this way, exceptionally great manufacturing flexibility is achieved, together with cost savings owing to the use of identical parts both for realizing the different vehicle categories and for realizing the different drive concepts.

By means of this arrangement, it is possible in a particularly efficient manner to create a range of widths at the front-end module for different drive units and a range of widths at the passenger cell module for different interior compartment widths. These two measures are, self-evidently not exclusively but significantly, suitable for a differentiation of motor vehicles of different vehicle categories.

"Different spacing of the front seats" is to be understood to mean that this spacing actually has an effect on the seating position of an occupant, that is to say a greater spacing of the front seats results in a greater spacing between the occupants, that is to say the so-called H-points (hip points) or R-points (seat reference points) of the occupants are situated differently far apart in a vehicle transverse direction Y owing to the different spacing of the front seats. It is essential to generate adequate seat spacings in accordance with the vehicle categories. In addition to the spacing of the front seats to one another, the passenger cell modules may also have different positions of the seats in a vehicle longitudinal direction X.

By means of this refinement, it is advantageously possible to realize motor vehicles in several vehicle classes, for example motor vehicles in the full-size class, in the upper mid-size class and in the mid-size class. This may also encompass the realization of further motor vehicles derived from the individual vehicle classes, such as all-terrain vehicles, sportscars, cabriolets, minivans, multi-purpose vehicles etc.

The advantageous combination possibilities of the underlying concept according to the invention of generating motor vehicles with different drive concepts within one vehicle type, on the one hand, and the generation of motor vehicles of at least two vehicle categories, as is known from WO 2016/192921 A1, on the other hand, can be presented in other words as follows:

A first front-end subassembly has two (or more) variants ("front-end modules") with different engine bearers spacings. Likewise, a second front-end subassembly has two (or more) variants ("front-end modules") with different engine bearers spacings. To use illustrative terms, "narrow" and "wide" front-end modules are realized by way of the different engine bearer spacings.

There is an analogous situation with the two floor panel subassemblies: each of the two floor panel subassemblies may be equipped with two (or more) "passenger cell modules" with different spacings of the front seats. Correspondingly, "narrow" and "wide" passenger cell modules are realized by way of the different spacings of the front seats, that is to say width scaling is achieved.

A matrix for realizing motor vehicles is thus created, in which it is not only possible to realize motor vehicles of one vehicle type with different drive concepts, but it is also possible to realize motor vehicles of at least one further vehicle type, wherein the motor vehicles of the at least two vehicle types belong to different vehicle categories. Thus, in an advantageous manner in terms of manufacturing, it is possible to realize motor vehicles of different vehicle categories using identical "front-end modules" and "passenger cell modules", wherein the "front-end modules" and the "passenger cell modules" differ in terms of their front-end subassemblies and/or in terms of their floor panel subassemblies in the manner described above in accordance with the drive concept.

In conjunction with the described combination possibilities, the expressions "front-end subassembly" and "front-end module", on the one hand, and "floor panel subassembly" and "passenger cell module", on the other hand, at least partially refer to the same bodyshell structures. There is thus an overlap or congruence of the bodyshell structures denoted by these different expressions. Nevertheless, the different expressions stated are used in order to systematically maintain a distinction between the two fundamentally different approaches (different drive concepts within one vehicle type, on the one hand, and motor vehicles of different vehicle categories, on the other hand).

In practice, a matrix of for example four front-end subassemblies/front-end modules is hereby spanned, specifically two first front-end subassemblies (one with a small spacing of the engine bearers and one with a larger spacing of the engine bearers) and two second front-end subassemblies (of which, in turn, one has a small spacing of the engine bearers and one has a larger spacing of the engine bearers). This example is analogously transferable to the matrix of floor panel subassemblies/passenger cell modules.

The embodiment of the above-stated body subassemblies achieves, on the one hand, derivability of the individual drive concepts within one vehicle type and, on the other hand, an expansion across all segments into at least two vehicle classes. Here, identical parts are targetedly used in the bodyshell structure of the motor vehicles. Where possible, use is also made of components which are identical and/or scaled and/or adapted across all drives and segments, which components are expensive in particular in the case of the motor vehicles with "electric drive" and/or "hybrid drive", such as drive batteries, electric motors (control units (in particular for BEV/PHEV), wiring harnesses, but also transmissions, combustion engines, exhaust systems (both "hot end" and end mufflers), cooling systems, articulated shafts, driveshafts, activated carbon filters, fuel tanks and/or SCR containers etc.

The invention furthermore relates to a method for producing a group of motor vehicles of one vehicle type, wherein the motor vehicles comprise the three different drive concepts of "combustion drive", "electric drive" and "hybrid drive". Through the reduction to two different floor panel subassemblies with installation positions at different heights in the motor vehicle, the number of deep-drawing tools that is required is reduced. A further decisive factor in the case of the method according to the invention is that the floor panel subassembly with the higher installation position is used for the production of bodyshell structures both of the vehicles with "electric drive" and for the production of the motor vehicles with "hybrid drive". Thus, it is possible even in the case of the motor vehicles with "hybrid drive" to install a relatively large battery "of areal design" at the underside of this floor panel subassembly that is "situated at a higher level". A core concept of the invention is thus to use the "architecture" of the motor vehicles with "electric drive" as a basis for the production of the motor vehicles with "hybrid drive".

It is also possible "within" one of the three drive concepts considered in the context of the present invention to use different components of the exhaust system and/or different fuel tanks and/or different electric motors and/or different batteries in accordance with "motor/engine variant" (for example gasoline or diesel engine, motor/engine power, battery capacity) and/or drive type (front-wheel drive, rear-wheel drive, all-wheel drive) of the respective motor vehicle. It is self-evidently necessary for the two floor panel subassemblies and the two luggage compartment floor subassemblies to be designed correspondingly for these variants within one drive concept.

The position terms "front" and "rear", "top" and "bottom", "right" and "left" etc. used in the context of the present invention, and expressions derived therefrom, relate to the installed position of the respective components in the motor vehicle, and to the direction of travel of the motor vehicle during forward travel.

The present invention relates to the realization of an architecture of bodyshell structures for motor vehicles with the three drive concepts "combustion drive", "electric drive" and "hybrid drive". The invention also encompasses a group of motor vehicles of one vehicle type with three different drive concepts in which the drive concept "fuel cell", that is to say an electric motor drive with an electricity-generating unit fed with hydrogen, is provided instead of one of the three drive concepts mentioned above.

Possible exemplary embodiments of the invention are illustrated in the drawings and will be discussed in more detail below. FIG. 2d and FIG. 6 relate to embodiments according to the prior art.

BRIEF DESCRIPTION OF THE DRAWINGS

FIGS. 2a, 2b, 2c are illustrations corresponding to FIG. 1 of three motor vehicles of one vehicle type with different drive concepts.

FIGS. 2d, 2e, 2f are illustrations corresponding to FIG. 1 of further motor vehicles.

FIGS. 3a, 3b, 3c are schematic illustrations corresponding to FIGS. 2a, 2b, 2c of three motor vehicles of one vehicle type with different drive concepts, in each case as a cross section in accordance with the section line III-III in FIG. 1.

FIG. 6 is a perspective view of the drive train and the power supply of a motor vehicle with "hybrid drive", according to the prior art.

FIGS. 7a to 7c are views corresponding to FIG. 6 of motor vehicles of a group of motor vehicles according to the invention, with "hybrid drive", "combustion drive" and "electric drive".

FIGS. 7d to 7f are views corresponding to FIG. 6 of further motor vehicles.

FIGS. 18 to 20 show matrix-like overviews of an architecture of motor vehicles according to the invention.

DETAILED DESCRIPTION OF THE DRAWINGS

Figure 1:
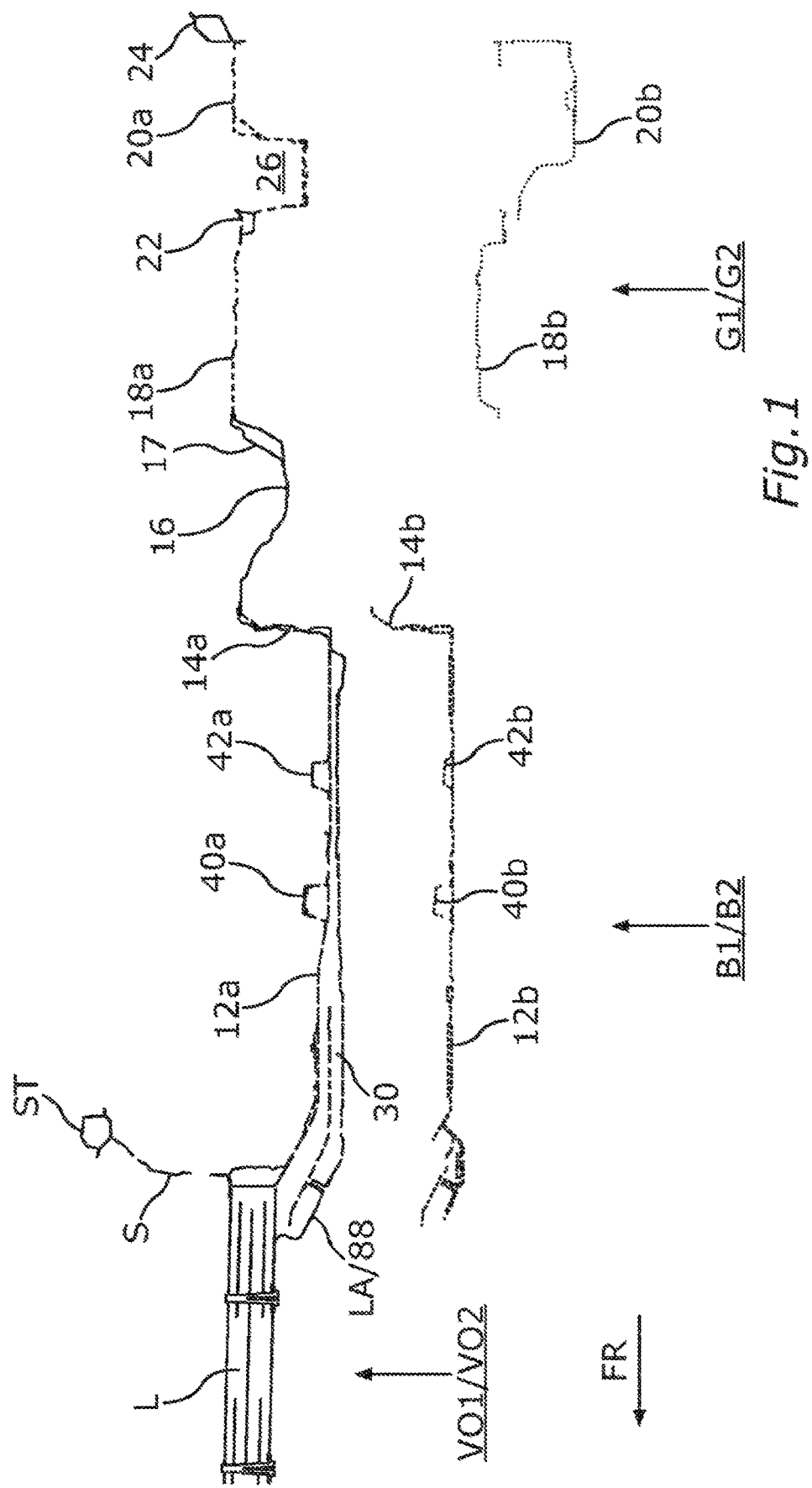
FIG. 1 is a schematic longitudinal section through a floor panel subassembly and through a luggage compartment floor subassembly of a motor vehicle in accordance with the section lines I-I in FIGS. 3a to 3c, for the purposes of illustrating the architecture of a group of motor vehicles of one vehicle type with different drive concepts.

FIGS. 1 to 5 show the bodyshell structure of motor vehicles in the floor region, also referred to as floor subassembly, that is to say in the region of front longitudinal members L (also referred to as engine bearers), of a floor panel subassembly B1 or B2 and of a luggage compartment floor subassembly G1 or G2. Components of the bodyshell structure that are situated above the floor region are not illustrated, with the exception of a bulkhead S and an upper bulkhead member ST. The direction of travel of the motor vehicle during forward travel is denoted in FIGS. 1 and 5 by FR.

The bodyshell structures illustrated in FIGS. 1 to 5 belong to three motor vehicles of the same vehicle type. The three motor vehicles have three different drive concepts and form a group of motor vehicles according to the invention.

The three drive concepts are the drive with a combustion engine ("combustion drive", hereinafter also abbreviated to ICE), with an electric motor ("electric drive", hereinafter also abbreviated to BEV) and with a "hybrid drive" (herein also abbreviated to PHEV).

According to the invention, the motor vehicles of one vehicle type with the three drive concepts have bodyshell structures in the floor region that are formed by two different floor panel subassemblies B1 and B2 and two different luggage compartment floor subassemblies G1 and G2. Corresponding combination of in each case one of the two floor panel subassemblies B1, B2 with one of the two luggage compartment floor subassemblies G1, G2 yields, overall, bodyshell structures for motor vehicles with the stated three drive concepts.

The individual bodyshell structures are illustrated using different types of line: the two different floor panel subassemblies B1 and B2 are illustrated using dashed lines with different dash lengths. The two different luggage compartment floor subassemblies G1 and G2 are illustrated using dotted lines and dashed lines respectively. Components of the bodyshell structures that are uniform for the motor vehicles of all three drive concepts, hereinafter also referred to as common components, are illustrated using solid lines.

Using the terminology of the patent claims, the individual subassemblies are illustrated as follows:
first floor panel subassembly B1 using closely dashed lines
second floor panel subassembly B2 using widely dashed lines
first luggage compartment floor subassembly G1 using dotted lines and
second luggage compartment floor subassembly G2 using dashed lines.

Two different deep-drawing tools (or tool sets) are provided for the production of the two floor panel subassemblies B1, B2. Likewise, two further different deep-drawing tools (or tool sets) are provided for the production of the two luggage compartment floor subassemblies G1, G2.

Furthermore, in FIGS. 2a to 2f, different front-end subassemblies VO, VO1, VO1' and VO2 are indicated, without there being any differentiation between the two front-end subassemblies in the drawing. The differences between the individual front-end subassemblies are discussed in each case with regard to FIGS. 2a to 2f, and are in particular more clearly apparent from FIGS. 12 to 14.

The alphabetic characters a and b added as suffixes to the reference numerals in the drawing denote components of the bodyshell structures that have been produced using a first deep-drawing tool or a second deep-drawing tool, which is different than the first.

FIG. 1 and FIGS. 2a, 2b and 2c show the floor region of the group of motor vehicles according to the invention in longitudinal section, beginning at the front vehicle section with the front longitudinal member L, of which only a central and a rear section are illustrated. The region of the rear end section of the front longitudinal member L is adjoined by the bulkhead S, with its bulkhead member ST at the top. The front longitudinal members L are formed for example by an extruded profile.

The course of the section is denoted in FIGS. 3a, 3b and 3c by the section course lines I-I. Accordingly, FIG. 1 and FIGS. 2a, 2b and 2c each illustrate the section through the right-hand half of the floor region. The left-hand half of the floor region is of substantially axially symmetrical design.

Whilst FIG. 1 illustrates the concept of an architecture with bodyshell structures for different drive concepts, FIGS. 2a, 2b and 2c individually illustrate the bodyshell structures, assembled from the "modules" of FIG. 1, of the three motor vehicles with the different drive concepts. FIG. 2a shows the floor region of a motor vehicle with "combustion drive", FIG. 2b shows the floor region of a motor vehicle with "hybrid drive", and FIG. 2c shows the floor region of a motor vehicle with "electric drive". The respective drive units are not illustrated in FIGS. 2a, 2b and 2c.

The three body subassemblies "front-end subassembly", "floor panel subassembly" and "luggage compartment floor subassembly" are denoted in FIGS. 2a, 2b and 2c by the underlined designations VO1, VO2, B1, B2, G1 and G2.

In accordance with the section course lines I-I, FIG. 1 and FIGS. 2a, 2b and 2c illustrate the region of a right-hand floor panel section 12a or 12b. The approximately horizontally running floor panel sections 12a or 12b transition at a rear side into approximately vertically running heel plates 14a and 14b. These are adjoined by a common region of a seat well 16, followed by a likewise common "front transverse member, rear axle" 17. This is subsequently adjoined by a front luggage compartment floor 18a or 18b, a rear luggage compartment floor 20a or 20b and a common rear-end terminating member 24. A common "rear transverse member, rear axle" 22 is provided between the front luggage compartment floor 18a or 18b and the rear luggage compartment floor 20a or 20b.

Front seat transverse members 40a or 40b and rear seat transverse members 42a or 42b are mounted onto the floor panel sections 12a or 12b.

All motor vehicles according to the invention—irrespective of the drive concept—have in common the fact that the front longitudinal members L end with their rear end sections in the region of the bulkhead S. In this region, attachment parts LA are mounted onto the undersides of the rear end sections of the front longitudinal members. Furthermore, in all motor vehicles according to the invention, supports 88 may be provided which run in a transverse direction of the motor vehicles and which support the region of the rear end sections of the front longitudinal members L and/or of the attachment parts with respect to the side longitudinal members (sills) 32a or 32b. This construction will be described once again on the basis of FIGS. 15 and 16a to 16d.

As per FIG. 2a, in the case of the motor vehicle with "combustion drive", the drive unit is arranged in the region of the front longitudinal members L. Via attachment parts LA which are mounted onto the underside of the front longitudinal members L that end in the region of the bulkhead S, the front longitudinal members L continue in central longitudinal members 30 at the underside of the floor panel section 12a. A fuel tank 50 with a relatively large storage capacity is arranged in the region under the seat well 16. A rear axle (not illustrated) is situated underneath the front luggage compartment floor 18a. The rear luggage compartment floor 20a has a depression 26, in which control units, for example, are accommodated.

Thus, in the case of the motor vehicle with "combustion drive", the bodyshell structure is, in the floor region, made up of the front-end subassembly VO2 (with continuation of the front longitudinal members L into central longitudinal members 30), the floor panel subassembly B2, which is arranged at a lower level, and the luggage compartment floor subassembly G1, which is arranged at a lower level in its front region.

As per FIG. 2b, in the case of the motor vehicle with "hybrid drive", a combustion engine (possibly as a structural unit with an electric motor) is arranged in the region of the front longitudinal members L. The front longitudinal members L end in the region of the bulkhead S and, at their rear end sections, have the abovementioned attachment parts LA and the supports 88. The front longitudinal members L are not continued at the underside of the floor panel section 12b of the floor panel subassembly. The floor panel sections 12b are situated higher than the floor panel sections 12a in order to provide, at their underside, the structural space required for batteries 60. Accordingly, the front and the rear seat transverse members 40b and 42b have a smaller height extent than the front and the rear seat transverse members 40a and 42a as per FIG. 2a, so as to allow identical positioning of the front seats in both motor vehicles. A fuel tank 52 is situated in the region under the seat well 16, the storage capacity of which fuel tank is reduced in relation to the fuel tank 50 owing to the battery 60 which projects beyond the heel plate 14b counter to the direction of travel FR. owing to the floor panel sections 12b that are arranged at a higher level in relation to the floor panel sections 12a of the motor vehicle as per FIG. 2a, the heel plate 14b in the motor vehicle as per FIG. 2b has a smaller height extent than the heel plate 14a. A rear axle (not illustrated) is situated underneath the front luggage compartment floor 18a. The rear luggage compartment floor 20a likewise has a depression 26, in which control units, for example, are accommodated.

Thus, in the case of the motor vehicle with "hybrid drive", the bodyshell structure is, in the floor region, made up of the front-end subassembly VO1 (without continuation of the front longitudinal members L into central longitudinal members 30), the floor panel subassembly B1, which is arranged at a higher level, and the luggage compartment floor subassembly G1, which is arranged at a lower level in its front region.

As per FIG. 2c, in the case of the motor vehicle with "electric drive" (purely electric drive), an electric motor (not illustrated) is arranged underneath the front luggage compartment floor 18b. The region between the front longitudinal members L may remain free from a drive unit, and may accordingly be utilized for example as a luggage compartment or as an accommodating space for control units. Aside from the electric motor in the region underneath the front luggage compartment floor 18b, it is self-evidently also possible for an additional electric motor to be provided in the region between the front longitudinal members L in order to realize electric all-wheel drive. As in the motor vehicle with "hybrid drive" as per FIG. 2b, it is also the case in the motor vehicle with "electric drive" that the front longitudinal members L end in the region of the bulkhead S, without continuation at the underside of the floor panel section 12b.

At the underside of the floor panel sections 12b, which are situated at a higher level (in relation to the floor panel sections 12a), there is arranged a battery 62 which projects into the region under the seat well 16. The seat transverse members 40b and 42b and heel plate 14b correspond to the components of the bodyshell structure as per FIG. 2b.

The front luggage compartment floor 18b is arranged considerably higher than the front luggage compartment floor 18a. In this way, at the underside of the front luggage compartment floor 18b, a structural space is provided for a rear axle (not illustrated) and for the abovementioned electric motor. The usable luggage compartment above the front luggage compartment floor 18b is smaller than in the case of the motor vehicle with the front luggage compartment floor 18a.

The rear luggage compartment floor 20b has (instead of the depression of the rear luggage compartment floor 20a), a bulged portion 27 for providing the required structural space for the components of the motor vehicle with "electric drive". The bulged portion 27 is adjoined by a relatively large depression 28, which allows a larger luggage compartment volume in this rear region of the luggage compartment than in the case of the rear luggage compartment floor 20a. The depression 28 in the rear luggage compartment floor 20b is made possible by the omission of an exhaust system. In relation to this, the rear luggage compartment floor 20a as per FIGS. 2a and 2b runs at a relatively high level in the rear region owing to the end muffler positioned under it.

For the screw connection of the batteries 60 of the motor vehicle with "hybrid drive" (FIG. 2b), brackets 66 are provided on the front end sections of the batteries 60 for the purpose of screw connection to the bodyshell structure in the region of the rear end sections of the front longitudinal members L "at the level" of the bulkhead S, that is to say in the region of a Y-Z plane of the motor vehicle that is spanned by the bulkhead (see the coordinate system in FIG. 6). For this purpose, it is for example the case that four screw connection points V are provided at each side of the vehicle. Since the rear end sections of the front longitudinal members L do not continue at the underside of the floor panel subassembly, the transmission of the forces from the front longitudinal members L takes place via the brackets 66 into the housings of the batteries 60.

Correspondingly, for the screw connection of the battery 62 of the motor vehicle with "electric drive" (FIG. 2c), brackets 68 are arranged on the front end section of the battery 62, which brackets are likewise connected to the bodyshell structure in the region of the rear end sections of the front longitudinal members L. Here, it is for example the case that five screw connection points V to the bodyshell structure, and two screw connection points V to a front subframe, are provided at each side of the vehicle.

Thus, in the case of the motor vehicle with "electric drive", the bodyshell structure is, in the floor region, made up of the front-end subassembly VO1 (without continuation of the front longitudinal members L into central longitudinal members 30), the floor panel subassembly B1, which is arranged at a higher level, and the luggage compartment floor subassembly G2, which is arranged at a higher level in its front region.

It is thus demonstratively shown in FIG. 1 and FIGS. 2*a*, 2*b* and 2*c* how bodyshell structures of motor vehicles of one vehicle type with three different drive concepts can be formed from two floor panel subassemblies B1 and B2 and two luggage compartment floor subassemblies G1 and G2, in combination with two front-end subassemblies VO1 and VO2.

FIGS. 2*e* and 2*f* show further motor vehicles according to the invention in illustrations corresponding to FIGS. 2*a* to 2*c*. Furthermore, for the sake of completeness, FIG. 2*d* illustrates the construction of a motor vehicle with "hybrid drive" according to the prior art. In FIGS. 2*d* to 2*f*, the three body subassemblies "front-end subassembly", "floor panel subassembly" and "luggage compartment floor subassembly" are denoted by the boxed designations VO, VO1/VO1', B, B1, G, G1 and G2.

FIG. 2*d* shows a motor vehicle with "hybrid drive" according to the prior art, with a combustion engine in the region of the front longitudinal members L and an electric motor integrated into a transmission. The front longitudinal members L continue at the underside of the floor panel section 112 into central longitudinal members 130. A battery 160 is arranged in the region under the seat well 116. A fuel tank 150 is situated underneath a front luggage compartment floor 118, which is situated at a very high level and which thus greatly restricts the luggage compartment volume. The rear luggage compartment floor 120 has a depression 126 in which control units, for example, are accommodated. The subassemblies of the bodyshell structure in the floor region are denoted by front-end subassembly V, floor panel subassembly B and luggage compartment floor subassembly G.

The known motor vehicle with "hybrid drive" has a front-end subassembly VO, which corresponds to the front-end subassembly VO2, that is to say with continuation of the front longitudinal members L into central longitudinal members 130, a floor panel subassembly B, which corresponds to the floor panel subassembly B2 arranged at a lower level, and a luggage compartment floor subassembly G, which is configured for accommodating the fuel tank 150.

FIG. 2*e* relates to a motor vehicle with "combustion drive", which is derived from the architecture of a motor vehicle with "electric drive". Accordingly, this motor vehicle has the floor panel subassembly B1 arranged at a higher level, which is likewise used in the motor vehicles with "electric drive" and "hybrid drive". The drive unit is a combustion engine arranged in the region of the longitudinal members L, which combustion engine may be configured either as a "longitudinal engine" installed in a longitudinal direction X of the motor vehicle or as a "transverse engine" installed in a transverse direction Y of the motor vehicle. These two stated alternatives will be discussed in more detail further below on the basis of FIGS. 7*d* and 7*e*. The two types of combustion engines necessitate different front-end subassemblies VO1 and VO1' with different longitudinal members L and L' respectively and different attachment parts LA and LA' respectively and different supports 88 and 88' respectively and different brackets 66 and 66' respectively. This will be discussed in more detail in conjunction with FIGS. 7*d* and 7*e*.

Owing to the floor panel subassembly B1 situated at a higher level, a relatively large structural space is available at the underside of the floor panel, such that, for example, a housing 60' or 60" for accommodating components of the motor vehicle can be arranged here. However, the low height of the housing 60' or 60" fundamentally limits the components that can be accommodated. The floor panel subassembly B1 is adjoined to the rear by the luggage compartment floor subassembly G2, which is designed such that it can, at its underside, accommodate the components of an exhaust system.

Thus, in the case of the motor vehicle with "combustion drive" as per FIG. 2*e*, the bodyshell structure is, in the floor region, made up of the front-end subassembly VO1 (longitudinal engine) or the front-end subassembly VO1' (transverse engine), in each case without continuation of the front longitudinal members L or L' into central longitudinal members 30, and the floor panel subassembly B1, which is arranged at a higher level, and the luggage compartment floor subassembly G2, which is arranged at a higher level in its front region.

FIG. 2*f* shows the bodyshell structure in the floor region of a motor vehicle with "hybrid drive", in the case of which a luggage compartment floor subassembly G1 is used with a front-end subassembly VO1' with a "transverse engine", with front-wheel drive, with an exhaust system which ends in the region under the passenger cell, and with a floor panel subassembly B1. As can be seen from FIG. 2*c*, the luggage compartment floor subassembly G1 is assigned to the motor vehicle with "electric drive", and accordingly does not provide any structural space at its underside for the components of an exhaust system. For this reason, the combination illustrated in FIG. 2*f* relates only to motor vehicles in which, as mentioned above, the exhaust system ends in the region of the passenger cell, as will be discussed in more detail below on the basis of FIG. 7*f*.

Thus, in the case of the motor vehicle with "hybrid drive" as per FIG. 2*f*, the bodyshell structure is, in the floor region, made up of the front-end subassembly VO'1 (transverse engine), without continuation of the front longitudinal members L' into central longitudinal members 30, and the floor panel subassembly B1, which is arranged at a higher level, and the luggage compartment floor subassembly G1, which is arranged at a lower level in its rear region.

FIGS. 3*a*, 3*b* and 3*c* show the floor region of a motor vehicle with "combustion drive" and the floor region of a motor vehicle with "hybrid drive" and the floor region of a motor vehicle with "electric drive" respectively, in each case in cross section, in accordance with the section course line in FIG. 1. The respective drive units are not illustrated in FIGS. 3*a*, 3*b* and 3*c*.

FIG. 3*a* shows the following components of the bodyshell structure: left-hand and right-hand floor panel section 12*a*, left-hand and right-hand central longitudinal members 30, left-hand and right-hand tunnel longitudinal reinforcement 31, left-hand and right-hand front seat transverse members 40*a*, screw connection points 29 for the attachment of a left-hand and of a right-hand seat rail, left-hand and right-hand side longitudinal members (sills) 32*a*, central tunnel 36*a*, and tunnel top panel 38. The sills 32*a* are made up of predominantly vertically running sections 33*a* and horizontally running sections 34*a*.

At the inner side of the central tunnel 36*a*, there is provided at least one tunnel reinforcement 90 (see FIG. 5), which is however not visible in FIG. 3*a* owing to the position of the section course line III-III. The free space 37*a* within the central tunnel 36*a* serves for example for accommodating a driveshaft and/or an exhaust line (neither of which is illustrated). An underbody paneling (not illustrated) is provided underneath the floor panel sections 12*a*.

Figure 5:
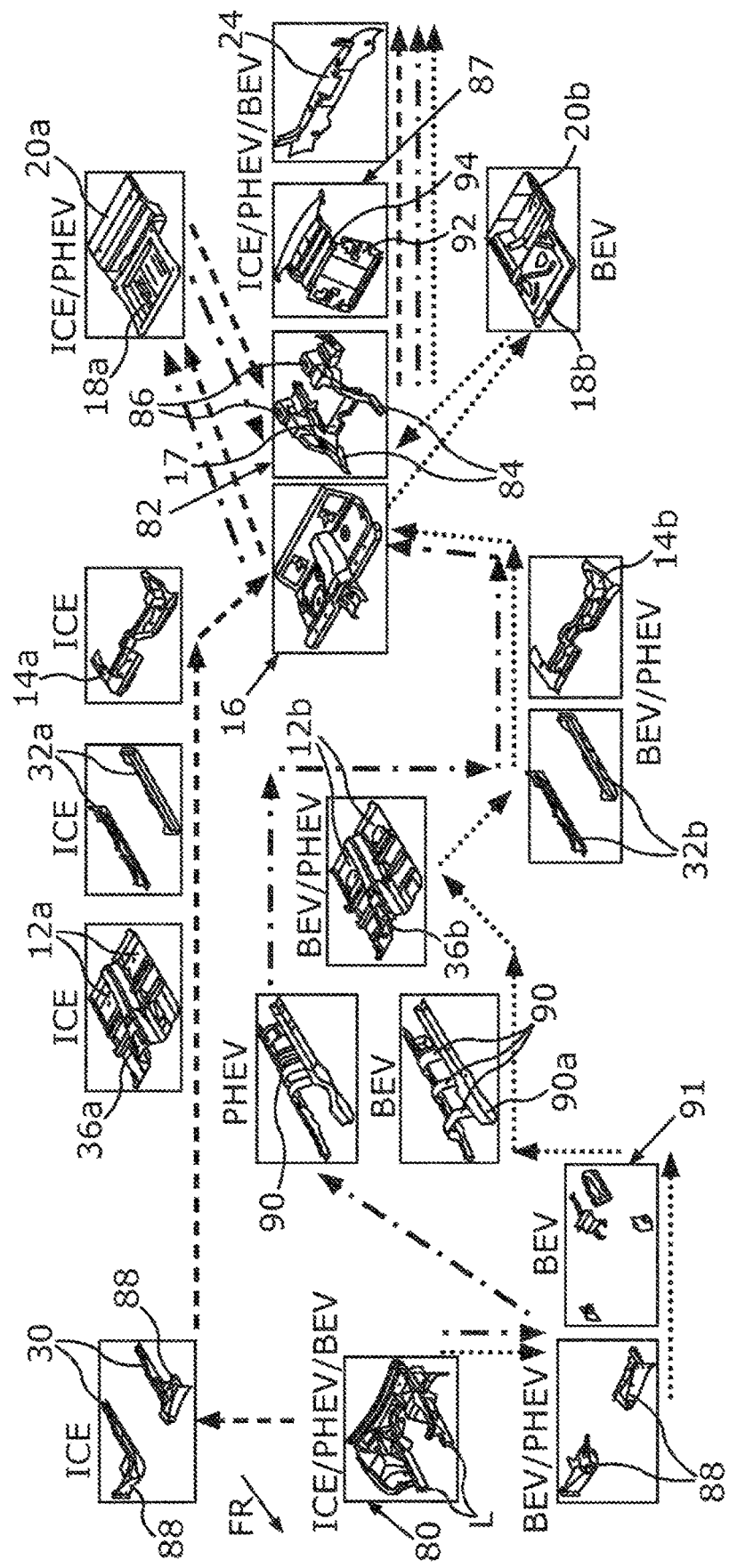
FIG. 5 is a schematic illustration of the architecture of a group of motor vehicles of one vehicle type with different drive concepts, illustrating individual components of the bodyshell structure in a perspective illustration, in the form of a flow diagram for the production of the three different motor vehicles.

The tunnel reinforcement 90 is configured as a U-shaped sheet-metal component which is mounted directly onto the underside of, and connected by spot welding to, the central tunnel 36*a* or 36*b*, which is configured as a sheet-metal component. As is also illustrated in FIG. 5, in the example of the "PHEV" and of the "BEV", a total of three of these tunnel reinforcements 90 are provided. The free limbs of the U-shaped tunnel reinforcements 90 are connected to members 90a which run in a longitudinal direction X of the motor vehicle and which are composed of a sheet-metal material. The tunnel reinforcements 90 are not illustrated in FIG. 5 for the "ICE", but are present in similar form and number. For example, both in the case of the motor vehicles with "combustion drive" and in the case of the motor vehicles with "hybrid drive", a uniform tunnel reinforcement 90 is provided in the region of the bearing for the drive shaft AW. There are also further corresponding features in the motor vehicles with the three drive concepts with regard to the tunnel reinforcements 90, but also different tunnel reinforcements 90. Since the tunnel reinforcements 90 are of only secondary importance for the invention, no further differentiation will be made in this regard.

FIGS. 3b and 3c show the following components of the bodyshell structure: left-hand and right-hand floor panel section 12b, left-hand and right-hand front seat transverse member 40b, screw connection points 29 for a left-hand and a right-hand seat rail, left-hand and right-hand side longitudinal members (sills) 32b, central tunnel 36b, and tunnel top panel 38. The sills 32b are made up of predominantly vertically running sections 33b and horizontally running sections 34b. At least one tunnel reinforcement 90 is provided at the inner side of the central tunnel 36b (see also FIG. 5).

The free space 37b within the tunnel 36b as illustrated in FIG. 3b serves for example for accommodating a driveshaft and/or an exhaust line (neither of which is illustrated). In FIG. 3b, in each case one battery 60 is provided underneath the left-hand and the right-hand floor panel section 12b. The batteries 60 have brackets 61 on the outer side, which brackets are screwed to the sections 34b of the sills 32b. Further screw connection points of the batteries 60 to the bodyshell structure of the motor vehicle are not illustrated.

The free space 37b within the central tunnel 36b as illustrated in FIG. 3c serves for example for accommodating lines for a cooling medium and/or electrical lines (not illustrated). In FIG. 3c, underneath the floor panel sections 12b, a battery 62 extends over the entire width of the underbody, which battery projects with a bulged portion 64 into the free space 37b of the central tunnel 36b. The battery 62 has brackets 63 at both outer sides, which brackets are screwed to the sections 34b of the sills 32b. Further screw connection points of the battery 62 to the bodyshell structure of the motor vehicle are not illustrated.

The central tunnels 36a and 36b are of geometrically uniform design in their upper region and can thus, at their top side, accommodate the commonly configured tunnel top panel 38. The tunnel top panel 38 serves for the attachment of a central console (not illustrated) in the passenger compartment of the individual motor vehicles with the different drive concepts.

It is demonstratively shown in the illustration of FIGS. 3a to 3c that the motor vehicles according to the invention—irrespective of the drive concept—have a central tunnel 36a or 36b which is of common configuration in its upper region, which central tunnel is equipped at its inner side with uniform and/or specific tunnel reinforcements 90. With these tunnel reinforcements 90 designed as "adaptation parts", the specific requirements of the motor vehicles are satisfied in accordance with the drive concept, whilst achieving the most extensive possible commonality of the bodyshell structure.

The cross sections of FIGS. 3a, 3b and 3c illustrate, in conjunction with the longitudinal sections as per FIGS. 2a, 2b and 2c, how bodyshell structures of motor vehicles of one vehicle type with three different drive concepts can be assembled from two floor panel subassemblies B1, B2 and two luggage compartment floor subassemblies G1, G2.

Figure 4A:
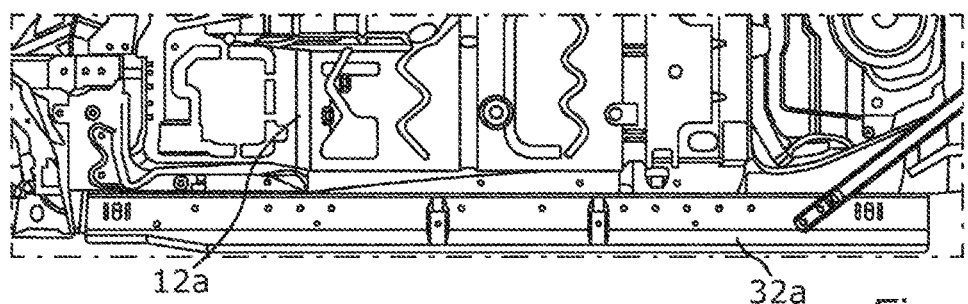
FIGS. 4a, 4b, 4c are views from below of the floor panel subassembly of three motor vehicles with different drive concepts.
Figure 4B:
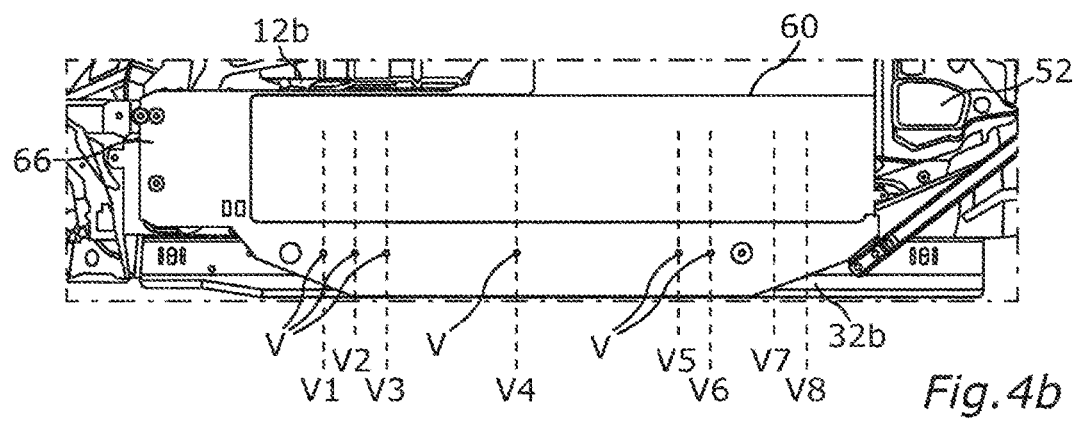
Figure 4C:
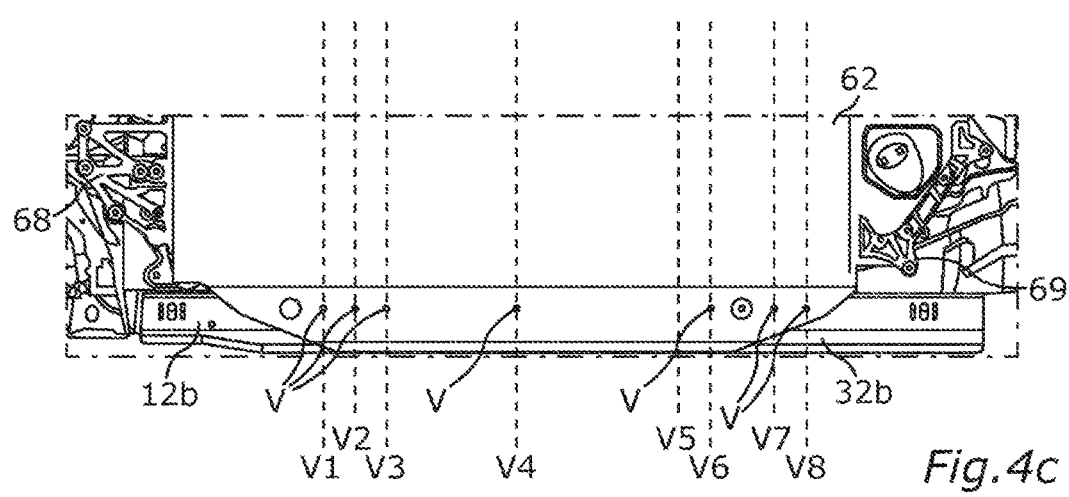

FIGS. 4a, 4b and 4c show views from below of the floor region of a motor vehicle with "combustion drive" and the floor region of a motor vehicle with "hybrid drive" and the floor region of a motor vehicle with "electric drive" respectively.

FIG. 4a shows a view of the underbody of a motor vehicle with "combustion drive", without an underbody paneling being illustrated. The motor vehicle with "combustion drive" has no battery on the underbody.

FIGS. 4b and 4c illustratively show the differences, already illustrated in FIG. 3b and FIG. 3c, between firstly the two batteries 60 (for a motor vehicle with "hybrid drive") and secondly the battery 62 that extends over approximately the entire vehicle width (for a motor vehicle with "electric drive"), and the different attachment thereof to the sills 32b, in a view of the underbody from below. Furthermore, FIGS. 4b and 4c illustrate the attachment of the front end sections of the batteries 60 and of the batteries 62 respectively to the front region of the floor panel section 12b, approximately at the level of the bulkhead S. The fuel tank 52 is also illustrated in FIG. 4b.

Multiple screw connection points V are provided at each side of the vehicle on the horizontal sections 34b of the sills 32b. Lines V1 to V8 which run continuously between FIGS. 4b and 4c and which connect the individual screw connection points V in an aligned manner in a vehicle transverse direction illustrate that the screw connection points V are positioned identically in relation to the vehicle longitudinal direction along the lines V1 to V8 in the case of the motor vehicle with "hybrid drive" (FIG. 4b) and in the case of the motor vehicle with "electric drive" (FIG. 4c). Furthermore, with respect to the vehicle transverse direction, the screw connection points V are also positioned with in each case identical spacings to the central longitudinal plane of the bodyshell structures of the two different motor vehicles.

For the screw connection between the sills 32b of each side of the vehicle and the batteries 60 of the motor vehicle with "hybrid drive" (FIG. 4b), screw connection points V are provided along the lines V1 to V6, that is to say a total of six screw connection points V at each side of the vehicle.

The screw connection between the sills 32b of each side of the vehicle and the batteries 62 of the motor vehicle with "electric drive" (FIG. 4c) is realized by means of screw connection points V along the lines V1 to V4 and by means of the screw connection points V along the lines of V5 to V8, that is to say by means of a total of seven screw connection points V at each side of the vehicle.

The attachment of the batteries 60 and 62 in their front region, as already described in conjunction with FIGS. 2b and 2c, is demonstratively shown particularly clearly in the view from below in FIGS. 4b and 4c. For the fastening of the batteries 60 of the motor vehicle with "hybrid drive" (FIG. 4b), left-hand and right-hand brackets 66 are provided on the front end sections of the batteries 60, which brackets are screwed to the bodyshell structure in the region underneath the bulkhead S. Correspondingly, for the fastening of the battery 62 of the motor vehicle with "electric drive" (FIG. 4c), left-hand and right-hand brackets 68 are arranged on the front end section of the battery 62, which brackets are screwed to the bodyshell structure in the region underneath the bulkhead S.

For the fastening of the batteries 60 and 62 in the side regions of the bodyshell structure of the body of the motor vehicles, the patterns of holes of all screw connection points V are coordinated with one another so as to correspond to the patterns of holes on the brackets 61 and 63 of the batteries 60 and 62. In other words, the individual screw connection points V are positioned either so as to be congruent for the brackets 61 and 63 of the batteries 60 and 62 or so as to be situated so far apart that two mutually independent screw connection points V can be realized. By contrast, an overlap of screw connection points V is ruled out, and it is also ruled out that screw connection points V are situated so close together that, for adjacent screw connection points V, there is not sufficient load-bearing material available to ensure a stable screw connection.

Analogously, for the fastening of the batteries 60 and 62 in the region of the bulkheads S of the respective motor vehicles, the patterns of holes of all screw connection points V on the bodyshell structure are configured so as to correspond to the patterns of holes on the brackets 66 and 68 of the batteries 60 and 62. Here, the principle already discussed above on the basis of the screw connection of the batteries 60 and 62 to the side longitudinal members 32*a* and 32*b* is taken as a basis, according to which a multiplicity of screw connection points is provided which are partially common to the brackets 66 and 68 of the two batteries 60 and 62 and are partially used only by in each case one of the brackets 66 and 68.

The fastening of the battery or batteries 60 or 62 to the bodyshell structure is realized in the region of the end sections of the front longitudinal members L and/or of the attachment parts LA and/or of the supports 88.

The screw connection points on the common rear-end longitudinal members 84 are utilized for the fastening of the rear end sections of the batteries 60 or 62 to the rear-end structure of the motor vehicle.

Furthermore, in the case of the batteries 60 of the motor vehicles with "hybrid drive", battery bridges and/or stiffening bridges are provided between the right-hand and the left-hand battery 60 (not illustrated in FIG. 4*b*).

For the purposes of illustration and of specifying exemplary details of the method according to the invention for producing motor vehicles of one vehicle type with three different drive concepts, FIG. 5 shows a flow diagram with which the "paths" of the assembly of the components of the bodyshell structures will be discussed below, without any more detailed discussion of the structural features of the individual components. Here, the arrows with dashed lines are the path for the production of motor vehicles with "combustion drive", the arrows with dash-dotted lines are assigned to the path for the production of motor vehicles with "hybrid drive", and the arrows with dotted lines are assigned to the path for the production of motor vehicles with "electric drive". Here, the abbreviations ICE, PHEV and BEV discussed above are used in FIG. 5.

With regard to the path of the production of the motor vehicles with "combustion drive" (ICE): at a front-end structure 80, the longitudinal members L are, via the attachment parts LA (not illustrated) and the supports 88, adjoined counter to the direction of travel FR by the central longitudinal members 30, which are welded to the underside of the floor panel sections 12*a*. The floor panel sections 12*a* are joined to the central tunnel 36*a* and to the sills 32*a* to form the floor panel subassembly B2, and are supplemented by the heel plate 14*a*.

This is adjoined by the seat well 16, which is common to all motor vehicles of the group according to the invention.

Adjoining this further counter to the direction of travel FR is the luggage compartment floor subassembly G2, which is made up, at the top side, of the front and the rear luggage compartment floor 18*a* and 20*a* respectively. At the underside, the luggage compartment floor subassembly G2 is supplemented by a rear-end member structure 82. The rear-end member structure 82 has left-hand and right-hand rear-end longitudinal members 84 and left-hand and right-hand rear suspension strut receptacles 86 and is covered by a "partition assembly" 87 with a partition 92 and a rear shelf 94. The two rear-end longitudinal members are connected to one another by the "front transverse member, rear axle" 17. At the rear side, the floor-side bodyshell structure is terminated with the rear-end terminating member 24.

With regard to the path of the production of the motor vehicles with "hybrid drive" (PHEV): the front-end structure 80 with its front longitudinal members L is adjoined, counter to the direction of travel FR by the attachment parts LA (not illustrated) and the supports 88, which serve for accommodating the brackets 66 of the batteries 60. The floor panel sections 12*b* are joined to the central tunnel 36*b* and the sills 32*b* to form the floor panel subassembly B1 and are supplemented by the heel plate 14*b*. The central tunnel 36*b* is equipped at the underside with tunnel reinforcements 90, which are supplemented by members 90*a*.

This is adjoined by the seat well 16 as a common component.

Adjoining this further counter to the direction of travel FR is the luggage compartment floor subassembly G2, which is made up, at the top side, of the front and the rear luggage compartment floor 18*a* and 20*a* respectively. At the underside, the luggage compartment floor subassembly G2 is supplemented by the common subassemblies "rear-end member structure" 82 and "partition assembly" 87. At the rear side, the bodyshell structure is terminated with the rear-end terminating member 24.

With regard to the path of the production of the motor vehicles with "electric drive" (BEV): the front-end structure 80 with its front longitudinal members L is adjoined by the attachment parts LA (not illustrated) and the supports 88 to the rear end sections. This region serves for accommodating the brackets 68 of the battery 62.

This is subsequently followed by holders 91. The holders 91 are component specific to the "electric drive" drive concept, which supplement the common components.

The floor panel sections 12*b* are joined to the central tunnel 36*b* and the sills 32*b* to form the floor panel subassembly B1 and are supplemented by the heel plate 14*b*. The central tunnel 36*b* is equipped, at the underside, with tunnel reinforcements 90, which are in part designed differently to the tunnel reinforcements 90 of the motor vehicles with "combustion drive" and/or with "hybrid drive".

This is adjoined by the seat well 16 as a common component.

Adjoining this further counter to the direction of travel FR is the luggage compartment floor subassembly G1, which is made up, at the top side, of the front and the rear luggage compartment floor 18*b* and 20*b* respectively and in this way provides a luggage compartment which is designed differently in relation to the motor vehicles with "combustion drive" or with "hybrid drive". The luggage compartment floor subassembly G1 is furthermore supplemented by the common subassemblies "rear-end member structure" 82 and "partition assembly" 87, as described above.

FIG. 6 and FIGS. 7*a* to 7*f* explain the invention further. The coordinate system shown in FIG. 6, with the vehicle longitudinal direction X (corresponds to the direction of travel FR), the vehicle transverse direction Y and the vehicle vertical direction Z, applies to all of the figures.

FIG. 6 illustrates a detail of the chassis and drive system of a motor vehicle with "hybrid drive" according to the prior art, omitting the components of the body and of the equipment. The illustrated drivetrain with front and rear wheels VR and HR respectively, including the components of the power supply, specifically shows the following: a front axle VA and a rear axle HA, a combustion engine VM with flange-mounted automatic transmission AG, a driveshaft AW, exhaust lines AL and mufflers SD of an exhaust system, a battery 160, and a fuel tank 152 for gasoline or diesel fuel.

The battery 160 is arranged in front of the rear axle HA, below rear seats which are not illustrated. Said battery is composed of two housing halves that are connected to one another via a bridge. Owing to the limited structural space and the restrictive geometry in this structural space, the number of battery cells that can be accommodated in the battery 160, and thus the achievable capacity of the battery 160, is naturally limited.

The fuel tank 152 is arranged above the rear axle HA, below a luggage compartment which is not illustrated. Owing to the small available structural space, the volume of the fuel tank 152 is limited.

FIGS. 7a, 7b and 7c show motor vehicles from the group of motor vehicles according to the invention in an illustration corresponding to FIG. 6. The motor vehicles according to FIGS. 7a, 7b and 7c correspond to the same vehicle type as the motor vehicle as per FIG. 6, with the same arrangement of front and rear axles VA and HA and the same arrangement and configuration of combustion engine VM, automatic transmission AG, drive shaft AW, exhaust lines AL, mufflers SD, and further components illustrated in the drawing. The motor vehicles illustrated in FIGS. 7d, 7e and 7f have, in part, components arranged differently from this.

FIG. 7a illustrates a motor vehicle with "hybrid drive", FIG. 7b illustrates a motor vehicle with "combustion drive", and FIG. 7c illustrates a motor vehicle with "electric drive".

According to the invention, the motor vehicles as per FIGS. 7a and 7c have a floor panel subassembly (not illustrated) arranged at a higher level than in the motor vehicles as per FIGS. 6 and 7b. As a result of this measure in the "architecture" of the motor vehicles as per FIGS. 7a, 7b and 7c, it is possible for the motor vehicle with "hybrid drive" as per FIG. 7a to be equipped with much larger batteries 60 than is possible in the case of the known motor vehicle as per FIG. 6: this results in a greater "electric range". Furthermore, the batteries 60 are arranged with a low center of gravity in the motor vehicle, with advantages with regard to the driving characteristics of the motor vehicle. Furthermore, the usable luggage compartment is not restricted by a battery 160 arranged in this region (see FIG. 2d). In each case one battery 60 of plate-shaped form is provided to both sides of a central tunnel (not illustrated). The two batteries 60 are attached in each case via brackets 61 and 66 to side longitudinal members (not illustrated) and/or in the region of a bulkhead (not illustrated) and in the rear-end region. Furthermore, the inner side of the central tunnel is equipped with tunnel reinforcements 90 attached by spot welding. Greater stability of the central tunnel is hereby achieved.

The motor vehicle as per FIG. 7a has a fuel tank 52, the storage capacity of which is considerably greater than the storage capacity of the fuel tank 152 of the motor vehicle as per FIG. 6. The fuel tank 52 is arranged in front of the rear axle HA, such that virtually the same installation space is available for the fuel tank 52 as in the case of a motor vehicle with combustion engine. An electric motor is integrated, for example as a "hybrid" drive unit, in the automatic transmission AG. Such an electric motor is for example of disk-shaped configuration. It may be provided as a sole or additional electric motor for the drive of the motor vehicle. The electric motor is for example integrated into the transmission instead of a starting converter. Furthermore, the electric motor acts as a generator for charging the battery of the motor vehicle.

The motor vehicle illustrated in FIG. 7a, with in each case one battery 60 to both sides of the central tunnel, has the abbreviated designation "PHEV1". This, and further abbreviated designations mentioned below, will be used in FIGS. 9 to 11.

FIG. 7b shows a motor vehicle with "combustion drive" from the group of motor vehicles according to the invention, having a combustion engine VM, having a fuel tank 50 which is arranged in a known manner in front of the rear axle HA and behind a so-called heel plate (not illustrated), in the region underneath rear seats which are not illustrated. The combustion engine is installed in a longitudinal direction of the motor vehicle, with a flange-mounted automatic transmission AG, with a driveshaft AW to the rear axle HA, and possibly a transfer box for the drive of the front axle VA (all-wheel drive). The motor vehicle illustrated in FIG. 7b has the abbreviated designation "ICE1".

Finally, FIG. 7c shows a motor vehicle with "electric drive" from the group of motor vehicles according to the invention, having an electric motor EH which is arranged in the region of the rear axle HA. Additionally, a further electric motor EV is arranged at the front axle VA in order to realize a motor vehicle with so-called "road-coupled all-wheel drive". The battery 62 is formed as a single piece and extends over approximately the entire width of the motor vehicle. In the region of the central tunnel, the battery 62 has a bulged portion 64, whereby additional battery cells and/or other components (for example electrical lines, coolant lines) can be accommodated in this region. For the same purpose, the battery 62 has a bulged portion 65 in the region in front of the rear axle HA. The motor vehicle illustrated in FIG. 7c has the abbreviated designation "BEV".

FIG. 7d shows a further motor vehicle with "combustion drive". By contrast to the motor vehicle "ICE1" as per FIG. 7b, this motor vehicle has a floor panel subassembly B1 (not illustrated) arranged at a higher level (see FIG. 10). Owing to the structural space hereby created in the region underneath the floor panel, housings 60' for components of the motor vehicle can be arranged to the right and to the left of the central tunnel. The housings 60' may also be omitted if there is no need for accommodating components of the motor vehicle in one housing 60' or in two housings 60". Alternatively, it is also possible for components of the motor vehicle to be arranged separately, without a housing 60', in the region underneath the floor panel subassembly B1. The combustion engine VM is installed in a longitudinal direction of the motor vehicle, with a flange-mounted automatic transmission AG, with a driveshaft AW to the rear axle HA, and possibly a transfer box for the drive of the front axle VA (all-wheel drive). The motor vehicle illustrated in FIG. 7d has the abbreviated designation "ICE2".

FIG. 7e illustrates a further motor vehicle with "combustion drive". This motor vehicle also has a floor panel subassembly B1 (not illustrated) arranged at a higher level (see FIG. 11). The combustion engine VM is installed in a transverse direction of the motor vehicle and drives the front wheels VR via a transmission and articulated shafts.

In a first embodiment of FIG. 7e, the exhaust system ends in the front region of the passenger cell and has a relatively short exhaust line AL1 and an end muffler SD1, the exhaust end pipe of which is arranged in the region of the side longitudinal member (sill). As a result of the omission of a driveshaft to the rear axle HA and as a result of the omission of an exhaust system that extends to the rear end of the vehicle, a major part of the region underneath the floor panel subassembly B1 is available for the arrangement of a single housing 60" that extends over approximately the entire vehicle width.

In a second embodiment of the motor vehicle of FIG. 7e, the exhaust system is designed as in the case of the motor vehicle as per FIG. 7d, that is to say with an exhaust line AL2 illustrated using dashed lines, which exhaust line extends into the rear end of the vehicle to an end muffler SD2 arranged there. In this embodiment, two separate housings 60' are provided on the underside of the floor panel subassembly B1, analogously to FIG. 7d.

With regard to a possible omission of one housing 60' or of both housings 60' or of the housing 60", the explanations given in this regard with regard to FIG. 7d apply analogously.

The motor vehicle illustrated in FIG. 7e has the abbreviated designation "ICE3".

The motor vehicle with "hybrid drive" illustrated in FIG. 7f has, like the motor vehicle as per FIG. 7e, a floor panel subassembly B1 arranged at a higher level and a combustion engine installed in a transverse direction of the motor vehicle, which combustion engine drives the front wheels VR via a transmission and articulated shafts. In this case, too, the exhaust system ends in the front region of the passenger cell and has a relatively short exhaust line AL1 and an end muffler SD1, the exhaust end pipe of which is arranged in the region of the side longitudinal member. In the case of this motor vehicle, electric drive is performed by an electric motor EM arranged in the region of the rear axle HA. As a result of the omission of a driveshaft to the rear axle HA and as a result of the omission of an exhaust system that extends to the rear end of the vehicle, a major part of the region underneath the floor panel subassembly B1 is available for the arrangement of a single battery 60a that extends over approximately the entire vehicle width. The motor vehicle illustrated in FIG. 7f has the abbreviated designation "PHEV2".

Figure 8A:
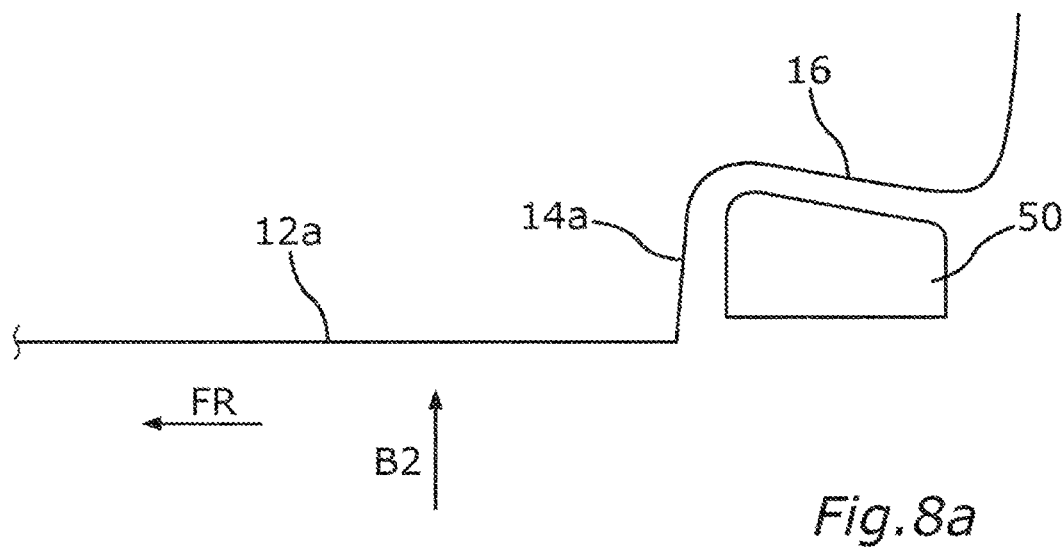
FIGS. 8a, 8b, 8c are schematic longitudinal sections in the floor region of motor vehicles from the group of motor vehicles according to the invention, with "hybrid drive", "combustion drive" and "electric drive".
Figure 8B:
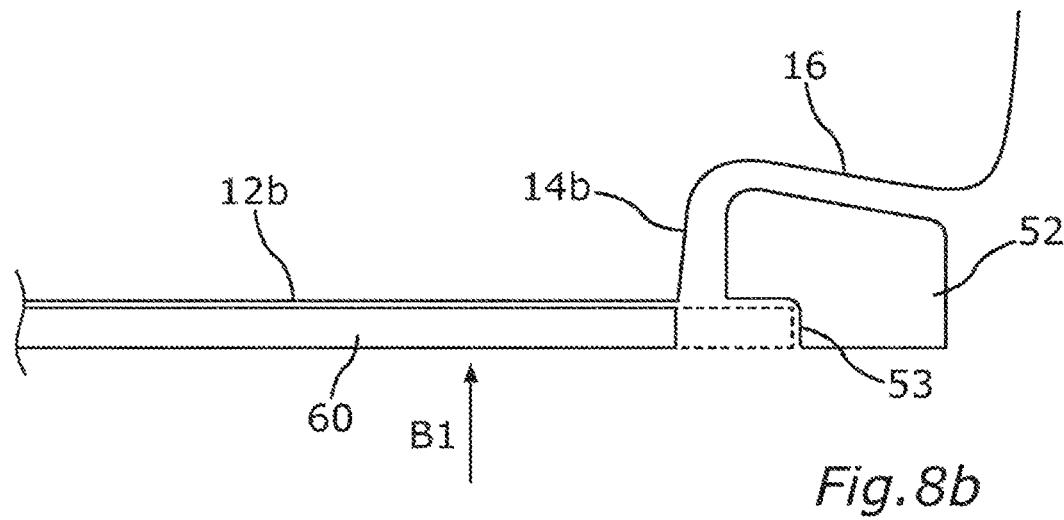
Figure 8C:
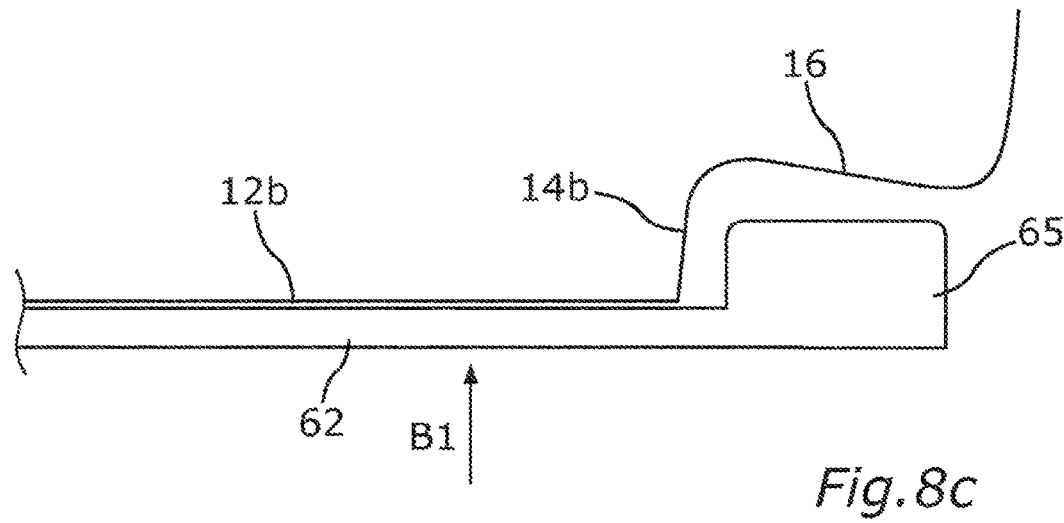

FIGS. 8a, 8b and 8c illustrate the configuration of the floor panel subassemblies B1 and B2 in the motor vehicles from the group of motor vehicles according to the invention with three different drive concepts. The motor vehicles with "combustion drive" as per FIG. 8a have floor panel sections 12a that are arranged lower in relation to the floor panel sections 12b of the motor vehicles with "hybrid drive" (FIG. 8b) or with "electric drive" (FIG. 8c). A vehicle interior compartment which is larger in a vertical direction of the motor vehicle is hereby made possible. In the configuration of the motor vehicles of the same vehicle type, this is generally reflected in greater foot space for the occupants, at the front seats and in particular at the rear seats. A fuel tank 50, for example for gasoline or diesel fuel, is arranged in the region of the heel plate 14a and underneath a seat well 16 of the rear seats. The fuel tank 50 has a relatively large storage capacity.

The floor panel sections 12b of the motor vehicle with "hybrid drive" as per FIG. 8b are arranged at a higher level in relation to the motor vehicle with "combustion drive" as per FIG. 8a. In this way, a large-volume, plate-like battery 60 can be arranged in each case to both sides of the central tunnel at the underside of the floor panel sections 12b. The battery 60 extends in the form of a board as far as the heel plate 14b. Alternatively, the battery 60 may also project into the region underneath the seat well 16 of the rear seats, as illustrated by dashed lines. A fuel tank 52, for example for gasoline or diesel fuel, is likewise arranged in the region of the heel plate 14b, underneath the rear seats. The fuel tank 52 has a larger storage capacity in relation to a motor vehicle according to the prior art (FIG. 6). In the case of a battery 60 (dashed lines) that projects beyond the heel plate 14b, the fuel tank 52 is provided, as in FIG. 8b, with an indentation 53, with an associated reduction in storage capacity.

Such a battery 60 which projects beyond the heel plate 14b may for example be transferred from a different motor vehicle which has a longer wheelbase than the motor vehicle as per FIG. 8b, in order to be able to use the batteries 60 as identical parts in multiple motor vehicles (also of different vehicle types).

The floor panel subassembly B1 of the motor vehicle with "electric drive" as per FIG. 8c is identical to the floor panel subassembly of the motor vehicle with "hybrid drive" as per FIG. 8b. At the underside of the floor panel sections 12b, there is arranged a battery 62 which projects a considerable distance beyond the heel plate 14b counter to the direction of travel FR and which, in this region, has a bulged portion 65 underneath the rear seats.

Figure 9:
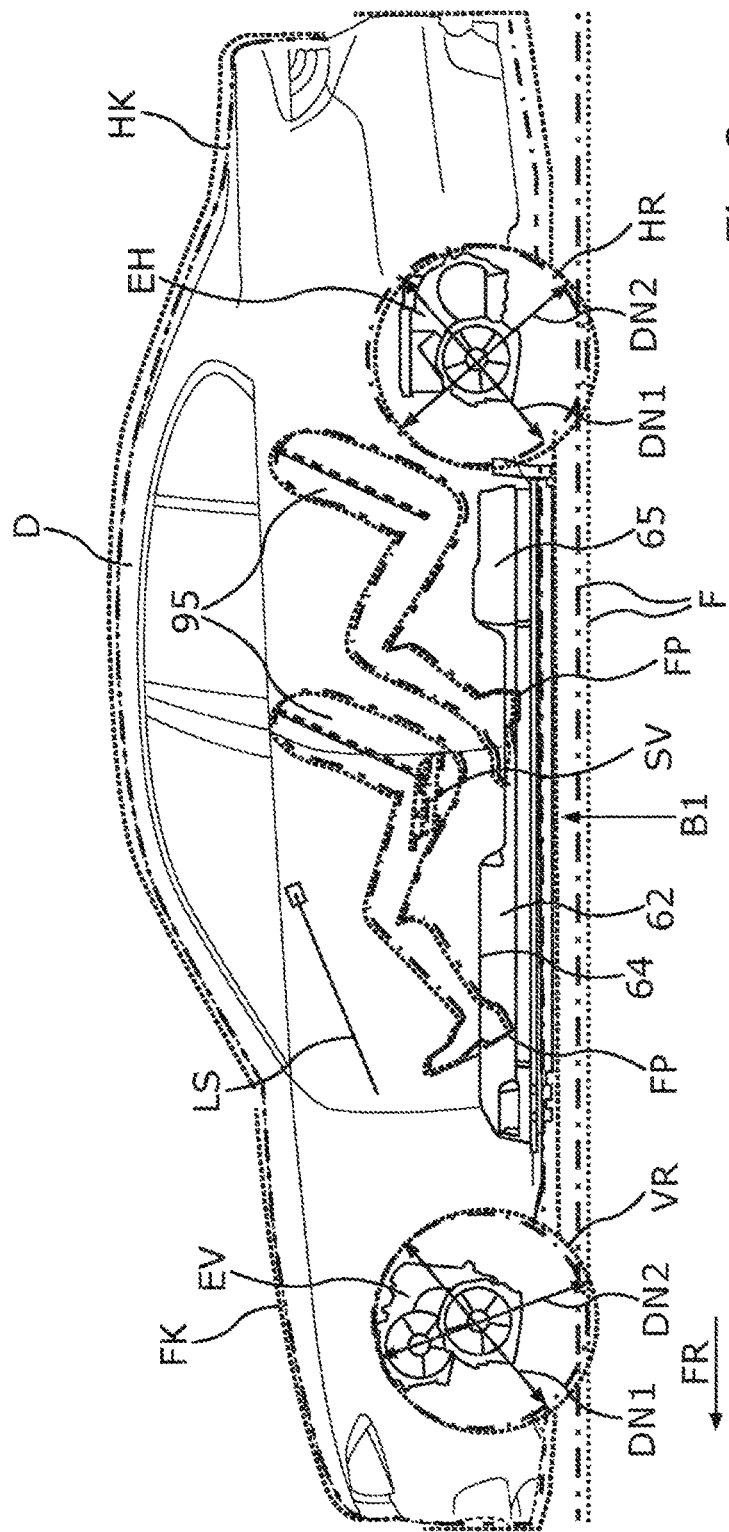
FIG. 9 is a schematic illustration of the outline of a motor vehicle and of the positioning of occupants in a motor vehicle from the group of motor vehicles according to the invention in relation to a motor vehicle according to the prior art.

FIG. 9 shows two silhouettes of a schematically illustrated motor vehicle. Here, the silhouette illustrated using dash-dotted (red) lines represents the outlines of a known motor vehicle with "combustion drive". The silhouette illustrated using dashed (blue) lines represents the outlines of a motor vehicle according to the invention of the same vehicle type. Furthermore, the outlines of occupants 95 are shown in order to illustrate the seating positions of the occupants 95 on the front seats and the rear seats.

The motor vehicle according to the invention illustrated in FIG. 9 is equipped with "combustion drive", with "hybrid drive" or with "electric drive". The "electric drive" is illustrated by way of example in FIG. 9, and has inter alia the following components: a drive unit designed as an electric motor EV in the front-end structure, a drive unit designed as an electric motor EH in the rear-end region, and a battery 62 underneath a floor panel subassembly B1.

The battery 62 installed in the motor vehicle according to the invention has substantially the two following effects on the packaging of the motor vehicle:

Firstly, in relation to a motor vehicle according to the prior art, the battery 62 projects further downward in the direction of the roadway F. This "loss" of ground clearance must accordingly be compensated for by front wheels VR and rear wheels HR which, in relation to the motor vehicle according to the prior art, have a diameter ("nominal diameter") DN2, shown using dashed lines, which is greater than the nominal diameter DN1 of the front wheels VR and rear wheels HR of the motor vehicle according to the prior art, which are illustrated using dash-dotted lines. The diameter DN1 or DN2 is the dimension of the unloaded wheel, which is greater than the "static diameter" of the loaded wheel. Therefore, the circles of the "unloaded" front wheels VR and rear wheels HR intersect the roadway F in the illustration of FIG. 9. The wheel central points of the front wheels VR and rear wheels HR of the motor vehicles according to the invention situated in a somewhat "deployed" position in relation to the motor vehicle according to prior art, that is to say are arranged somewhat lower in the enlarged wheel arches.

In summary, it can thus be stated that the motor vehicle according to the invention, irrespective of the drive concept, is in its entirety raised in relation to a motor vehicle according to the prior art, owing to the larger front wheels VR and rear wheels HR in conjunction with the displacement of the wheel central points. This is symbolized by a lowering of the roadway, illustrated using dashed lines, for the motor vehicle according to the invention.

Secondly, the floor panel subassembly of the motor vehicle according to the invention with "hybrid drive" or with "electric drive" is arranged at a higher level than in the case of a motor vehicle of the same vehicle type with "combustion drive". This has effects on the occupants 95 in the front seats and in the rear seats with regard to the position of the so-called H-point H ("hip point") as a significant characteristic variable of the seating position of an occupant 95.

Here, the effect on the occupants 95 in the front seats which are not illustrated (driver and front passenger) is relatively minor: owing to the identical position of brake pedal and accelerator pedal in the motor vehicles with "combustion drive", with "hybrid drive" and with "electric drive", the heel point FP is identical in all motor vehicles. The hip point H of the occupants 95 on the front seats is situated at an only slightly higher level in the case of the motor vehicle with "hybrid drive" than in the case of the motor vehicle with "combustion drive", and results substantially from a slight counterclockwise "rotation" of the occupant 95 about the heel point FP. Thus, in particular for the driver, all operator control devices and display units are arranged in an equally favorable manner from an ergonomic aspect irrespective of the drive concept of the motor vehicle. A so-called seat adjustment field SV shows the scope of movement of the hip point H during the seat adjustment of the front seats (not illustrated). Also shown in FIG. 9 is a steering column LS with the attachment point for a steering wheel (not illustrated).

By contrast, the hip point H for the occupants 95 on the rear seats is somewhat higher in the vertical direction Z of the motor vehicle, for example by approximately 20 to 30 millimeters, in the case of the motor vehicles with "hybrid drive" and "electric drive" in relation to motor vehicles with "combustion drive". With this raising of the seating position on the rear seats, sufficient legroom is created for the occupants 95, because the floor panel subassembly B1 is arranged at a higher level in the case of the motor vehicles with "hybrid drive" and with "electric drive" than in the case of the motor vehicles with "combustion drive".

The raising of the seating position for the occupants 95 on the rear seats is associated with a raising of the roof D in the region of the rear seats (not illustrated) in order to realize sufficient headroom for the occupants 95 on the rear seats. The raising of the roofline in the rear-seat region has the result that, for the purposes of a harmonious vehicle design with a continuously rising roofline, the roof D must also be raised slightly in the front region of the motor vehicle, possibly along with the adjoining regions in front of and behind the roof D, such that the line of the front flap FK and/or the line of the rear flap HK is thus also adapted to the changed roof line. The different silhouette of a motor vehicle according to the invention in the region of the front flap FK, of the roof D and of the rear flap HK in relation to a motor vehicle according to the prior art is illustrated by the dashed line that is offset somewhat in a vertical direction.

It is pointed out once again at this juncture that the raised silhouette in the case of the motor vehicles according to the invention of one vehicle type exists even in the case of the motor vehicles with "combustion drive", because it is the specific aim of the invention to realize a uniform body irrespective of the drive concept. Accordingly, the occupants 95 on the rear seats of a motor vehicle according to the invention with "combustion drive" have more available foot space, and thus more legroom, than the occupants 95 of a motor vehicle according to the invention with "hybrid drive" or with "electric drive", and also than the occupants 95 of a motor vehicle of the same vehicle type according to the prior art. This is illustrated in FIG. 9 by the heel point FP, which is situated at a lower level, for an occupant 95 in the motor vehicle with "combustion drive". Depending on the design of the roofline, the headroom of the occupants 95 of the motor vehicle according to the invention may be restricted slightly in relation to a motor vehicle according to the prior art.

The uniform body of the motor vehicles according to the invention irrespective of the drive concept has the result, as already discussed above, that the motor vehicles with "combustion drive" have a more generous interior compartment and "unnecessarily" large wheels (which are necessary in the case of the motor vehicles with "hybrid drive" and with "electric drive" owing to the increased payloads and the downwardly projecting battery or batteries 60 or 62).

Figure 10:
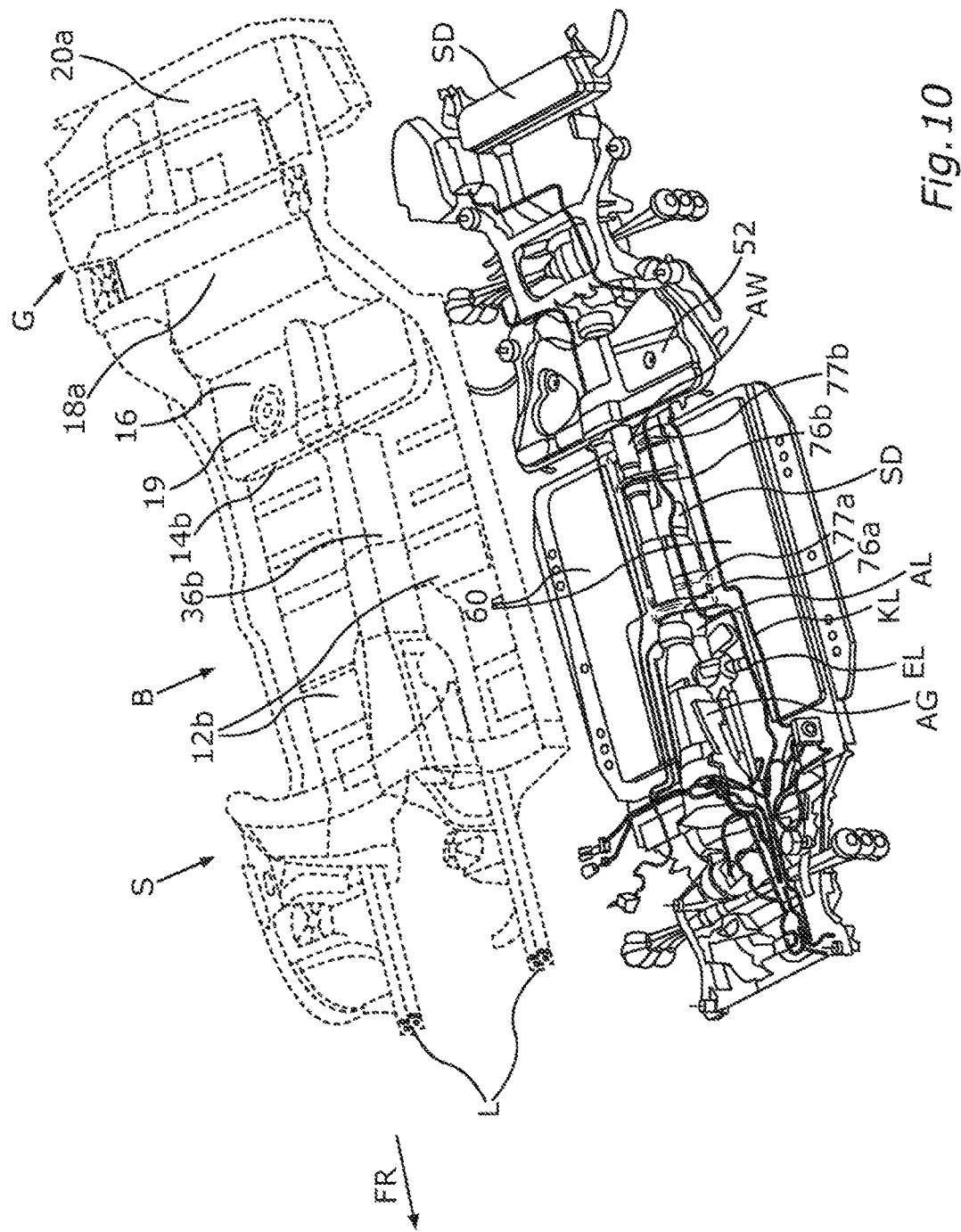
FIG. 10 is a perspective plan view of an exemplary embodiment of a motor vehicle with "hybrid drive" from the group of motor vehicles according to the invention.

FIG. 10 shows, in a more detailed illustration, components of a motor vehicle with "hybrid drive" from the group of motor vehicles according to the invention. The motor vehicle has a floor panel subassembly B1 which corresponds to the floor panel subassembly B1 of the motor vehicles with "electric drive" from the group of motor vehicles according to the invention. Accordingly, by contrast to a motor vehicle with "combustion drive" from the group of motor vehicles according to the invention, the floor panel subassembly B1 has floor panel sections 12b to both sides of the central tunnel 36b which are situated at a higher level. The central tunnel 36b corresponds to the central tunnel for a motor vehicle with "electric drive" from the group of motor vehicles according to the invention.

Underneath the floor panel sections 12b, a battery 60 is arranged to both sides of the central tunnel 36b. By contrast to the exemplary embodiment of FIGS. 7a and 9b, the batteries 60 end in the region of the heel plate 14b. Use can thus be made of a relatively large fuel tank 52, which is arranged underneath the seat well 16 and is designed for example as a steel pressure tank.

The region of the seat well 16 for the rear seats may be of common design, that is to say may be an identical part, for all motor vehicles from the group of motor vehicles according to the invention. It is the aim to ensure a uniform cushion contour in the motor vehicles according to the invention irrespective of the drive concept, such that the seating position for the occupants 95 is identical in all motor vehicles. Uniform linings can thus also be used for the rear seats. The region of the seat well 16 may otherwise be designed differently, for example owing to different service openings 19 for access to the fuel tank 50 or 52, necessitated by a possibly different position of the fuel pumps in the case of the motor vehicles with "combustion drive" and with "hybrid drive" or by the omission of the service opening in the case of the motor vehicles with "electric drive".

An automatic transmission AG is arranged in the front region of the central tunnel 36b. The automatic transmission AG is designed for example as a so-called hybrid transmission with attached inverter, that is to say as a transmission with an integrated electric motor that is operated with alternating current. The transformation of the direct current from the battery into alternating current is effected by the inverter arranged on the transmission.

Furthermore, the central tunnel 36*b* accommodates, inter alia, a driveshaft AW, exhaust lines AL with mufflers SD, electrical lines EL and fuel lines KL.

The rear-end structure with front and rear luggage compartment floor 18*a* and 20*a* corresponds to the rear-end structure of a motor vehicle with "combustion drive" from the group of motor vehicles according to the invention, such that a relatively large luggage compartment is available. Control units and a battery of an on-board electrical system, for example, are thus located in the interior compartment of the motor vehicle, whereas, for example, a liquid tank (for water injection, SCR etc.), an air supply system for an air suspension arrangement and/or an end muffler SD of the exhaust system are arranged in the exterior space, correspondingly to the motor vehicle with "combustion drive".

In the front-end structure, the front longitudinal members L (engine bearers) end in the bulkhead region and, by contrast to the motor vehicles with "combustion drive" from the group of motor vehicles according to the invention, do not continue at the underside of the floor panel sections 12*b*.

Figure 11:
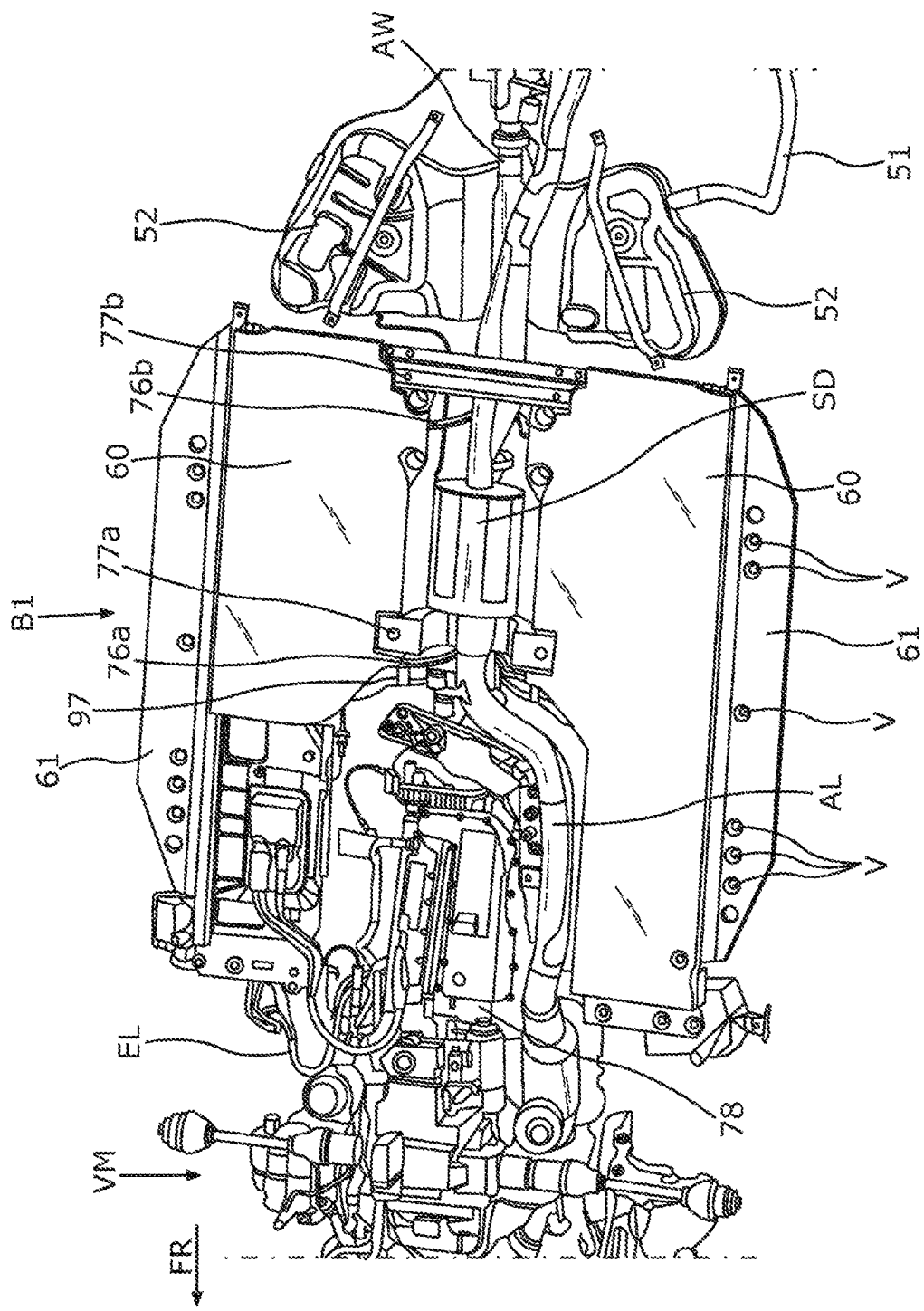
FIG. 11 is a perspective view from below of a motor vehicle with "hybrid drive" which is similar to the motor vehicle illustrated in FIG. 10.

FIG. 11 shows a motor vehicle with "hybrid drive" in a view from below, which is of similar design to the motor vehicle illustrated in FIG. 10. Accordingly, components which are identical or of identical action are denoted by the same reference numerals as in FIG. 10. Aside from the components shown in FIG. 10 and discussed above, FIG. 11 shows the following details: via a transmission 78 with transfer box, the combustion engine VM drives both the front axle and, via a driveshaft AW, the rear axle (all-wheel drive). An electric motor as an additional drive in relation to the combustion engine is integrated into the transmission 78. For the connection of the batteries 60 arranged to both sides of the central tunnel 36*a* (the lower cover of the left-hand battery 60 has been partially omitted in the illustration of FIG. 11) to side longitudinal members of the bodyshell structure of the motor vehicle, brackets 61 with a multiplicity of screw connection points V are provided. The two batteries 60 are connected to one another by means of a front and a rear battery bridge 76*a* and 76*b*. The two battery bridges 76*a* and 76*b* are of U-shaped design in order to bridge the central tunnel 36*b* and the components arranged therein (exhaust line AG and driveshaft AW). Furthermore, a bridge 97 with electrical lines for the electrical connection of the two batteries 60 is attached to the front battery bridge 76*a*. The battery bridges 76*a* and 76*b* each have a high stiffness and are capable of fixing the two batteries 60 to one another in a stable manner as a structural unit during transport, during installation and/or in the event of repair and/or maintenance.

The batteries 60 connected by means of the two battery bridges 76*a* and 76*b* and by the bridge 97 are installed as a preassembled unit on the motor vehicle. This is followed by the so-called "marriage", that is to say the installation of the entire drive system (without exhaust system) from the underside of the motor vehicle. A further stiffening bridge 77*a* is subsequently attached between the two batteries 60. After the exhaust system has been installed, the two batteries 60 are additionally connected to one another by means of a rear stiffening bridge 77*b*. The front stiffening bridge 77*a* is of U-shaped configuration and runs between the driveshaft AW and the exhaust line AL. The rear stiffening bridge 77*b* is in the form of a substantially planar connecting plate and runs underneath the driveshaft AW and exhaust lines AL. The two stiffening bridges 77*a* and 77*b* are designed to be of high stiffness and contribute significantly to the stiffening of the bodyshell structure of the motor vehicle in a transverse direction Y by establishing a closed load path between the two side longitudinal members. In particular, the rear stiffening bridge 77*b* furthermore significantly increases the torsional stiffness of the assembly composed of batteries 60 and bodyshell structure of the motor vehicle.

Also shown in FIG. 11 is a filling pipe 51 which serves for the filling of a fuel tank 52 configured as a pressure tank. The filling pipe 51 is preferably designed as an identical part in the case of the motor vehicles with "combustion drive" and with "hybrid drive". The fuel tank 52 is, correspondingly to the illustration of FIG. 10, arranged in the region in front of the rear axle of the motor vehicle.

Figure 12:
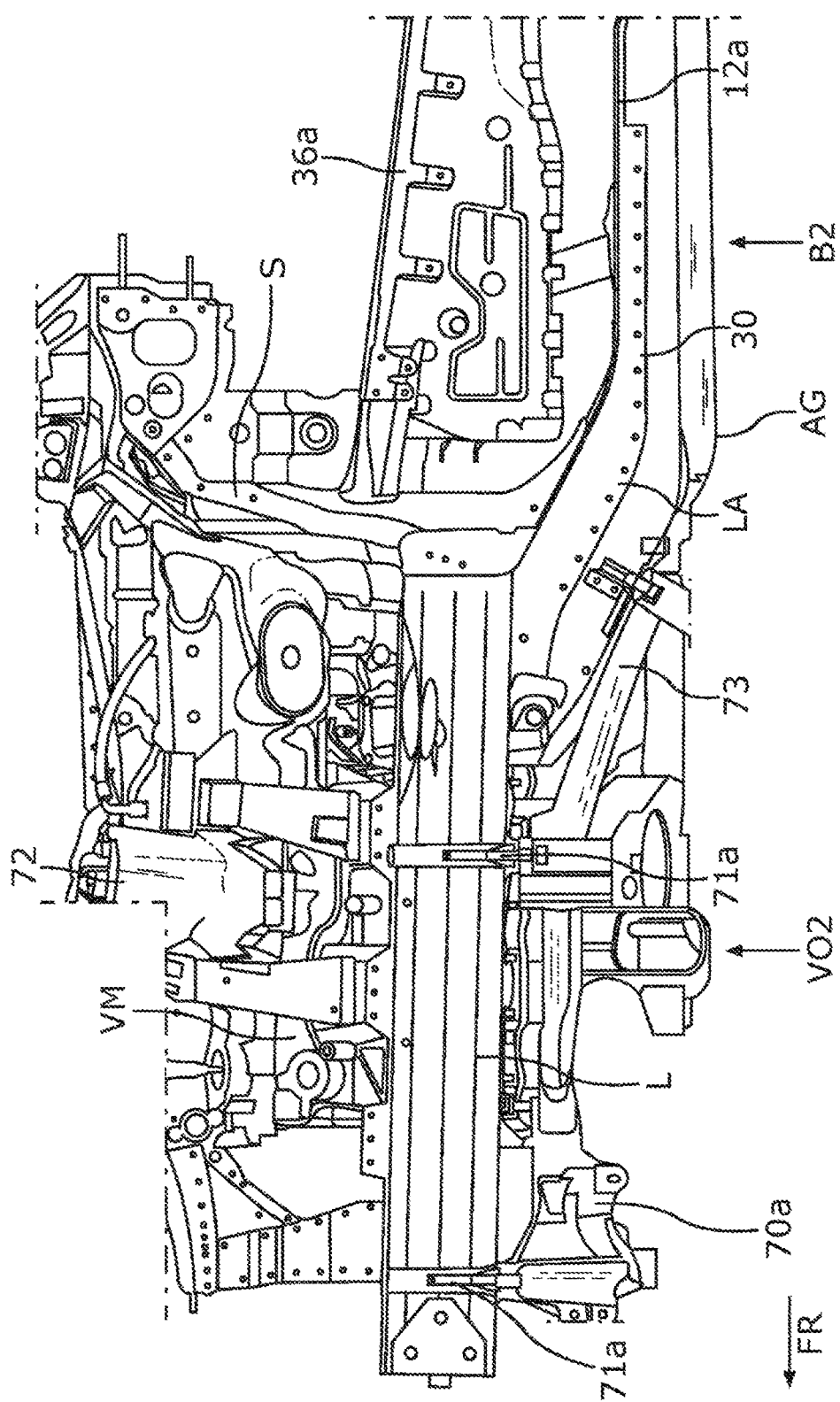
FIG. 12 is a sectional illustration through the front-end structure of a motor vehicle with "combustion drive".

FIG. 12 illustrates a longitudinal section in the left-hand region of the front-end structure of a motor vehicle according to the invention with "combustion drive", with a second front-end subassembly VO2. The right-hand side of the front-end structure is of mirror-symmetrical construction. FIG. 12 also shows the floor region of the bodyshell structure that is adjacent counter to the direction of travel FR, with a second floor panel subassembly B2. The second front-end subassembly VO2 has, inter alia, front longitudinal members L, a front subframe 70*a*, front suspension strut receptacles 72 and further components of the bodyshell structure that are not denoted in any more detail. The front longitudinal members L bear a combustion engine VM. The front subframe 70*a* is attached via bushings 71*a* to the front longitudinal members L. A bulkhead S forms the transition from the front-end structure to the floor region of the passenger cell. Here, the illustration shows inter alia a floor panel section 12*a* and a central tunnel 36*a* with an automatic transmission AG arranged therein.

In a known manner, the front longitudinal members L continue, at their rear end sections, into central longitudinal members 30. The central longitudinal members 30 extend beyond the bulkhead S counter to the direction of travel FR along the underside of the floor panel sections 12*a*. The central longitudinal members 30 are preferably connected to the floor panel sections 12*a* by spot welding. Furthermore, cantilevers 73 of the front subframe 70*a* extend rearward and transmit the forces from the chassis, or the forces that arise in the event of a crash, via the end sections of the front longitudinal members L and/or the attachment parts LA into the central longitudinal members 30. Furthermore, forces are introduced into the side longitudinal members 32*a* via the supports 88.

Figure 13:
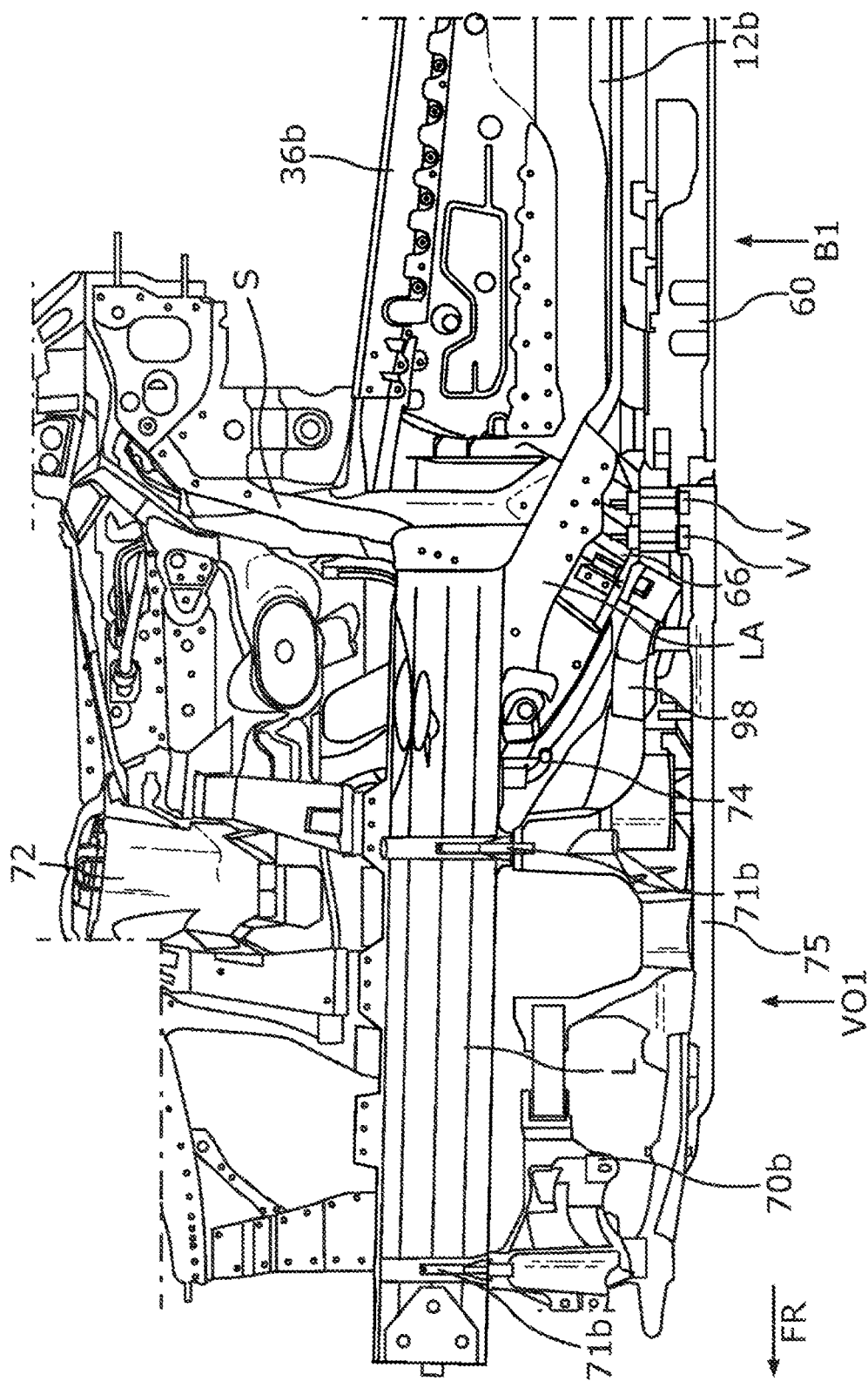
FIG. 13 is an illustration corresponding to FIG. 12 of a motor vehicle with "hybrid drive".

FIG. 13 illustrates a longitudinal section in the left-hand region of the front-end structure of a motor vehicle according to the invention with "hybrid drive", with a first front-end subassembly VO1. The right-hand side of the front-end structure is of mirror-symmetrical construction. FIG. 13 also shows the floor region of the bodyshell structure that is adjacent counter to the direction of travel FR, with a first floor panel subassembly B1. The first front-end subassembly VO1 has, inter alia, front longitudinal members L, a front subframe 70*b* and front suspension strut receptacles 72. The front longitudinal members L bear a combustion engine (not illustrated) as a structural unit with an electric motor. The front-axle support 70*b* is attached via bushings 71*b* to the front longitudinal members L. A bulkhead S forms the transition from the front-end structure to the floor region of the passenger cell. Here, the illustration shows inter alia a floor panel section 12*b* and a central tunnel 36*b*. Underneath the floor panel section 12*b*, batteries 60 are arranged to both sides of the central tunnel 36*b*. Also shown are lines 74 that lead from the front-end structure to the batteries 60.

The front longitudinal members L end with their rear end sections in the region of the bulkhead S. The undersides of the rear end sections of the front longitudinal members L, and/or the attachment parts LA arranged there, and/or the supports 88, serve for the fastening of the batteries 60. For this purpose, brackets 66 are provided on the front end sections of the batteries 60. The screw connection points are denoted by V. Furthermore, underneath the front subframe 70b, there is provided a shear panel 75 which stiffens the front subframe 70b and which is screwed to the brackets 66.

The front-end structure of the motor vehicle with "hybrid drive" is accordingly altogether similar, in its upper region, to the front-end structure of the motor vehicle with "combustion drive", whereas, in its lower region, it corresponds to the motor vehicle with "electric drive".

Figure 14:
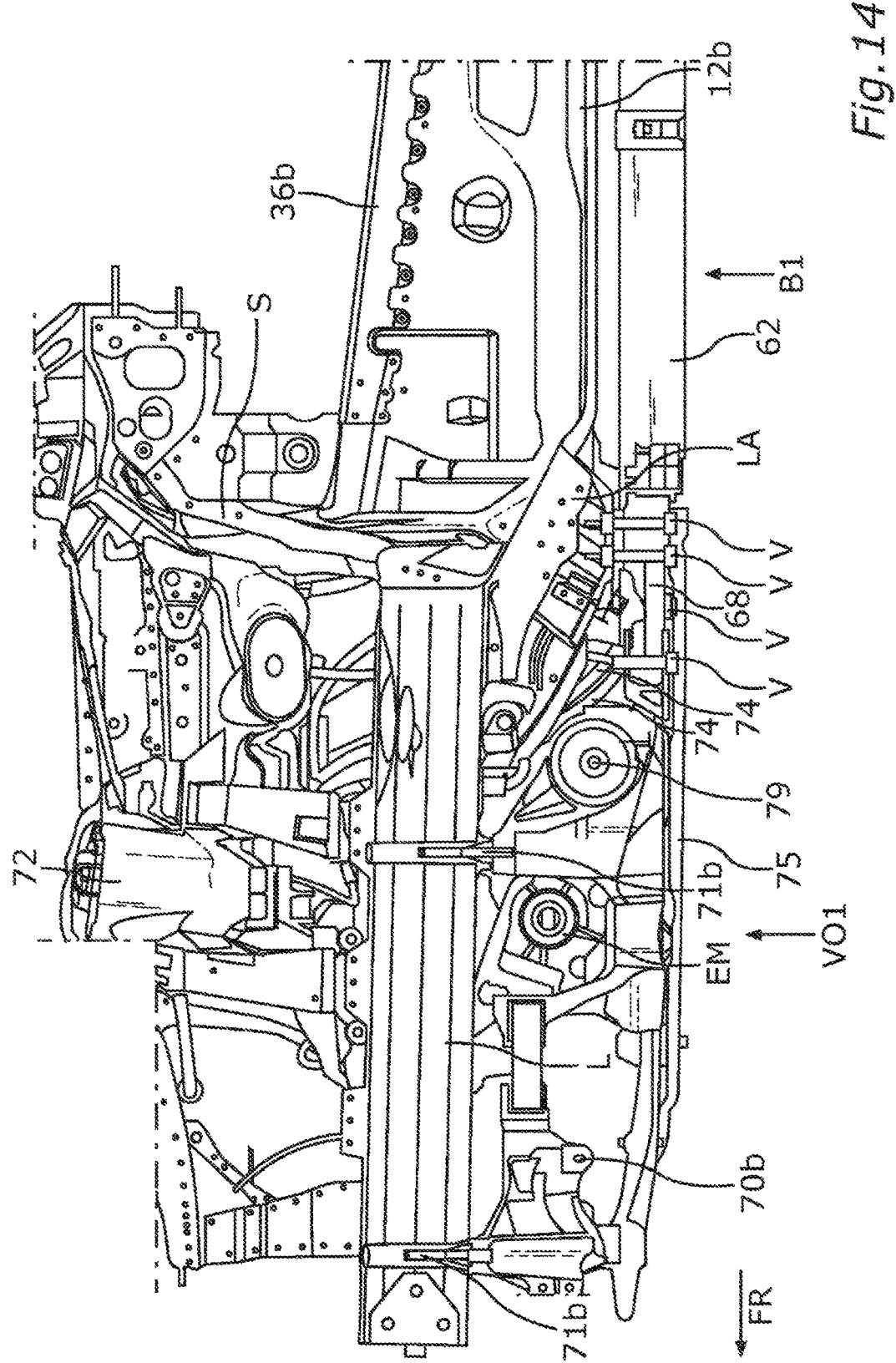
FIG. 14 is an illustration corresponding to FIG. 12 of a motor vehicle with "electric drive".

FIG. 14 illustrates a longitudinal section in the left-hand region of the front-end structure of a motor vehicle with "electric drive", with a first front-end subassembly VO1. FIG. 14 also shows the floor region of the bodyshell structure that is adjacent counter to the direction of travel FR, with a first floor panel subassembly B1. The first front-end subassembly VO1 corresponds to the front-end subassembly VO1 illustrated in FIG. 13, with front longitudinal members L, a front subframe 70b and a front suspension strut receptacle 72. The front longitudinal members L bear an electric motor EM. The electric motor EM is on the one hand supported via bearings 79 on the front subframe 70b and is on the other hand mounted via cantilevers on further bearing points at the level of the inner side of the longitudinal member L (and thus in a manner which is not visible in FIG. 14). The front subframe 70b is attached via bushings 71b to the front longitudinal members L. A bulkhead S forms the transition from the front-end structure to the floor region of the passenger cell, with a floor panel section 12b and a central tunnel 36b. Underneath the floor panel section 12b, there is arranged a battery 62 which extends over approximately the entire width of the floor panel section 12b. Also shown are lines 74 that lead from the front-end structure to the battery 62.

The front longitudinal members L end with their rear end sections in the region of the bulkhead S. The undersides of the rear end sections of the front longitudinal members L, and/or the attachment parts LA arranged there, and/or the supports 88, serve for the fastening of the battery 62. For this purpose, brackets 68 are provided on the front end section of the battery 62. The screw connection points are denoted by V. Furthermore, underneath the front subframe 70b, there is provided a shear panel 75 which stiffens the front subframe 70b and which is screwed to the brackets 68.

Fewer screw connection points V are required in the case of the motor vehicles with "hybrid drive" as per FIG. 13 than in the case of the motor vehicles with "electric drive" as per FIG. 14, because the batteries 60 of the motor vehicle with "hybrid drive" can additionally be supported in the central region of the floor panel subassembly B1.

The brackets 66 and 68 respectively arranged on the batteries 60 and 62 are dimensioned in accordance with the loading (weight of the batteries, number of screw connection points V).

FIG. 15 and FIGS. 16a to 16d show bodyshell structures of motor vehicles according to the invention of one vehicle type with the three different drive concepts. Here, primarily only the left-hand half of the bodyshell structure is illustrated. All bodyshell structures have, for example, the following components in common: front longitudinal members L, attachment parts LA, lateral supports 88, side longitudinal members 32a and 32b, a floor panel subassembly B1 or B2, and a bulkhead S with apertures 96 for example for a steering system and a brake unit. The front longitudinal members L end at the bulkhead S and continue downwardly via the attachment parts LA mounted in the manner of a shoe. In a vehicle transverse direction Y, the rear end sections of the front longitudinal members L and/or the attachment parts LA are supported with respect to the side longitudinal members 32a and 32b via supports 88.

Figure 15:
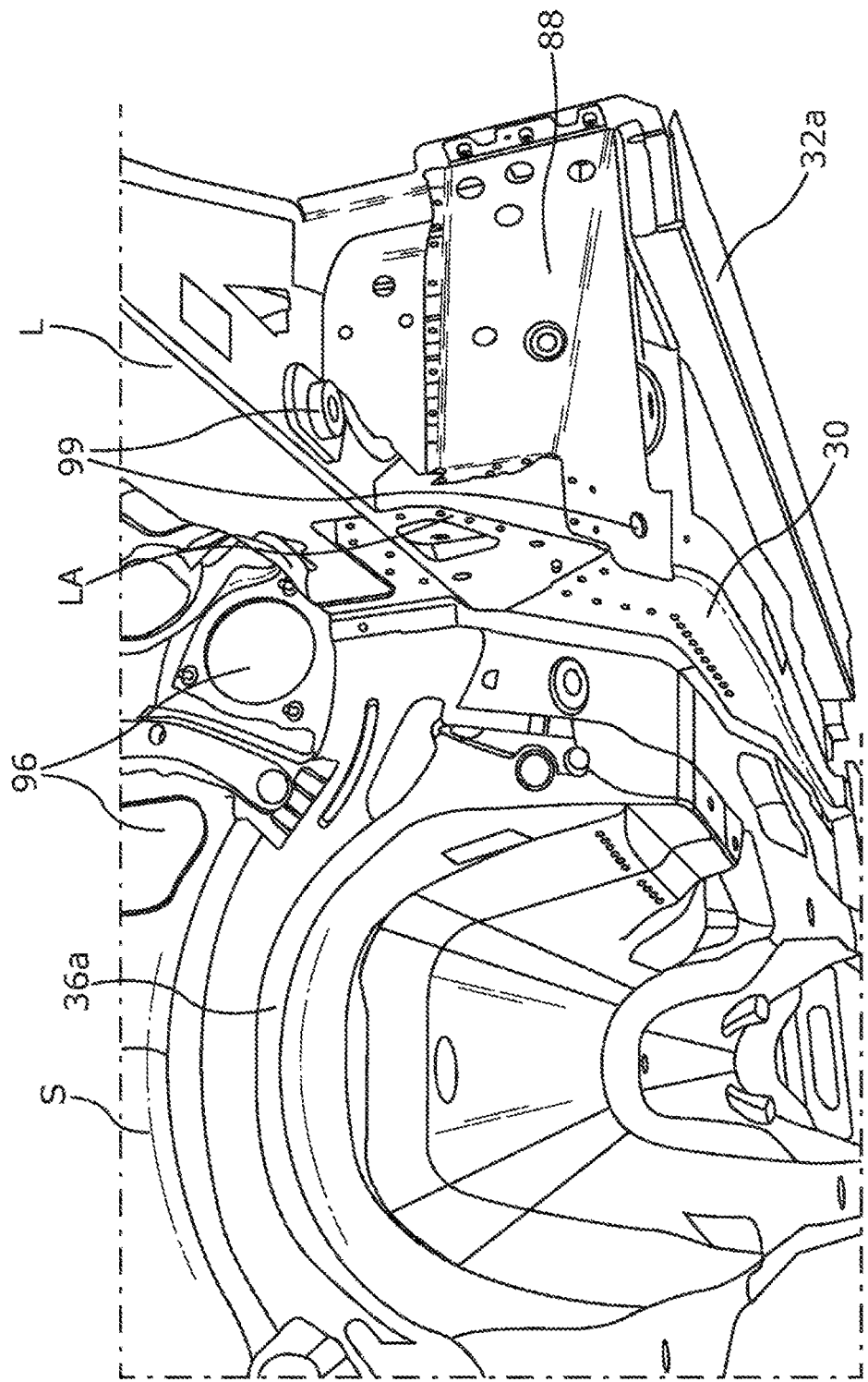
FIG. 15 is a perspective view of a bodyshell structure of a motor vehicle according to the invention with "combustion drive", in a viewing direction obliquely from below, counter to the direction of travel.

FIG. 15 shows the bodyshell structure of a motor vehicle with "combustion drive", in the case of which the front longitudinal members L continue beyond their rear end sections into central longitudinal members 30. The central longitudinal members 30 have a substantially U-shaped cross section and are welded along their free limbs to the underside of the floor panel sections 12a of the floor panel subassembly B2. As described above, the lateral supports 88 create a rigid connection between the rear end sections of the front longitudinal members and the side longitudinal members 32a. Screw connection points for a front subframe 70a are denoted by 99.

Figure 16A:
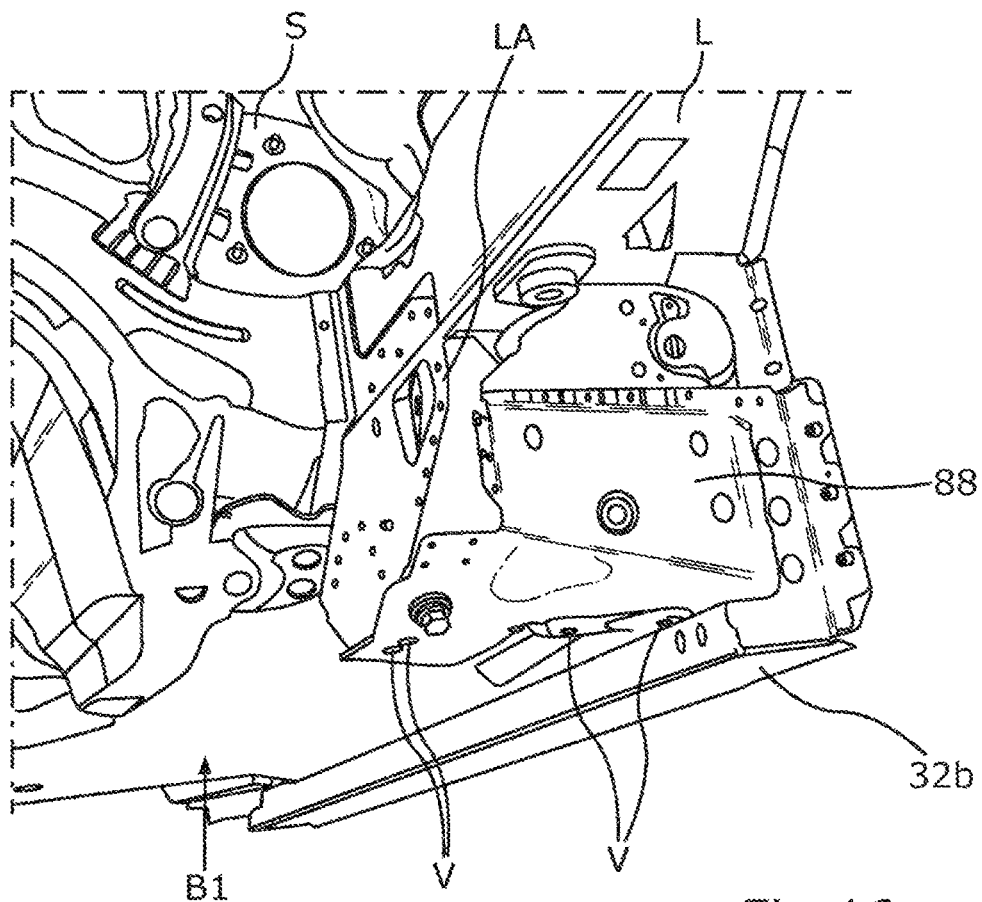
FIG. 16a is an illustration corresponding to FIG. 15 of a bodyshell structure of a motor vehicle according to the invention with "hybrid drive" or with "electric drive".

FIG. 16a shows the bodyshell structure that is of uniform configuration in the case of motor vehicles with "hybrid drive" and with "electric drive", the longitudinal member structure of which ends with the rear end sections of the front longitudinal members L. The stiffening in the region of the end sections of the front longitudinal members L by means of attachment parts LA and/or supports 88 is analogous to that in the motor vehicles with "combustion drive".

Figure 16B:
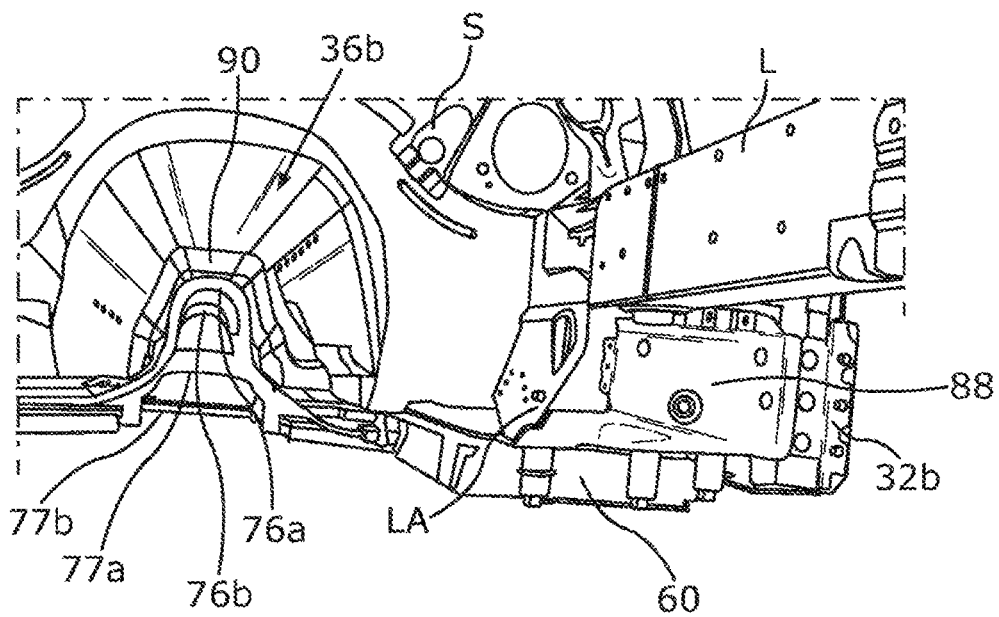
FIG. 16b is an illustration corresponding to FIG. 16a of a bodyshell structure of a motor vehicle according to the invention with "hybrid drive", from a slightly different viewing angle, with batteries and further components.

FIG. 16b shows the bodyshell structure as per FIG. 16a for a motor vehicle with "hybrid drive" with installed batteries 60. Here, at the right-hand side of the vehicle and at the left-hand side of the vehicle, the rear end sections of the front longitudinal members L are each adjoined by a battery 60. The two batteries 60 are connected by means of a front and a rear battery bridge 76a and 76b to form a preassembled unit. The screw connection of the batteries 60 to the side longitudinal members 32b is realized as described above with regard to FIG. 4b. For the screw connection of the batteries 60 to the bodyshell structure in the region of the bulkhead, brackets 66 are provided on the front end sections of the batteries 60. The four screw connection points V are illustrated in FIG. 16a.

Figure 16C:
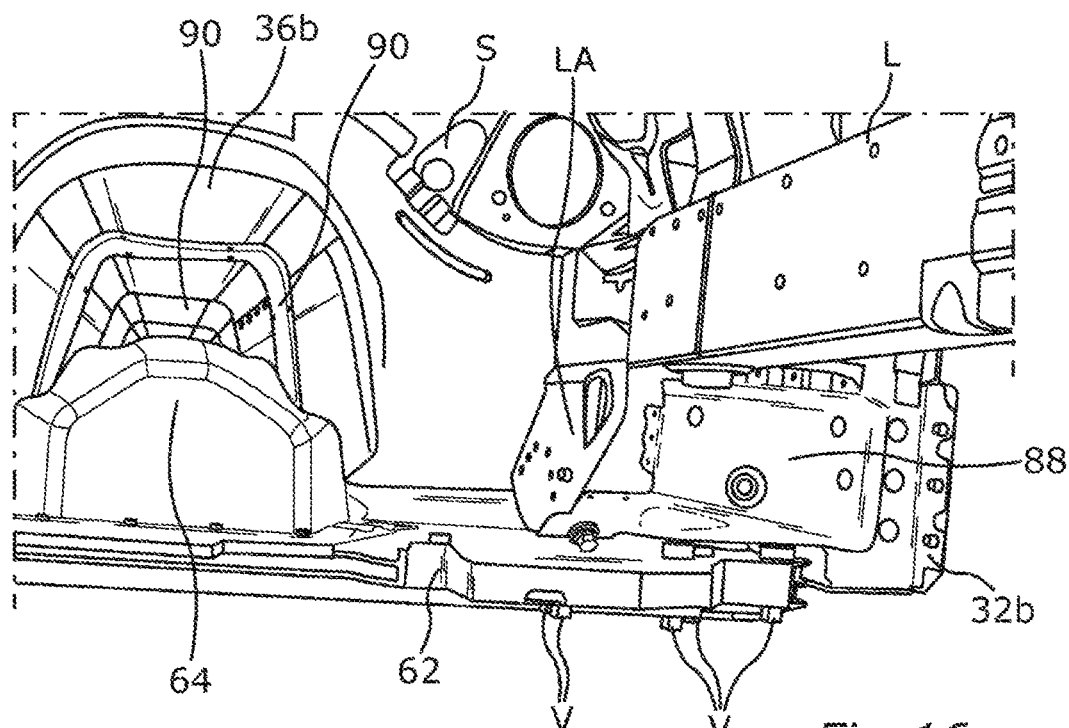
FIG. 16c is an illustration corresponding to FIG. 16b of a body structure of a motor vehicle according to the invention with "electric drive", with a battery and further components.

FIG. 16c shows the bodyshell structure as per FIG. 16a for a motor vehicle with "electric drive" with an installed battery 62. Here, the rear end sections of the front longitudinal members L are adjoined by the battery 62, which extends over approximately the entire vehicle width. The battery 62 has, in its central region, a bulged portion 64 in which electrical lines, electrical and/or electronic components, a coolant supply, shut-off devices for isolating the individual battery modules in the event of damage, and/or additional battery cells, are arranged. The free space at the underside of the central tunnel 36b may be completely filled with electrical and electronic components and with lines of any type owing to the fact that, in relation to a motor vehicle with "combustion drive" or with "hybrid drive", components are omitted in this region (transmission, driveshaft, exhaust line).

The screw connection of the batteries 62 to the side longitudinal members 32b is realized as described above with regard to FIG. 4c. For the screw connection of the batteries 62 to the bodyshell structure in the region of the bulkhead, in each case one bracket 68 is provided on the front right-hand and left-hand end section of the battery 62. In the view of FIG. 16c, only five of the total of seven screw connection points V (see FIG. 16d) can be seen.

Figure 16D:
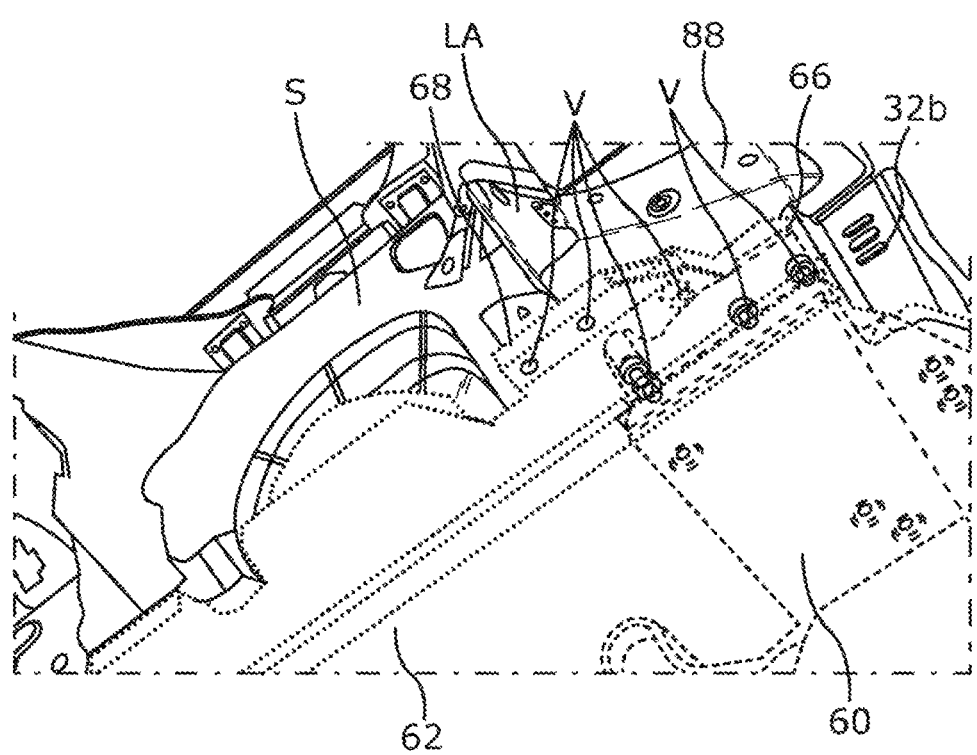
FIG. 16d is a perspective view of the underside of the bodyshell structure of motor vehicles according to the invention with "hybrid drive" and with "electric drive", with a superposed illustration of the batteries of the two drive concepts.

FIG. 16d shows the screw connection concept in a proposed illustration of the battery 60 (green) of the motor vehicle with "hybrid drive" (with dashed lines) and of the battery 62 (blue) of the motor vehicle with "electric drive" (with dash-dotted lines). It can be seen from this that, for the fastening of the battery 62 in the region of the bulkhead of the motor vehicle, in addition to the four screw connection points V of the batteries 60, three further screw connection points V are used, in each case to the left (as illustrated) and to the right (not illustrated). Here, the longitudinal members L are not illustrated in FIG. 16d. The screw connection to the front axle is realized, if necessary, by means of additional adapters 98 (see FIG. 13).

As already described above, the brackets 66 and 68 have a multiplicity of passage holes for the screw connection to the bodyshell structure of the motor vehicles. Whereas the brackets 66 use only some of the screw connection points V provided in the bodyshell structure, the brackets 68 of the battery 62 use all of the screw connection points V in order to compensate for the higher weight in relation to the batteries 60 and the absence of screw connection points in the region of the central tunnel 36b. Furthermore, in the case of the battery 62, load is introduced at additional points. The screw connection points V on the bodyshell structure are configured for example as nut plates. The screw connection points V are provided in the end sections of the front longitudinal members L and/or in the attachment parts LA and/or in the supports 88.

The supports 88 are sheet-metal components that are mounted onto the rear end sections of the front longitudinal members L in the manner of a shoe. The brackets 66 or 68 are for example forged components, composed for example of an aluminum alloy. Alternatively, the brackets 66 and/or 68 may for example be configured as cast components composed of an aluminum alloy. The brackets 66 or 68 are for example welded to a housing, which is likewise composed of an aluminum alloy, of the batteries 60 or 62. The housing of the batteries 60 or 62 is formed for example by extruded profiles.

Figure 17:
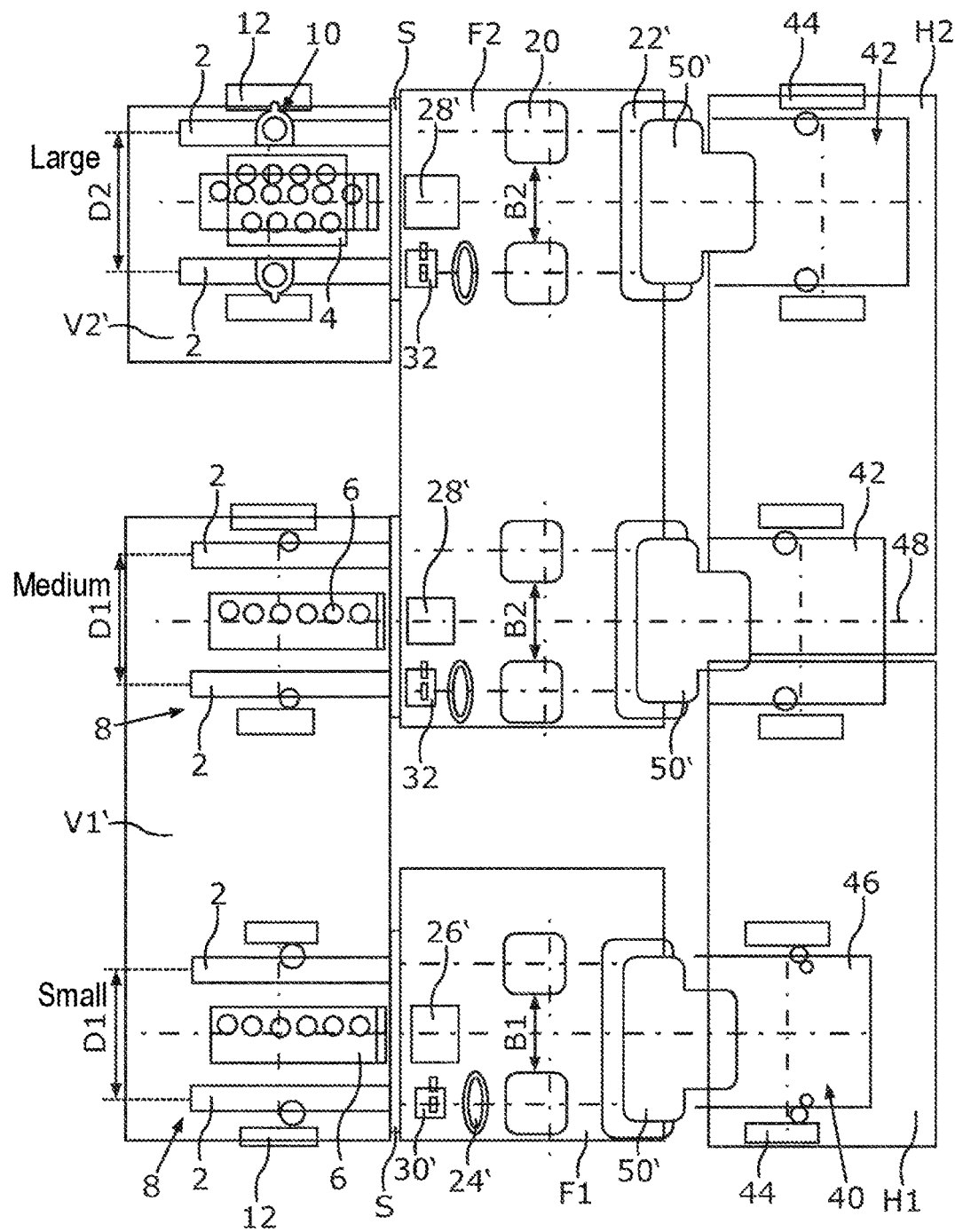
FIG. 17 is a schematic overview of the possible combinations of different front-end and passenger cell modules for the purposes of illustrating a group of motor vehicles of different vehicle categories.

FIG. 17 relates to a further aspect of the invention, which is itself the subject of the applicant's WO 2016/192921 A1.

Through the use of two front-end modules V1' and V2' and two passenger cell modules F1 and F2, it is advantageously possible to produce multiple groups of motor vehicles of different vehicle categories. FIG. 15 shows, in a schematic illustration, the combination possibilities that arise from two front-end modules V1' and V2', two passenger cell modules F1 and F2, and two rear-end modules H1 and H2. The connection between front-end modules V1' or V2' and passenger cell modules F1 or F2 is realized via a "common" bulkhead S. A uniform energy store 50 is provided in the connection region between passenger cell modules F1 or F2 and rear-end module H1 or H2. The indices 1 and 2 in this case respectively denote the more simple "base variant" and the more complex "high variant".

This modular design can be applied without limitation to the combination according to the invention of the two floor panel subassemblies B1 and B2, including the combination possibilities resulting from the use of two different luggage compartment floor subassemblies G1 and G2, as discussed in more detail below. It is thus possible for motor vehicles of different vehicle classes to advantageously be produced with the three drive concepts "combustion drive", "electric drive" and/or "hybrid drive".

The reference numerals used in FIG. 17 deviate in some cases from the reference numerals used in the other figures, because the unchanged FIG. 1 of WO 2016/192921 A1 is used for FIG. 8. For example, the engine bearers in FIG. 15 are denoted by the reference numeral 2, but otherwise by the alphabetic character L. For the correspondence of the components illustrated in FIG. 15, however, it is their functional designation that is of importance.

The front-end modules V1' and V2', with their front longitudinal members 2 ("engine bearers"), accommodate inter alia drive units ("combustion engines") 4 and 6 respectively and front axles 8 and 10 respectively with front wheels 12. The two front-end modules V1' and V2' differ in terms of the spacing D1 and D2 of the engine bearers 2. Whereas the front-end module V2' is designed for accommodating large engines 4, for example V8 engines, and has for example a spacing D2 of 788 millimeters, the front-end module V1' is provided only for accommodating relatively small engines 6, for example in-line engines with a maximum of six cylinders, for which a spacing D1 of for example 762 millimeters is sufficient. Likewise, the two front-end modules V1' and V2' are configured for accommodating different front axles 8: whereas the front-end module V1' accommodates a front axle 8 of relatively simple construction, for example a suspension-strut-type axle, the front-end module V2' is configured for accommodating a more complex front axle 10, for example a double-wishbone axle. Furthermore, the front-end module V2' is capable of accommodating a roll stabilization system ("Anti Roll System ARS"), that is to say a system which connects the two front wheels 12 and which partially or entirely prevents the tilting of the vehicle body during cornering.

The passenger cell modules F1 and F2 each accommodate, inter alia, front seats 20, rear seats 22', a steering wheel 24', climate control units 26' and 28' respectively, and driver assistance systems 30' and 32 respectively, such as so-called "Head-up displays". Whereas the passenger cell module F1 has a spacing B1 of for example 375 millimeters between the front seats 20, the passenger cell module F2 has a greater spacing B2 of for example 395 millimeters, providing greater spaciousness for the driver and front passenger. Furthermore, the two passenger cell modules F1 and F2 differ in terms of the complexity of the climate control units 26' and 28': whereas the climate control unit 26' is controllable separately for the driver and front passenger, and to a limited extent also performs the climate control of the rear-seat space (so-called "2.5-zone climate control unit"), the climate control device 28' is configured as a "4-zone climate control unit" with separate setting possibilities for the driver, front passenger and the two rear-seat passengers seated at the outer sides. The head-up displays 30' and 32 also differ in terms of their performance capabilities, such as the size of the projection area, wherein the "high" head-up display 32 has a greater structural space requirement owing to its higher performance capability.

The rear-end modules H1 and H2 accommodate, inter alia, rear axles 40 and 42 respectively with rear wheels 44 and a spare wheel system 46 and a rear-axle control system 48. Whereas the rear-end module H1 is configured for accommodating a rear axle 40 of relatively simple construction (for example a multi-link rear suspension with five links, for example with separate spring/damper elements, without a roll stabilization system), the rear-end module H2 accommodates a more complex rear axle 42 with a greater focus on comfort (for example a multi-link rear suspension with five links, for example with a suspension strut unit which may for example be arranged on a camber link or on the wheel carrier, possibly with a roll stabilization system and/or with a rear-axle steering system). The rear axle 42 forms a special feature here, because it may also be of "spatially functional" configuration, for example for motor vehicles of combination type of construction and/or so-called sports utility vehicles. For this type of motor vehicle, the rear axle is configured so as to allow as large and wide a luggage compartment as possible. The spare wheel system 46 may have a full-size vehicle wheel 12 or 44 or an emergency wheel, or even no replacement wheel at all. Depending on equipment level, the rear axle control system 48 may for example have different control units, an air suspension arrangement etc.

A uniform energy store module 50' is provided in the transition region between the passenger cell modules F1 or F2 and the rear-end modules H1 or H2.

Combination of the two front-end modules V1' and V2' with the two passenger cell modules F1 and F2 results in motor vehicles in three different vehicle categories, which are denoted by the expressions "small", "medium" and "large". These expressions stand for example for "mid-size category", "upper mid-size category" and "full-size category". The overlapping regions of the individual modules V1' and V2' and F1 and F2 indicate the combination possibilities.

Combination of the two passenger cell modules F1 and F2 with the two rear-end modules H1 and H2 results in further variants. Here, too, the overlapping regions of the individual modules F1 and F2 and H1 and H2 indicate the combination possibilities.

FIGS. 18 to 20 show, in a matrix-like overview, the "architecture" according to the invention for realizing motor vehicles of one vehicle type with different drive concepts, with a tabular illustration of the possibilities of covering different vehicle categories with these motor vehicles.

Here, FIGS. 18 to 20 are each laid out in accordance with a uniform pattern:

The different drive concepts are indicated in the left-hand column, with the designations for the respective drive concept as used in FIGS. 7a to 7f being used identically.

The middle column contains a stylized depiction of the bodyshell structures, assembled "in modular fashion", of motor vehicles in the floor region, transferred identically from FIGS. 2a to 2f. The three regions "front-end subassembly", "floor panel subassembly" and "luggage compartment floor subassembly" of the bodyshell structures are additionally provided with bordered designations, which denote the type of subassembly and the type of design thereof. These bordered designations correspond to the designations used in FIGS. 2a to 2f and in FIGS. 6 and 7a to 7f.

Plotted in the right-hand column are the four vehicle classes GKL (full-size class), MKL (upper mid-size class), KKL (mid-size class) and UKL (compact class), with further differentiations in accordance with the "character" (manifestation) of the motor vehicles, such as "high", "low" and "sport".

"High" is to be understood as encompassing motor vehicles that have a relatively high seating arrangement. Such motor vehicles are referred to for example as "Sport Utility Vehicles" SUV or as "Sport Activity Vehicles" SAV.

"Low" is to be understood as encompassing for example sedans and motor vehicles of combination type of construction as well as coupes and cabriolets.

"Sport" is to be understood as encompassing for example 2-seat motor vehicles of sporty design, such as roadsters.

In the associated columns of the right-hand column, bars of different widths are used to indicate which vehicle categories can be covered, in full or in part, by the respective drive concepts and/or body subassemblies.

The bars also have different patterns, with the following meanings:

horizontally/vertically hatched:
 "wide" front-end module V2'+"wide" passenger cell module F2 ("wide/wide")
diagonally hatched:
 combination of "narrow" front-end module V1'+"wide" passenger cell module F2 ("narrow/wide") or
 combination of "wide" front-end module V2'+"narrow" passenger cell module F1 ("wide/narrow")
dotted:
 "narrow" front-end module V1'+"narrow" passenger cell module F1 ("narrow/narrow")

FIG. 18 shows, in the uppermost row, a motor vehicle with "hybrid drive" according to the prior art. With this concept, it is preferably possible to realize "high" motor vehicles in the vehicle categories GKL, MKL and KKL. Such motor vehicles naturally have a relatively high seating arrangement, which allows relatively large batteries 160 to be accommodated behind the heel plate. The relatively large luggage compartment in these vehicles is not significantly restricted by the arrangement of the fuel tank 150 underneath the luggage compartment floor.

As is apparent from the labeling of the rectangles representing the body subassemblies, the front-end subassembly VO of the motor vehicle according to the prior art corresponds to the front-end subassembly VO2. Analogously, the floor panel subassembly B corresponds to the floor panel subassembly B2.

The second row of FIG. 18 relates to a motor vehicle according to the invention with "combustion drive", with which the vehicle categories GKL, MKL and KKL can be realized in all manifestations "high", "low" and "sport".

The third row of FIG. 18 relates to a motor vehicle according to the invention with "electric drive", which forms the basis for the derivation of the motor vehicle with "hybrid drive" that is illustrated in the lowermost row of FIG. 18.

With the motor vehicle according to the invention with "electric drive", it is preferably possible in the vehicle categories GKL, MKL and KKL to realize motor vehicles in all manifestations "high", "low" and "sport".

With the concept according to the invention of a motor vehicle with "hybrid drive" (lowermost row) derived from a motor vehicle with "electric drive", it is preferably possible in the vehicle categories GKL and MKL to realize motor vehicles with the manifestations "high" and "low". In the case of the motor vehicles in the KKL and UKL categories, and in the case of all motor vehicles in the manifestation "sport", the concept according to the invention reaches its limits. The short wheelbase in the case of these vehicles makes it difficult to accommodate a sufficiently large battery, in particular if it is sought at the same time to maintain the "low silhouette" of a sporty vehicle.

Therefore, in the matrix of FIG. 18, the motor vehicles not covered by "PHEV1" are covered by "PHEV prior art". In particular if the wheelbase of the motor vehicles in the KKL "low" category is too short for a battery of board-like form to be sensibly accommodated under the floor panel subassembly B1, the solution "PHEV prior art" is selected despite disadvantages with regard to the usability of the luggage compartment.

As can be seen from the individual columns in the right-hand part of the matrix of FIG. 18, the respective motor vehicles are formed by different combinations of "wide" and "narrow" front-end modules and "wide" and "narrow" passenger cell modules. In the vehicle class MKL, different combinations are also possible and sensible, as symbolized by the different bars plotted one above the other.

FIG. 19 once again shows, in the upper row, the motor vehicle with "electric drive", which forms the basis for the derivation of the motor vehicle with "hybrid drive" illustrated in the middle row of FIG. 19. In this respect, these two rows correspond to the two lower rows of FIG. 18, but serve for illustrating the architecture approach which leads from the motor vehicle with "electric drive" via the motor vehicle with "hybrid drive" to the motor vehicle with "combustion drive".

FIG. 19 shows, in the lower row, a motor vehicle with "combustion drive", which is derived from the motor vehicle with "hybrid drive" and thus also from the motor vehicle with "electric drive", that is to say which likewise has the floor panel subassembly B1 arranged at a higher level. In the case of the motor vehicles with "combustion drive", it is possible at the underside of the floor panel subassembly B1 for housings 60' for accommodating components of the motor vehicle to be arranged to both sides of a central tunnel.

Since the "PHEV prior art" as per FIG. 18 is omitted with the architecture as per FIG. 19, motor vehicles in the vehicle classes GKL, MKL and KKL are realized in all manifestations "high", "low" and "sport" with the concept as per FIG. 19. However, in the manifestation "sport", there are limitations with regard to a desired low vehicle height, in particular in the region of the rear-seat positions.

As can be seen in turn from the individual columns in the right-hand part of the matrix of FIG. 19, the respective motor vehicles are formed by different combinations of "wide" and "narrow" front-end modules and "wide" and "narrow" passenger cell modules. In the vehicle class MKL, different combinations are also possible and sensible, as symbolized by the different bars plotted one above the other.

FIG. 20 relates to motor vehicles according to the invention with all three drive concepts, in the case of each of which a modified front-end subassembly VO1' is used.

In the case of the motor vehicles with "hybrid drive" and with "combustion drive", the front-end subassembly VO1' bears a transversely installed combustion engine VM. The front-end subassembly VO1' corresponds to the front-end subassembly VO1, that is to say is configured for combination with a floor panel subassembly B1 arranged at a higher level, that is to say has front longitudinal members L' which end in the region of the bulkhead and which do not continue into central longitudinal members 30 at the underside of the floor panel subassembly B1.

By contrast to this, the front-end subassembly VO1 illustrated in FIGS. 18 and 19 is configured for accommodating a combustion engine VM installed in a longitudinal direction of the motor vehicle ("longitudinal engine").

As per the upper row of FIG. 20, the front-end subassembly VO1' is also used for the motor vehicles with "electric drive", and is in this case adapted so as to accommodate an electric motor EM or EV instead of a combustion engine VM arranged transversely with respect to the direction of travel FR.

In a first variant, the motor vehicles with "electric drive" are equipped either with electric motors EV and EH at the front axle and at the rear axle (road-coupled all-wheel drive) or with one electric motor EH at the rear axle (rear-wheel drive). In both cases, a luggage compartment floor subassembly G1 which is arranged at a higher level in its front region is necessary for the arrangement of the electric motor EH.

In a second variant, the motor vehicles with "electric drive" are equipped solely with an electric motor EV at the front axle (front-wheel drive). It is thus possible to use the luggage compartment floor subassembly G2. Owing to the limited drive torque that can be transmitted to the roadway in the case of front-wheel drive, this type of construction is generally limited to motor vehicles in the vehicle categories UKL and KKL.

The motor vehicles with "hybrid drive" have an exhaust system that ends in the region of the passenger cell, such that a battery 60*a* which extends over approximately the entire vehicle width can be used.

In the case of the motor vehicles with "combustion drive", the exhaust system may either end in the region of the passenger cell or may be led to the rear end of the motor vehicle. In the former case, a container 60" which extends over approximately the entire vehicle width and which serves for accommodating components of the motor vehicle can be arranged at the underside of the floor panel subassembly B1. In the latter case, at the underside of the floor panel subassembly B1, a "divided" container 60' can be arranged to both sides of the central tunnel.

With the concept illustrated in FIG. 20, it is possible to realize all vehicle categories in all manifestations "high", "low" and "sport". This large coverage is attributable to the restriction to transversely installed engines, with front-wheel drive.

Here, use is preferably made of a "wide" front-end module V2', designed for accommodating the transverse engines, in conjunction with a "wide" passenger cell module F2 or a "narrow" passenger cell module F1 depending on vehicle category.

The invention can be summarized as follows: it is essential to the invention that, in the group of motor vehicles according to the invention of one vehicle type, the motor vehicles with "hybrid drive" are derived from the motor vehicles with "electric drive". In other words, according to the invention, for the motor vehicles with "hybrid drive", through the use of the "architecture" of the motor vehicles with "electric drive", with a floor panel subassembly B1 that is set at a higher level in relation to that in the case of the motor vehicles with "combustion drive", a structural space for accommodating a battery 60 is provided at the underside of the floor panel subassembly B1, which structural space allows considerably larger batteries 60 to be accommodated than in the case of the motor vehicle according to the prior art as per FIG. 6.

The invention is thus characterized by the fact that the "architecture" of the motor vehicles with "electric drive" is used as a basis for realizing the motor vehicles with "hybrid drive". Here, to produce motor vehicles of one vehicle type with the three abovementioned drive concepts, two different floor panel subassemblies B1 and B2 are provided, wherein a first floor panel subassembly B1 is, in its installed position in the motor vehicle, arranged at a higher level than the second floor panel subassembly B2. The floor panel subassembly B1 arranged at a higher level is thus used for producing both the motor vehicles with "electric drive" and the motor vehicles with "hybrid drive". It is thus also the case for the motor vehicles with "hybrid drive" that a structural space with a large area is available underneath the floor panel subassembly B2 for the purposes of accommodating at least one battery 60 of board-like form.

The invention furthermore encompasses a group of motor vehicles of one vehicle type, wherein the group comprises motor vehicles with three different drive concepts, the three drive concepts comprise a combustion engine ("combustion drive") or an electric motor ("electric drive") or a combination of a combustion engine and an electric motor ("hybrid drive"), two different floor panel subassemblies B1, B2 and two different luggage compartment floor subassemblies G1, G2 are provided, and the floor regions of the bodyshell structures of the motor vehicles are formed by the combination of one of the two floor panel subassemblies B1, B2 and one of the two luggage compartment floor subassemblies G1, G2 in a manner dependent on the drive concept.

LIST OF REFERENCE DESIGNATIONS

AG Automatic transmission
AL Exhaust line
AL1 Exhaust line
AL2 Exhaust line
AW Driveshaft
B Floor panel subassembly
B1 Floor panel subassembly
B2 Floor panel subassembly
B1 Spacing
B2 Spacing
D1 Spacing
D2 Spacing
DN1 Diameter
DN2 Diameter
EH Electric motor
EM Electric motor
EL Electrical line
EV Electric motor
F Roadway
F1 Passenger cell module
F2 Passenger cell module
FP Heel point
FR Direction of travel
G Luggage compartment floor subassembly
G1 Luggage compartment floor subassembly
G2 Luggage compartment floor subassembly
H Hip point
H1 Rear-end module
H2 Rear-end module
HA Rear axle
HK Rear flap
HR Rear wheel
KL Fuel line
L Front longitudinal member
L' Front longitudinal member
LA Attachment part
LA' Attachment part
LS Steering column
Bulkhead
SD Muffler
SD1 Muffler
SD2 Muffler
ST Bulkhead member
V Screw connection point
V1 . . . V8 Line
V1' Front-end module
V2' Front-end module
VA Front axle
VM Combustion engine
VO Front-end subassembly
VO1 Front-end subassembly
VO1' Front-end subassembly
VO2 Front-end subassembly
VR Front wheel
X Longitudinal direction
Y Transverse direction
Z Vertical direction
2 Front longitudinal member
4 Combustion engine
6 Combustion engine
8 Front axle
10 Front axle
12 Front wheel
12a Floor panel section
12b Floor panel section
14a Heel plate
14b Heel plate
16 Seat well
17 Front transverse member, rear axle
18a Front luggage compartment floor
18b Front luggage compartment floor
19 Service opening
20 Front seat
20a Rear luggage compartment floor
20b Rear luggage compartment floor
22 Rear transverse member, rear axle
22' Rear seat
24 Rear-end terminating member
24' Steering wheel
26 Depression
26' Climate control unit
27 Bulged portion
28 Depression
28' Climate control unit
29 Screw connection point
30 Central longitudinal member
30' Driver assistance system
31 Tunnel longitudinal reinforcement
32a Side longitudinal member (sill)
32b Side longitudinal member (sill)
33a Section
33b Section
34a Section
34b Section
36a Central tunnel
36b Central tunnel
37a Free space
37b Free space
38 Tunnel top panel
40 Rear axle
40a Front seat transverse member
40b Front seat transverse member
42 Rear axle
42a Rear seat transverse member
42b Rear seat transverse member
44 Rear wheel
46 Spare wheel system
48 Rear-axle control system
50 Fuel tank
50' Energy storage module
52 Fuel tank
60 Battery
60' Housing
60" Housing
60a Battery
61 Bracket
62 Battery
63 Bracket
64 Bulged portion
65 Bulged portion
66 Bracket
66' Bracket 68' Bracket
70a Front subframe
70b Front subframe
71a Bushing
71b Bushing
72 Front suspension strut receptacle
73 Cantilever
74 Line
75 Shear panel
76a Front battery bridge
76b Rear battery bridge
77a Front stiffening bridge
77b Rear stiffening bridge
78 Transmission
79 Bearing
80 Front-end structure
82 Rear-end member structure
84 Rear-end longitudinal member
86 Rear suspension strut receptacle
87 Partition assembly
88 Support
88' Support
90 Reinforcement
90a Member
91 Holder
92 Partition
94 Rear shelf
96 Aperture
97 Bridge
98 Adapter
99 Screw-on point
112 Floor panel section
116 Seat well
118 Rear luggage compartment floor
120a Rear luggage compartment floor
126 Depression
130 Central longitudinal member
152 Fuel tank
160 Battery

What is claimed is:

1. A group of motor vehicles of one vehicle type, comprising:
   motor vehicles with three different drive concepts, wherein
   the three different drive concepts comprise a combustion engine ("combustion drive") or an electric motor ("electric drive") or a combination of a combustion engine and an electric motor ("hybrid drive"),
   two different floor panel subassemblies are provided, wherein a first floor panel subassembly, in an installed position in the motor vehicle, is arranged higher than a second floor panel subassembly, wherein
   a bodyshell structure of the motor vehicles with the electric drive and of the motor vehicles with hybrid drive have the first floor panel subassembly and
   a bodyshell structure of the motor vehicles with the combustion drive have the second floor panel subassembly, and
   the motor vehicles with the electric drive and the motor vehicles with the hybrid drive have at least one battery arranged over a large area under the first floor panel subassembly,
   wherein two different front-end subassemblies are provided,
   wherein floor regions of the bodyshell structures of the motor vehicles are formed, in a manner dependent on the drive concept, by a combination of one of the two front-end subassemblies and one of the two floor panel subassemblies,
   wherein the two front-end subassemblies have front longitudinal members, and
   wherein:
      in the case of a first front-end subassembly, the front longitudinal members end in the region of a bulkhead without continuation in a member structure at the underside of the floor panel subassembly, and
      in the case of a second front-end subassembly, the front longitudinal members are adjoined by central longitudinal members which extend into the region underneath the floor panel subassembly.

2. The group of motor vehicles according to claim 1, wherein
   the floor regions of the bodyshell structures of the motor vehicles with the electric drive or with the hybrid drive are formed by combination of the first front-end subassembly with the first floor panel subassembly.

3. The group of motor vehicles according to claim 1, wherein
   the floor region of the bodyshell structure of the motor vehicles with the combustion drive is formed by combination of the second front-end subassembly with the second floor panel subassembly.

4. The group of motor vehicles according to claim 1, wherein
   the floor region of the bodyshell structure of the motor vehicles with the combustion drive is formed by combination of the first front-end subassembly with the first floor panel subassembly.

5. The group of motor vehicles according to claim 4, wherein
   a housing for accommodating components of the motor vehicle is arranged underneath the first floor panel subassembly.

6. The group of motor vehicles according to claim 2, wherein
   in the case of a motor vehicle with the hybrid drive or with the combustion drive, the combustion engine is installed in a transverse direction of the motor vehicle, and
   an exhaust system of the motor vehicle ends in the front region of a passenger cell of the motor vehicle.

7. The group of motor vehicles according to claim 4, wherein
   in the case of a motor vehicle with the hybrid drive or with the combustion drive, the combustion engine is installed in a transverse direction of the motor vehicle, and
   an exhaust system of the motor vehicle ends in the front region of a passenger cell of the motor vehicle.

8. The group of motor vehicles according to claim 4, wherein
   in the case of a motor vehicle with the hybrid drive or with the combustion drive, a battery which extends over a major part of the vehicle width, or a housing which extends over a major part of the vehicle width, is provided.

9. The group of motor vehicles according to claim 1, wherein
   a first embodiment of the first front-end subassembly is configured for accommodating a combustion engine arranged in a longitudinal direction of the motor vehicle, and a second embodiment of the first front-end subassembly is configured for accommodating a combustion engine arranged in a transverse direction of the motor vehicle.

10. The group of motor vehicles according to claim 1, wherein the bodyshell structure of the motor vehicles is configured, in the region underneath a bulkhead of the motor vehicles, for attachment of different batteries.

11. The group of motor vehicles according to claim 1, wherein a region of side longitudinal members of the motor vehicles is configured for attachment of different batteries.

12. The group of motor vehicles according to claim 11, wherein the region of the side longitudinal members of the motor vehicles has a pattern of holes with a multiplicity of screw connection points which pattern is configured for the screw connection of different batteries, wherein the screw connection points for the attachment of the different batteries are at least partially identical.

13. The group of motor vehicles according to claim 1, wherein the two floor panel subassemblies each have, at a front side, attachment regions that are configured for attachment to a uniform bulkhead.

14. The group of motor vehicles according to claim 1, wherein the two floor panel subassemblies have different central tunnels that are configured for the attachment of uniform central consoles.

15. The group of motor vehicles according to claim 1, wherein in the case of the motor vehicles with the hybrid drive, in a region of a central tunnel, at least one battery bridge and/or stiffening bridge is provided which runs transversely with respect to a direction of travel and which connects a right-side and a left-side battery to one another.

16. The group of motor vehicles according to claim 1, wherein the motor vehicles with the combustion drive and the motor vehicles with the hybrid drive have a fuel tank arranged in front of a rear axle.

17. The group of motor vehicles according to claim 1, wherein two different luggage compartment floor subassemblies are provided, wherein a front region of a first luggage compartment floor subassembly, in its installed position in the motor vehicle, is arranged higher than the front region of a second luggage compartment floor subassembly.

18. The group of motor vehicles according to claim 1, wherein the motor vehicles are assembled from at least two front-end modules, which are designed as identical parts and which have different spacings of engine mounts, and at least two passenger cell modules with different spacings of the front seats, wherein the front-end modules and the passenger cell modules are combinable so as to form at least two groups of motor vehicles of different vehicle categories.

19. A method for producing a group of motor vehicles of one vehicle type, wherein the group comprises motor vehicles with three different drive concepts, the three drive concepts comprise a combustion engine ("combustion drive") or an electric motor ("electric drive") or a combination of a combustion engine and an electric motor ("hybrid drive"), and, to form floor regions of the bodyshell structures of the motor vehicles, two different floor panel subassemblies are provided, wherein a first floor panel subassembly, in its installed position in the motor vehicle, is arranged higher than a second floor panel subassembly, wherein bodyshell structures of the motor vehicles with the electric drive and of the motor vehicles with the hybrid drive are produced using the first floor panel subassembly, the bodyshell structure of the motor vehicles with the combustion drive concept are produced using the second floor panel subassembly, and in case of the motor vehicles with the electric drive and the motor vehicles with the hybrid drive, at least one battery is arranged over a large area under the first floor panel subassembly, wherein two different front-end subassemblies are provided, wherein:

floor regions of the bodyshell structures of the motor vehicles with the electric drive or with the hybrid drive are formed by combination of the first front-end subassembly with the first floor panel subassembly, the floor region of the bodyshell structure of the motor vehicles with the combustion drive is formed by combination of the second front-end subassembly with the second floor panel subassembly, wherein the two front-end subassemblies have front longitudinal members, and wherein:

in the case of the first front-end subassembly, the front longitudinal members end in the region of a bulkhead without continuation in a member structure at the underside of the floor panel subassembly, and in the case of the second front-end subassembly, the front longitudinal members are adjoined by central longitudinal members which extend into the region underneath the floor panel subassembly.

* * * * *